(12) United States Patent
Ushiku et al.

(10) Patent No.: US 7,324,855 B2
(45) Date of Patent: Jan. 29, 2008

(54) PROCESS-STATE MANAGEMENT SYSTEM, MANAGEMENT SERVER AND CONTROL SERVER ADAPTED FOR THE SYSTEM, METHOD FOR MANAGING PROCESS-STATES, METHOD FOR MANUFACTURING A PRODUCT, AND COMPUTER PROGRAM PRODUCT FOR THE MANAGEMENT SERVER

(75) Inventors: Yukihiro Ushiku, Yokohama (JP); Hidenori Kakinuma, Kawasaki (JP); Tsutomu Miki, Yokohama (JP); Junji Sugamoto, Yokosuka (JP); Akira Ogawa, Yokohama (JP); Yoshinori Ookawauchi, Fujisawa (JP); Giichi Inoue, Tokyo (JP); Tomomi Ino, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 71 days.

(21) Appl. No.: 11/217,592

(22) Filed: Sep. 2, 2005

(65) Prior Publication Data
US 2006/0064188 A1  Mar. 23, 2006

(30) Foreign Application Priority Data
Sep. 3, 2004 (JP) .......................... P2004-257778
Jul. 27, 2005 (JP) .......................... P2005-217030

(51) Int. Cl.
*G06F 19/00* (2006.01)
(52) U.S. Cl. .................. 700/83; 700/108; 705/400
(58) Field of Classification Search ............... 700/241, 700/96, 108, 236; 705/400, 22; 702/118, 702/184
See application file for complete search history.

(56) References Cited

U.S. PATENT DOCUMENTS

| 6,611,728 | B1 * | 8/2003 | Morioka et al. ............ 700/109 |
| 6,865,513 | B2 | 3/2005 | Ushiku et al. |
| 6,970,758 | B1 * | 11/2005 | Shi et al. .................... 700/108 |
| 7,117,050 | B2 * | 10/2006 | Sasaki et al. ................. 700/83 |

FOREIGN PATENT DOCUMENTS

| JP | 2003-217995 | | 7/2003 |
| KR | 2002-0063007 | A | 8/2002 |
| WO | WO96/25760 | | 8/1996 |

OTHER PUBLICATIONS

Notification of Submission of Argument(s) issued by the Korean Patent Office for Korean Patent Application No. 10-2005-0081898 on Sep. 11, 2006, including Japanese-language version of Korean Notification, and English-language translation of Japanese-language version.

* cited by examiner

*Primary Examiner*—Kldest Bahta
(74) *Attorney, Agent, or Firm*—Finnegan, Henderson, Farabow, Garrett & Dunner, L.L.P.

(57) ABSTRACT

A process-state management system encompasses: a plurality of production machines; a control server configured to collectively control at least part of the production machines; a management server including a data-linking module configured to link operation-management data of the production machines with corresponding management information transmitted from the control server, respectively, the management server analyze the operation-management data linked with the management information with a common analysis application; and a management database configured to store the operation-management data linked with the management information.

20 Claims, 23 Drawing Sheets

FIG. 3A

| PRODUCT MANAGEMENT INFORMATION ||
|---|---|
| PRODUCT NAME: | TZT68AB |
| LOT NO.: | N001 |
| WAFER NO. (FOR SINGLE WAFER PROCESS): | 01 |
| SAMPLING FREQUENCY: | 1sec |
| PROCESS NAME: | Gate Exposure |
| RECIPE NAME: | GX00FF |
| MACHINE NAME: | Lith#XX |
| JOB ID: | Lith### |
| MODULE: | #1A |

FIG. 3B

| PRODUCT MANAGEMENT INFORMATION ||
|---|---|
| PRODUCT NAME: | TZT68AB |
| LOT NO.: | N001 |
| WAFER NO. (FOR SINGLE WAFER PROCESS): | 01 |
| SAMPLING FREQUENCY: | 1sec |
| PROCESS NAME: | Gate αSi depo |
| RECIPE NAME: | AX0012 |
| MACHINE NAME: | LP#XX |
| JOB ID: | LP### |
| CHAMBER: | chA |

FIG. 3C

| PRODUCT MANAGEMENT INFORMATION ||
|---|---|
| PRODUCT NAME: | TZT68AB |
| LOT NO.: | N001 |
| WAFER NO. (FOR SINGLE WAFER PROCESS): | 01 |
| SAMPLING FREQUENCY: | 100msec |
| PROCESS NAME: | SPIKE Anneal |
| RECIPE NAME: | SP0015 |
| MACHINE NAME: | SA#XX |
| JOB ID: | SA### |
| CHAMBER: | chB |

| MACHINE TYPE | MACHINE | PROCESS CHAMBER | PRODUCT NAME | PROCESS NAME | RECIPE | LOT NO. | WAFER NO. | TIME STAMP | EE DATA 1 | EE DATA 2 | EE DATA 3 | ... |
|---|---|---|---|---|---|---|---|---|---|---|---|---|
| AA | #1 | ChA | X | Y | 001 | Lot1 | W01 | ... | : | : | : | : |
| | | | | | | | | | : | : | : | : |
| | | | | | | | | | : | : | : | : |
| | | | | | | | | | : | : | : | : |
| | | | | | | | | | : | : | : | : |

FIG. 9A

| TIME WHEN EE DATA WERE ACQUIRED | MACHINE PARAMETER A AUTOFOCUS | MACHINE PARAMETER B MONITORED EXPOSURE VALUE | MACHINE PARAMETER C BAKING-STAGE TEMPERATURE | MACHINE PARAMETER D SHOT NO. | MACHINE PARAMETER E RECIPE STEP | MACHINE PARAMETER F TIME IN STEP |
|---|---|---|---|---|---|---|
| 2004/8/30 17:00:00:0 | 0 | | 64.1 | 0 | 0 | 1 |
| 2004/8/30 17:00:01:0 | 0 | | 65 | 0 | 1 | 1 |
| 2004/8/30 17:00:02:0 | -0.4 | | 65.2 | 0 | 2 | 2 |
| 2004/8/30 17:00:03:0 | -0.5 | | 65.3 | 1 | 3 | 1 |
| 2004/8/30 17:00:04:0 | -0.5 | | 65.1 | 2 | 4 | 1 |
| 2004/8/30 17:00:05:0 | -0.5 | | 64.9 | 2 | 3 | 1 |
| 2004/8/30 17:00:06:0 | -0.5 | | 65.1 | | 4 | 1 |
| : | | | | | | |
| : | | | | | | |

FIG. 9B

| PRETREATMENT (CHARACTERISTIC VALUE) | |
|---|---|
| ITEM | DATA |
| MEAN OF SHOT 1 IN MACHINE PARAMETER C | 65°C |
| DISPERSION OF SHOT 1 IN MACHINE PARAMETER C | 0.2°C |
| : | : |

FIG. 10A

| TIME WHEN EE DATA WERE ACQUIRED | MACHINE PARAMETER A HEATER TEMPERATURE | MACHINE PARAMETER B FLOW AMOUNT OF GAS A | MACHINE PARAMETER C CHAMBER PRESSURE | MACHINE PARAMETER D RECIPE STEP |
|---|---|---|---|---|
| : | | | | |
| 2004/8/30 17:00:00:0 | 650 | -0.1 | 0.5 | 2 |
| 2004/8/30 17:00:01:0 | 650 | -0.1 | 0.5 | 2 |
| 2004/8/30 17:00:02:0 | 649.5 | 8.5 | 0.6 | 3 |
| 2004/8/30 17:00:03:0 | 649.8 | 12.4 | 0.6 | 3 |
| 2004/8/30 17:00:04:0 | 650.2 | 12.6 | 0.6 | 3 |
| 2004/8/30 17:00:05:0 | 650.1 | 12.5 | 0.6 | 3 |
| 2004/8/30 17:00:06:0 | 650.1 | 12.5 | 0.6 | 3 |
| : | | | | |

FIG. 10B

| PRETREATMENT ITEM | DATA |
|---|---|
| MEAN OF RECIPE 3 IN MACHINE PARAMETER B | 12.5sccm |
| DISPERSION OF RECIPE 3 IN MACHINE PARAMETER C | 13Pa |
| : | : |

FIG. 11A

| TIME WHEN EE DATA WERE ACQUIRED | MACHINE PARAMETER A PYROMETER VALUE | MACHINE PARAMETER B STAGE ROTATION | MACHINE PARAMETER C LAMP POWER | MACHINE PARAMETER D FLOW AMOUNT OF GAS A | ⋯ |
|---|---|---|---|---|---|
| ⋮ | | | | | |
| 2004/8/30 17:00:00:1 | | | | | |
| 2004/8/30 17:00:00:2 | | | | | |
| 2004/8/30 17:00:00:3 | | | | | |
| 2004/8/30 17:00:00:4 | | | | | |
| 2004/8/30 17:00:00:5 | | | | | |
| 2004/8/30 17:00:00:6 | | | | | |
| 2004/8/30 17:00:00:7 | | | | | |
| ⋮ | | | | | |

FIG. 11B

| PRETREATMENT | |
|---|---|
| ITEM | DATA |
| MEAN OF STEPS 1 AND 2 IN MACHINE PARAMETER C | 1100°C |
| DISPERSION WITHIN 1 sec OF STEP 2 IN MACHINE PARAMETER C | 3°C |
| ⋮ | ⋮ |

PROCESS-STATE MANAGEMENT SYSTEM, MANAGEMENT SERVER AND CONTROL SERVER ADAPTED FOR THE SYSTEM, METHOD FOR MANAGING PROCESS-STATES, METHOD FOR MANUFACTURING A PRODUCT, AND COMPUTER PROGRAM PRODUCT FOR THE MANAGEMENT SERVER

CROSS REFERENCE TO RELATED APPLICATIONS AND INCORPORATION BY REFERENCE

This application claims benefit of priority under 35 USC 119 based on Japanese Patent Application No. P2004-257778 filed Sep. 3, 2004, and Japanese Patent Application No. P2005-217030 filed Jul. 27, 2005, the entire contents of which are incorporated by reference herein.

BACKGROUND OF THE INVENTION

1. Field of the Invention

The present invention relates to a process-state management system configured to manage process-states of a plurality of production machines, which are adapted for a sequence of manufacturing processes configured to manufacture products, a management server and a control server adapted for the system, a method for managing the process-states, a method for manufacturing products using the method for managing the process-states, and a computer program product storing a program being executed on the management server so as to implement the method for managing the process-states.

2. Description of the Related Art

Semiconductor devices are fabricated using many expensive semiconductor production machines through a long sequence of manufacturing processes constituted by a complex combination of manufacturing processes such as, for example, lithography process, etching process, thermal treatment (oxidation, annealing, diffusion) process, ion implantation process, thin-film formation (CVD, sputtering, deposition) process, cleaning (removal of resist, cleaning using solution) process, and inspection process. Recently, large wafers such as a 300-mm diameter wafer have been particularly used. This causes increase in unit cost of wafers and increase in fabrication cost when fault occurs during a long sequence of manufacturing processes.

Therefore, for fabrication of semiconductor devices using many expensive semiconductor production machines, the effective operation rate of production machines inside and outside of a factory has been improved, and the performance thereof has been maintained or improved using an equipment engineering system (EES). "EES" denotes a computer system configured to acquire pieces of equipment information inherent in respective semiconductor production machines, statistically analyze data in the equipment information, and determine whether the respective semiconductor production machines operate normally or abnormally.

More specifically, a highly intelligent computer system has been constructed for managing a precise and correct operation and maintenance of individual production machines using advanced process control (APC) or a fault detection and classification (FDC) system. "APC" denotes a computer system configured to change a semiconductor fabrication process according to how a semiconductor production machine has processed wafers, more specifically, control a processing recipe by controlling a process number as a variable using multivariate model prediction and then providing feedback-control and feedforward-control in a process or between processes. Automated complex processing for semiconductor mass production allows APC technology to reduce production cost, improve production efficiency, consistently maintain high quality, and modify an arbitrary portion in a fabrication process in real time. It is expected that this technology achieves an improvement in profit per wafer and reduction in fabrication cost. In addition, "FDC" denotes a system configured to always monitor operation-states of semiconductor production machines and shut down various complex tools (semiconductor production machines) used for wafer fabrication before deviation in performance of a semiconductor production machine may adversely influence product yields. This achieves reduction in risk to wafers.

As described above, in the semiconductor device fabrication field, various computer technologies for reducing variation in performance of semiconductor production machines with the passage of time, for minimizing difference in film deposition among wafers, and for canceling difference in performance among semiconductor production machines, thereby providing a stable fabrication process have been developed. For example, a system configured to transfer data resulting from inspecting wafers during processing and after processing, record and manage a processed wafer log and a log of semiconductor production machines, carry out self-testing of each semiconductor production machines, and transmit appropriate commands has been proposed in the International Publication WO96/25760 (see line 25 on page 36 through line 2 on page 37.)

Meanwhile, with the earlier FDC systems, when monitoring many semiconductor production machines, data acquisition units (adapters) different for respective machine venders or for respective FDC box manufacturers are used to acquire independent pieces of information of respective semiconductor production machines and then carry out separate fault detection for them using computers (dedicated servers) different for the respective machine benders or for the respective FDC box manufacturers. Therefore, pieces of data regarding the earlier FDC are dispersed for the respective semiconductor production machines.

In other words, according to the earlier FDC architecture, fault detection methods and automatic fault analysis methods are different for the respective machine benders or for the respective FDC box manufacturers, and software programs (applications) used for automatic fault analysis are different for respective semiconductor production machines. Therefore, automatically analyzing applications for analyzing abnormalities of production machines are different from one another for respective semiconductor production machines, requiring additional investment.

SUMMARY OF THE INVENTION

An aspect of the present invention inheres in a process-state management system encompassing: a plurality of production machines; a control server configured to collectively control at least part of the production machines; a management server including a data-linking module configured to link operation-management data of the production machines with corresponding management information transmitted from the control server, respectively, the management server analyze the operation-management data linked with the management information with a common analysis application; and a management database configured to store the operation-management data linked with the management information.

Another aspect of the present invention inheres in a management server adapted for a system encompassing a plurality of production machines, a control server configured to control collectively at least part of the production machines, a management server connected to the production machines and the control server through a communication network, and a management database connected to the management server, the management server encompassing: a data-linking module configured to link operation-management data of the production machines with corresponding management information transmitted from the control server, respectively. Here, the management server analyzes the operation-management data linked with the management information with a common analysis application.

Still another aspect of the present invention inheres in a control server adapted for a system encompassing a plurality of production machines, the control server configured to control collectively at least part of the production machines, a management server connected to the production machines and the control server through a communication network, and a management database connected to the management server, the control server encompassing: a data acquisition unit configure to acquire operation-management data from at least one of the production machine; and a data-linking module configured to link the operation-management data of the production machine with corresponding management information.

Yet still another aspect of the present invention inheres in a method for managing process-states by repetition of a sequence of procedures, the sequence of procedures encompassing: transmitting management information for the process executed by a subject production machine to a data-linking module from a control server; linking operation-management data of the subject production machine with the management information; and analyzing the operation-management data linked with the management information with a common analysis application by a management server. Here, the sequence of procedures is applied sequentially to a plurality of production machines so as to manage process-states executed by the production machines, respectively, using the analyzed results by the management server.

Further aspect of the present invention inheres in a method for managing process-states encompassing: transmitting a plurality of pieces of management information for processes executed by a plurality of production machines to a data-linking module from a control server; linking operation-management data of the production machines with corresponding management information, respectively; and analyzing the operation-management data linked with the management information with a common analysis application by a management server. Then process-states executed by the production machines are managed using the analyzed results by the management server.

Further aspect of the present invention inheres in a method for manufacturing a product encompassing: starting a subject process, which is one of the manufacturing processes in a sequence of manufacturing processes configured to manufacture the product, by using a subject production machine, so as to provide a subject intermediate product; linking operation-management data of the subject production machine with a piece of management information of the subject production machine; analyzing the operation-management data of the subject production machine linked with the management information of the subject production machine, and if the analyzed result satisfies a criterion, conveying the subject intermediate product to a next process of the subject process, and further proceeding to an influenced process assigned at a later stage than the subject process in the sequence of manufacturing processes; starting the influenced process by using an influenced production machine, so as to provide a influenced intermediate product; linking operation-management data of the influenced production machine with a piece of management information of the influenced production machine; and analyzing the operation-management data of the influenced production machine linked with the management information of the influenced production machine, and if the analyzed result satisfies a criterion, conveying the influenced intermediate product to another process next to the influenced process in the sequence of manufacturing processes.

Further aspect of the present invention inheres in a computer program product storing a program being executed on a management server in a system encompassing a plurality of production machines, a control server configured to control collectively at least part of the production machines, the management server connected to the production machines and the control server through a communication network, and a management database connected to the management server, the program encompassing a sequence of instructions including, instructions configured to transmit management information for the process executed by a subject production machine to a data-linking module from a control server; instructions configured to link operation-management data of the subject production machine with the management information; and instructions configured to analyze the operation-management data linked with the management information with a common analysis application by a management server. Here, the sequence of instructions is applied sequentially to a plurality of production machines so as to manage process-states executed by the production machines, respectively, using the analyzed results by the management server.

BRIEF DESCRIPTION OF THE DRAWINGS

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified. Generally and as it is conventional in the representation of semiconductor devices, it will be appreciated that the various drawings are not drawn to scale from one figure to another nor inside a given figure, and in particular that the layer thicknesses are arbitrarily drawn for facilitating the reading of the drawings.

FIG. 3A shows exemplary management information for a photolithography process used by a process-state management system according to a second embodiment;

FIG. 3B shows exemplary management information for a CVD (deposition) process used by the process-state management system according to the second embodiment;

FIG. 3C shows exemplary management information for a spike-annealing process used by the process-state management system according to the second embodiment;

FIG. 9A is a table of operation-management data (equipment data) transformed into a common format for a photolithography process;

FIG. 9B is a table showing related pretreatment (characteristic value);

FIG. 10A is a table of operation-management data (equipment data) transformed into the common format for a CVD (deposition) process;

FIG. 10B is a table showing pretreatment (characteristic value) related to the table shown in FIG. 10A;

FIG. 11A is a table of operation-management data (equipment data) transformed into the common format for a spike-annealing process;

FIG. 11B is a table showing pretreatment (characteristic value) related to the table shown in FIG. 11A;

DETAILED DESCRIPTION OF THE INVENTION

In the following description specific details are set forth, such as specific materials, processes and equipment in order to provide a thorough understanding of the present invention. It will be apparent, however, to one skilled in the art that the present invention may be practiced without these specific details. In other instances, well-known manufacturing materials, processes and equipment are not set forth in detail in order not to unnecessarily obscure the present invention. Although, in the first through sixth embodiments, process-state management systems/methods are explained focusing to semiconductor device fabrication methods, needless to say, the present invention may be applied to miscellaneous fabrication methods for a variety of industrial products, such as liquid crystal displays (LCD), magnetic recording media, optical recording media, thin-film magnetic recording/reading heads, or superconductor devices.

FIRST EMBODIMENT

Figure 1:
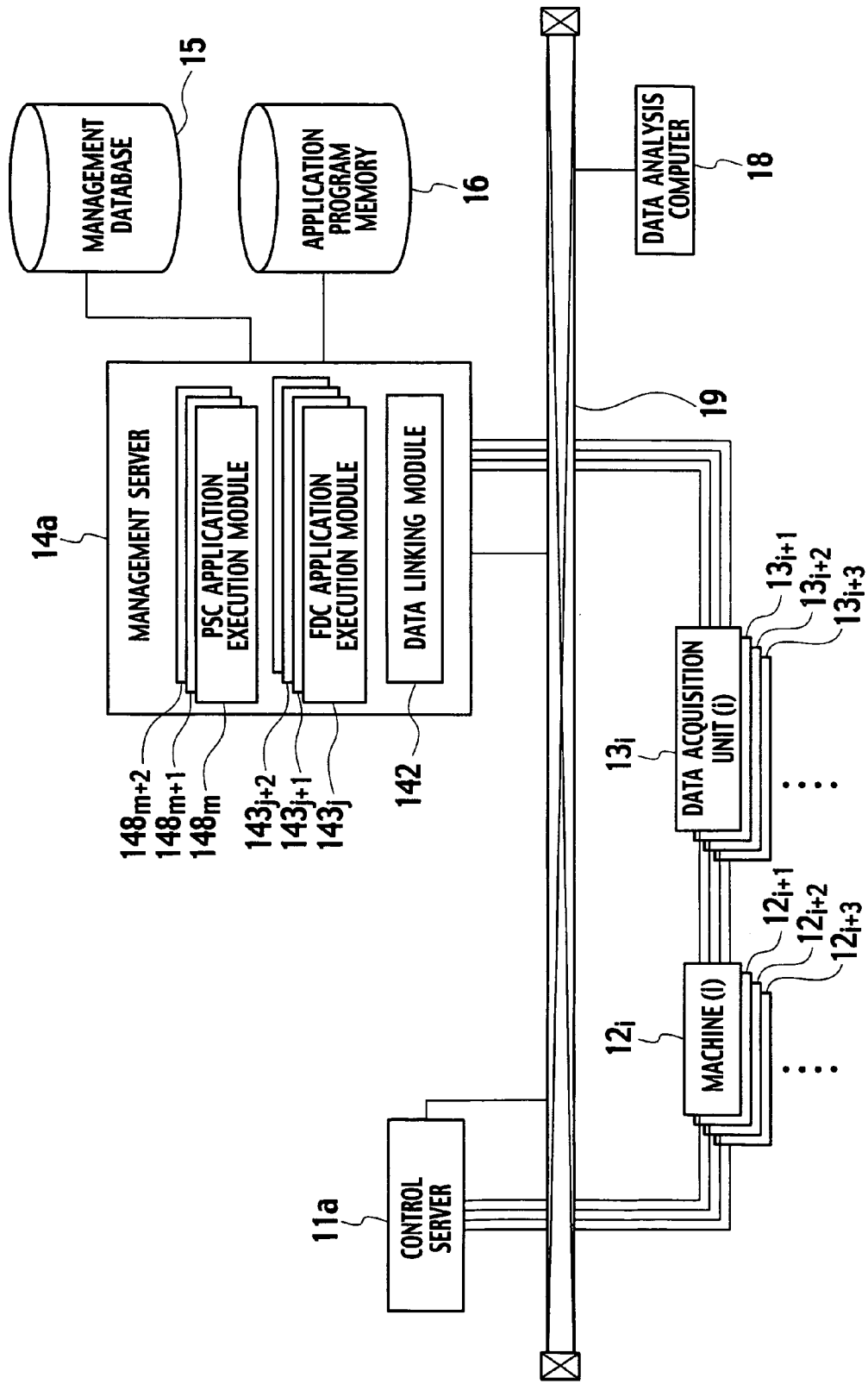
FIG. 1 is a schematic diagram describing a logical configuration of a process-state management system according to a first embodiment of the present invention.

As shown in FIG. 1, a process-state management system according to a first embodiment of the present invention encompasses a plurality of production machines $12_i$, $12_{i+1}$, $12_{i+2}$, $12_{i+3}$, ..., required for fabricating products such as semiconductor devices, a control server $11a$ configured to collectively control operations of the production machines $12_i$, $12_{i+1}$, $12_{i+2}$, $12_{i+3}$, ..., a management server 14a configured to receive operation-management data, or equipment engineering (EE) data including descriptions of operation statuses and machine parameters of respective production machines, so as to monitor corresponding operation states of the respective production machines $12_i$, $12_{i+1}$, $12_{i+2}$, $12_{i+3}$, ... in real time, and a management database 15 configured to store the operation-management data (EE data) of the respective production machines $12_i$, $12_{i+1}$, $12_{i+2}$, $12_{i+3}$, .... Hereafter in this specification, the EE data may be referred to as "equipment data". The control server 11a may have the functionality of a manufacturing execution system (MES) server to constitute a group of factory management systems, which link an enterprise resource planning (ERP) package or a head office business system with a group of control systems that control production machines in a factory. Therefore, as shown in FIG. 1, the production machines $12_i$, $12_{i+1}$, $12_{i+2}$, $12_{i+3}$, ..., the control server 11a, and the management server 14a are connected to each other via a communication network 19 such as MES local area network (LAN). A data analyzing personal computer (PC) 18 is further connected to the communication network (MES LAN) 19.

Analyzed results and determination results provided by the management server 14a are fed back to the control server 11a via the communication network (MES LAN) 19, and individual specific processing commands (job commands) are transmitted to the respective production machines $12_i$, $12_{i+1}$, $12_{i+2}$, $12_{i+3}$, ... from the control server 11a, which has the functionality of the MES server. Note that, needless to say, a plurality of control servers may be physically provided via the communication network (MES LAN) 19 instead of the single control server 11a exemplified in FIG. 1.

The plurality of production machines $12_i$, $12_{i+1}$, $12_{i+2}$, $12_{i+3}$, ... may include, for example, various semiconductor production machines, such as an ion implanter, a diffusion furnace, a thermal oxidation furnace for forming a silicon oxide film ($SiO_2$), a chemical vapor deposition (CVD) furnace for depositing an $SiO_2$ film, a phosphosilicate glass (PSG) film, a borosilicate glass (BSG) film, a boro-phosphate-silicate glass (BPSG) film, a silicon nitride ($Si_3N_4$) film, a polysilicon film or related films, an annealing furnace for annealing a PSG film, a BSG film, a BPSG film or related films so as to perform reflow processing (melting), an annealing furnace for densifying a CVD oxide film or related films, an annealing furnace for forming a silicide film or related films, a sputtering equipment or a vacuum evaporator for depositing a metallic interconnect layer, a plating equipment for forming a metallic interconnect layer through plating, a chemical mechanical polishing (CMP) machine for polishing the surface of a semiconductor substrate, a dry/wet etching equipment for etching the surface of a semiconductor substrate, a cleaning equipment for removing a resist film or cleaning the surface of a semiconductor substrate using an aqueous solution, a spin coating machine (spinner) for coating a resist film on the surface of a semiconductor substrate so as to perform photolithography, an exposure tool such as a stepper, a dicing machine for dicing a semiconductor wafer into a plurality of chips, and a bonding machine for connecting each of electrodes of a diced chip-shaped semiconductor device to respective pads on a lead frame. The production machines $12_i$, $12_{i+1}$, $12_{i+2}$, $12_{i+3}$, ... further include various inspection tools and measuring tools, such as an interference film thickness gauge, an ellipsometer, a contact type film thickness gauge, a microscope, or a resistance measuring tool. Furthermore, miscellaneous facilities, such as an ultrapure water system or a gas purifier may be included. In addition, the production machines $12_i$, $12_{i+1}$, $12_{i+2}$, $12_{i+3}$, ... may include both batch type machines and single-wafer type machines. Similarly, all of the production machines, which will be explained in the disclosures of first to sixth embodiments, may include both batch type machines and single-wafer type machines.

As shown in FIG. 1, the production machines $12_i$, $12_{i+1}$, $12_{i+2}$, $12_{i+3}$, ... are connected to a plurality of data acquisition units $13_i$, $13_{i+1}$, $13_{i+2}$, $13_{i+3}$, ..., which acquire pieces of operation-management data (equipment data) of the respective production machines $12_i$, $12_{i+1}$, $12_{i+2}$, $12_{i+3}$, ... in conformity with their own data collection plans (DCPs) and then transmit the operation-management data to the management server 14a at predetermined timings (periodically). In FIG. 1, the data acquisition units $13_i$, $13_{i+1}$, $13_{i+2}$, $13_{i+3}$, ... are connected to the management server 14a via the communication network (MES LAN) 19. Alternatively, in addition to the MES LAN 19, an EES LAN may be established to connect them to each other.

For example, if the production machines $12_i$, $12_{i+1}$, $12_{i+2}$, $12_{i+3}$, ... are assumed to be machines each having a chamber, such as vacuum processing equipment for forming a thin film, a diffusion furnace, and a thin-film deposition reactor, the data acquisition units $13_i$, $13_{i+1}$, $13_{i+2}$, $13_{i+3}$, ... receive pieces of operation-management data (equipment data), such as temperatures at respective different points in the chamber, temperature of a susceptor disposed in the chamber, temperatures at respective different points on the chamber outer walls, pressure in the chamber, gas flow rate introduced in the chamber, and valve conductance (angle of rotation) for controlling gas flow rate, and then transmit the operation-management data to the management server 14a at predetermined timings (periodically). If the production machines $12_i$, $12_{i+1}$, $12_{i+2}$, $12_{i+3}$, ... are assumed to be plasma-process related machines having discharge electrodes, such as a dry etching equipment or an ion implanter, the data acquisition units $13_i$, $13_{i+1}$, $13_{i+2}$, $13_{i+3}$, ... receive pieces of operation-management data (equipment data), such as information of RF impedance-matching positions, RF voltages (voltages of incident and reflected waves), and information of wafer positions in addition to the aforementioned various parameters for vacuum processing, and then transmit the operation-management data to the management server 14a at predetermined timings (periodically). In addition, if the production machines $12_i$, $12_{i+1}$, $12_{i+2}$, $12_{i+3}$, ... are a wet etching equipment, a spin coating machine, an exposure tool, and a bonding machine, which perform processing under atmospheric pressure, the data acquisition units $13_i$, $13_{i+1}$, $13_{i+2}$, $13_{i+3}$, ... receive pieces of operation-management data (equipment data), such as information of processing times and information of wafer or chip positions, and then transmit the operation-management data to the management server 14a at predetermined timings (periodically).

A central processing unit (CPU) of the management server 14a includes a data-linking module 142 configured to link the operation-management data (equipment data), which is transmitted from the respective data acquisition units $13_i$, $13_{i+1}$, $13_{i+2}$, $13_{i+3}$, ..., with the management information transmitted from the control server 11a. The data-linking module 142 links the operation-management data (equipment data) including unique data regarding product lot information, for example, with the management information including unique data regarding product lot information. The operation-management data (equipment data) of the production machines $12_i$, $12_{i+1}$, $12_{i+2}$, $12_{i+3}$, ... linked with the management information are stored in the management database 15.

"Management information" includes management information and product information of semiconductor substrates. Exemplary management information is shown in FIGS. 3A, 3B and 3C. FIG. 3A is a table showing exemplary management information of the photolithography process. FIG. 3B is a table showing exemplary management information of the CVD (deposition) process. FIG. 3C is a table showing exemplary management information of the spike-annealing process. Management information includes product name, lot number, wafer number (in the case of a single wafer type machine), sampling frequency of operation-management data (equipment data), corresponding process name, recipe name for the process, name of production machines carrying out the process, job ID number for the production machines, and module name or chamber name of the production machines.

Upon reception of a lot processing command from the control server 11a, the plurality of production machines $12_i$, $12_{i+1}$, $12_{i+2}$, $12_{i+3}$, ... generate a processing command unit (Job) and notify the control server 11a thereof. A job ID number is attached to the processing command unit by the control server 11a, and the control server 11a then carries out lot progress management based on the Job ID notified from the production machines $12_i$, $12_{i+1}$, $12_{i+2}$, $12_{i+3}$, ... (in conformity with semiconductor equipment and materials international (SEMI) standards).

Upon reception of notification that the processing command unit has been generated from the plurality of production machines $12_i$, $12_{i+1}$, $12_{i+2}$, $12_{i+3}$, ..., the control server 11a identifies product information, such as a product name, a step name, a lot number, and a wafer number included in the lot, based on the job ID number, and then transmits the product information to the management server 14a at the same time that the notification is received. High speed SECS message service (HSMS) communication in SEMI equipment communications standard (SECS) defined by SEMI, simple object access protocol (SOAP), file transfer protocol (FMP) or the like may be used as a communication protocol to transmit product information to the management server 14a, but the communication protocol is not limited thereto. Afterwards, the plurality of production machines $12_i$, $12_{i+1}$, $12_{i+2}$, $12_{i+3}$, ... initiate lot processing in order, and then transmit respective pieces of operation-management data (equipment data) to the management server 14a when a predetermined condition set to the production machines $12_i$, $12_{i+1}$, $12_{i+2}$, $12_{i+3}$, ... is satisfied (e.g., when processing a wafer in a target lot starts.) Each of the production machines $12_i$, $12_{i+1}$, $12_{i+2}$, $12_{i+3}$, ... notifies the control server 11a of information regarding which wafer in the lot having been processed by sending a wafer processing initiated report.

The CPU of the management server 14a in the process-state management system, according to the first embodiment, further includes a plurality of fault detection and classification (FDC) application execution modules $143_j$, $143_{j+1}$, $143_{j+2}$, .... Each of the FDC application execution modules $143_j$, $143_{j+1}$, $143_{j+2}$, ... is used as a common analysis application to collectively analyze and monitor the operation states of respective production machines $12_i$, $12_{i+1}$, $12_{i+2}$, $12_{i+3}$, ..., and issue an instruction to stop (shut down) a specific production machine in real time if deviation in performance of the specific production machine may adversely influence product yields, thereby reducing risk to wafers. Alternatively, any one of applications in the plurality of FDC application execution modules $143_j$, $143_{j+1}$, $143_{j+2}$, ... may be elected as a common analysis application to collectively analyze and monitor the plurality of production machines $12_i$, $12_{i+1}$, $12_{i+2}$, $12_{i+3}$, .... Alternatively, two or more of the applications in the plurality of FDC application execution modules $143_j$, $143_{j+1}$, $143_{j+2}$, ... may be combined and used as a common analysis application to collectively analyze and monitor the plurality of production machines $12_i$, $12_{i+1}$, $12_{i+2}$, $12_{i+3}$, .... The plurality of FDC application execution modules $143_j$, $143_{j+1}$, $143_{j+2}$, ... correspond to respective FDC applications. Alternatively, they may be software programs or dedicated hardware. More specifically, FDC programs to instruct and control the plurality of FDC application execution modules $143_j$, $143_{j+1}$, $143_{j+2}$, ... are stored in an application program memory 16 connected to the CPU of the management server 14a.

As described above, according to the process-state management system of the first embodiment, since a common FDC application may collectively monitor the plurality of production machines $12_i$, $12_{i+1}$, $12_{i+2}$, $12_{i+3}$, ... in real time, a unified fault detecting method or a unified automatic fault analyzing method may be used for monitoring many production machines of different machine venders. In other words, even if many production machines of different machine venders constitute a fabrication line in a factory, fault detection or an automatic fault analyzing application is not needed for each production machines, resulting in omission of additional investment.

Furthermore, since the operation-management data (equipment data) for all production machines $12_i$, $12_{i+1}$, $12_{i+2}$, $12_{i+3}$, ... required for fault detection and automatic analysis is kept (stored) in the management database 15, the operation-management data (equipment data) can be retrieved from the management database 15 at a high speed as needed. In addition, the FDC application used for the process-state management system, according to the first embodiment, may be freely replaced. Even with replacement with any kind of FDC application, it is used as a common analysis application to collectively analyze and monitor the operation states of respective production machines $12_i$, $12_{i+1}$, $12_{i+2}$, $12_{i+3}$, .... However, if deviation in performance of a production machine thereof may adversely influence product yields, an instruction to stop (shut down) the production machine may be issued.

The CPU of the management server 14a in the process-state management system, according to the first embodiment, further includes a plurality of process status control (PSC) application execution modules $144_k$, $144_{k+1}$, $144_{k+2}$, ..., which execute applications for various models such as multivariable model prediction. Each of the PSC application execution modules $144_k$, $144_{k+1}$, $144_{k+2}$, ... is used as a common analysis application to collectively analyze and control processing recipes for the respective production machines $12_i$, $12_{i+1}$, $12_{i+2}$, $12_{i+3}$, ... and provide feedback-control and feedforward-control for intra-process (within a process) or inter-process (among processes) implementation, resulting in reduction in production cost, improvement of production efficiency, and real-time correction of arbitrary portions in fabrication processes. Alternatively, any one of applications in the plurality of PSC application execution modules $144_k$, $144_{k+1}$, $144_{k+2}$, ... may be elected as a common analysis application to collectively analyze and control processing recipes for the plurality of production machines $12_i$, $12_{i+1}$, $12_{i+2}$, $12_{i+3}$, .... Alternatively, two or more of the applications in the plurality of PSC application execution modules $144_k$, $144_{k+1}$, $144_{k+2}$, ... may be combined and used as a common analysis application to collectively analyze and control processing recipes for the plurality of production machines $12_i$, $12_{i+1}$, $12_{i+2}$, $12_{i+3}$, .... The plurality of PSC application execution modules $144_k$, $144_{k+1}$, $144_{k+2}$, ... correspond to respective APC applications. They may be software programs or dedicated hardware. More specifically, a plurality of APC programs to instruct and control the plurality of PSC application execution modules $144_k$, $144_{k+1}$, $144_{k+2}$, ... are stored in the application program memory 16 connected to the management server 14a.

Furthermore, since operation-management data (equipment data) for all production machines $12_i$, $12_{i+1}$, $12_{i+2}$, $12_{i+3}$, ... required for controlling processing recipes are stored in the management database, the operation-management data may be retrieved from the management database at a high speed as needed. In addition, the PSC applications may be freely replaced. Even with replacement with any kind of PSC application, it is used as a common analysis application to collectively analyze and control processing recipes for the production machines $12_i$, $12_{i+1}$, $12_{i+2}$, $12_{i+3}$, ... or the like and then provide feedback-control and feedforward-control for intra-process (within a process) or inter-process (among processes) implementation, resulting in reduction in production cost, improvement of production efficiency, and real-time correction of arbitrary portions in fabrication processes.

Moreover, operation-management data (equipment data) inherent in each production machines stored in the management database 15 may be statistically analyzed using an EES application and may be used to improve the effective operation rate of production machines inside and outside of a factory and maintain or improve the performances of the production machines. Furthermore, since such data may be used in a technology CAD (TCAD) or a yield management system (YMS), the final yield of a semiconductor device may be estimated in intermediate processes prior to completion of the final process.

Needless to say, the management server 14a includes an input unit used for an operator to enter data and instructions, an output unit for outputting analyzed results, a display unit, and data memory configured to be stored with intermediate data required for analyzing each of the production machines $12_i$, $12_{i+1}$, $12_{i+2}$, $12_{i+3}$, ..., which are omitted in FIG. 1. The input unit of the management server 14a may be implemented by a keyboard, a mouse, a light pen, or a flexible disk unit. A process manager (factory manager) may use the input unit to specify input/output data and change an application to be used. In addition, the input unit is provided so as to facilitate entry of a model to be used for analysis and also entry of commands for executing or aborting operation. The output unit and the display unit may be implemented by a printer and a display, respectively. Alternatively, the display unit may display input/output data, analyzed results, abnormal/normal state, and analysis parameters to allow the factory manager to collectively monitor the operation states of the production machines.

Figure 2:
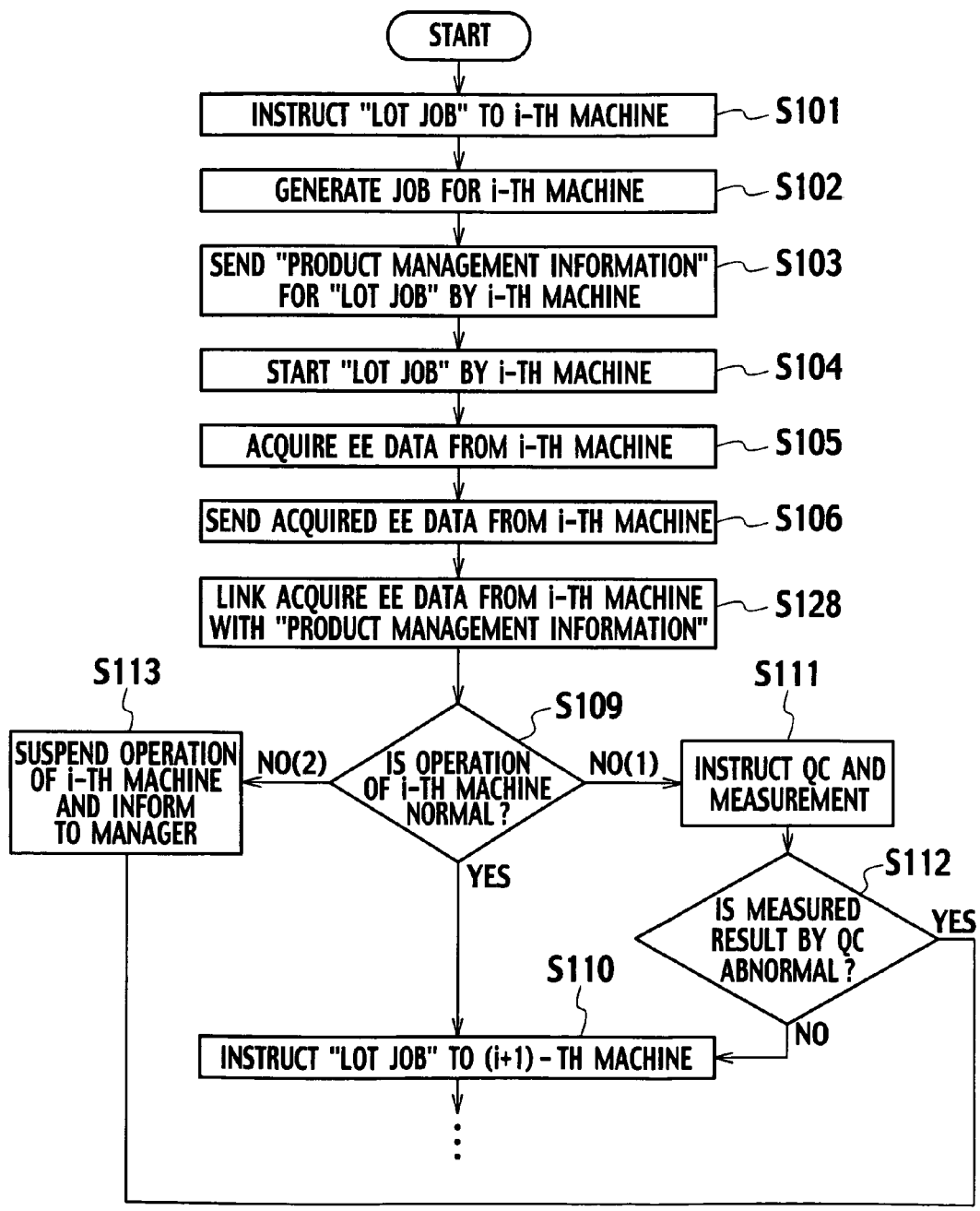
FIG. 2 is a flowchart describing an outline of a process-state management method according to the first embodiment of the present invention.
Figures 4, 5:
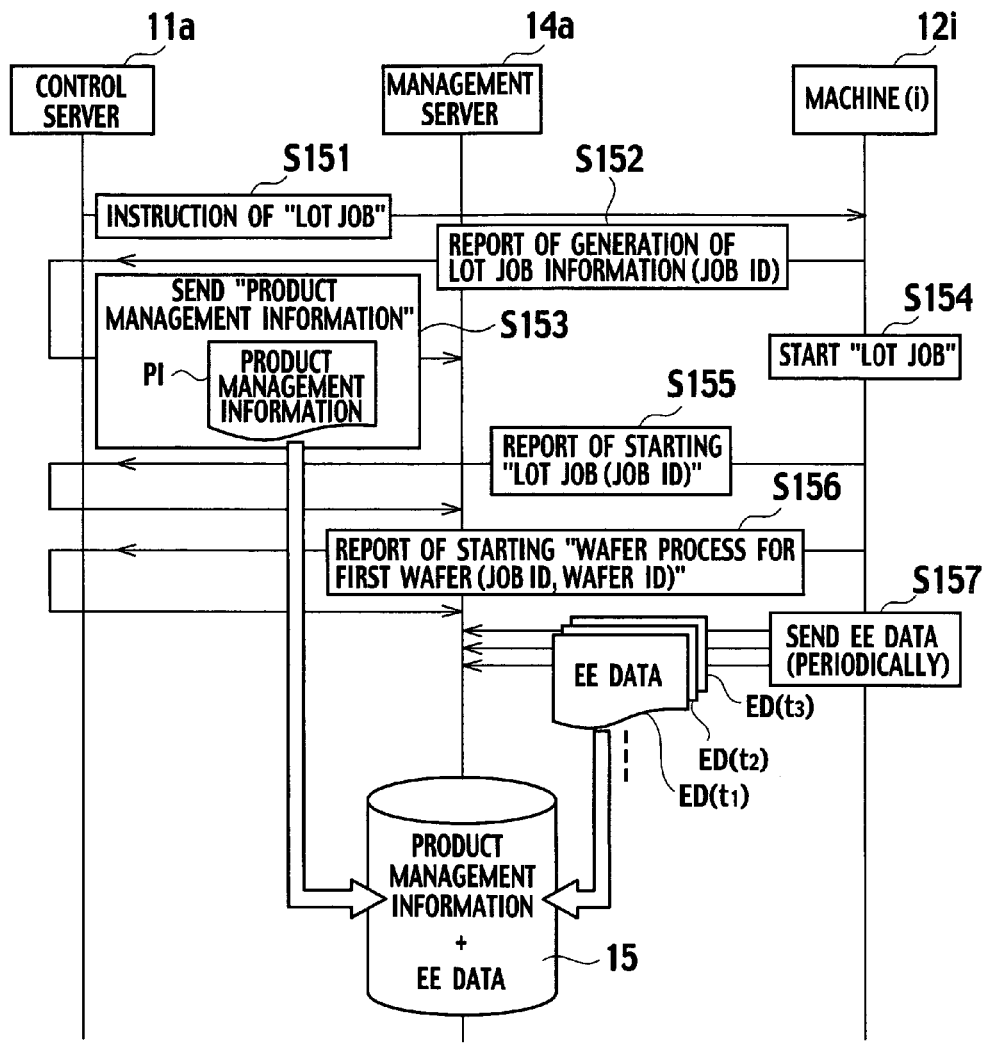
FIG. 4 is a flowchart describing a scenario of linking operation-management data (equipment data) with lot management information (product information) according to the process-state management method of the first embodiment of the present invention.
FIG. 5 shows an exemplary data structure of linking the operation-management data (equipment data) with the lot management information (product information) using the process-state management method according to the first embodiment of the present invention.

A process-state management method, according to the first embodiment of the present invention, is described using flowcharts shown in FIGS. 2 and 4. Note that the process-state management method according to the first embodiment described below is represented by a flowchart regarding the i-th production machine $12_i$ of the production machines $12_i$, $12_{i+1}$, $12_{i+2}$, $12_{i+3}$, ... constituting a fabrication line in a factory. Similarly, flowcharts regarding the (i−1)-th production machine $12_{i-1}$, the (i+1)-th production machine $12_{i+1}$, the (i+2)-th production machine $12_{i+2}$, the (i+3)-th production machine $12_{i+3}$, ... may be shown. In addition, the flowchart shown in FIG. 2 is a mere example, and needless to say, various process-state management methods including modifications thereof are available. If we assign the i-th production machine $12_i$ as a subject production machine, the (i+1)-th production machine $12_{i+1}$ may be assigned as the second production machine, and the (i+2)-th production machine $12_{i+2}$ may be assigned as the second production machine, respectively.

(a) In a step S101 of FIG. 2, a lot processing command (job command) for the production machine $12_i$ is first transmitted from the control server 11a (corresponding to a step S151 of FIG. 4). In a step S102 of FIG. 2, the production machine $12_i$ then generates a job (lot processing information) of the production machine $12_i$, and transmits a lot processing information generation report (JobID) to the control server 11a (corresponding to a step S152 of FIG. 4).

(b) Once the lot processing information generation report (JobID) of the production machine $12_i$ is transmitted to the control server 11a in the step S102 of FIG. 2, the control server 11a transmits lot management information (product information) PI for the processing executed by the production machine $12_i$ to the management server 14a in a step S103 of FIG. 2 (corresponding to a step S153 of FIG. 4).

(c) On the other hand, in a step S104 of FIG. 2, the production machine $12_i$ starts corresponding lot processing such as lithography, etching, thermal treatment, ion implantation, CVD, sputtering, deposition, and cleaning in conformity with a predetermined recipe (corresponding to a step S154 of FIG. 4). The predetermined recipe is managed by the control server 11a.

(d) As shown in a step S156 of FIG. 4, once lot processing starts in the step S104 of FIG. 2, "a first wafer processing start report (JobID, WaferID)" is transmitted to the control server 11a, which then transmits the report to the management server 14a. In addition, in a step S105 of FIG. 2, the data acquisition unit $13_i$ connected to the production machine $12_i$ starts collecting operation-management data (equipment data) of the production machine $12_i$ in conformity with a data collection plan dedicated to the production machine $12_i$ and the collected data are temporarily stored in a storage unit of the data acquisition unit $13_i$.

(e) Afterwards, in a step S106 of FIG. 2 (corresponding to the step S157 of FIG. 4), the data acquisition unit $13_i$ transmits the collected pieces of operation-management data (equipment data) ED $(t_1)$, ED $(t_2)$, ED $(t_3)$, ... of the production machine $12_i$ to the data-linking module 142 in the CPU of the management server 14a at predetermined timings (periodically). The data-linking module 142 in the CPU of the management server 14a then links the operation-management data (equipment data) ED $(t_1)$, ED $(t_2)$, ED $(t_3)$, ... of the production machine $12_i$ with the lot management information (product information) PI transmitted from the control server 11a in a step S128 of FIG. 2. The data-linking module 142 identifies product information being processed from a job ID number and a wafer ID number in the wafer processing start report, which has been transmitted from the production machine $12_i$ to the control server 11a, and then stores in the management database 15, corresponding lot management information (product information) PI linked with the operation-management data (equipment data) ED $(t_1)$, ED $(t_2)$, ED $(t_3)$, .... In other words, the operation-management data (equipment data) ED $(t_1)$, ED $(t_2)$, ED $(t_3)$, ... of the production machine $12_i$ linked with the lot management information (product information) by the data-linking module 142 are stored in the management database 15 as operation-management data. Alternatively, the data may be temporarily stored in main memory (data memory) or cache memory of the management server 14 instead of the management database 15.

(f) On the other hand, the management server 14a preselects the most appropriate FDC application execution module from a group of FDC application execution modules $143_j$, $143_{j+1}$, $143_{j+2}$, . . . installed in the CPU of the management server 14a as a common module for collectively monitoring the plurality of production machine $12_i$, $12_{i+1}$, $12_{i+2}$, $12_{i+3}$, . . . in real time. According to the process-state management method of the first embodiment, it is assumed that the FDC application execution module $143_j$ is selected. In a step S109 of FIG. 2, the FDC application execution module $143_j$ reads out the operation control data (equipment data) ED ($t_1$), ED ($t_2$), ED ($t_3$), . . . of the production machine $12_i$ from the management database 15, and then determines whether or not the production machine $12_i$ is operating normally. For example, if the production machine $12_i$ is a production machine having a chamber, such as a vacuum evaporator or sputtering equipment for depositing thin film, a diffusion furnace, or a thin-film deposition reactor, temperatures in a plurality of regions in the chamber (first machine parameter), temperature of a susceptor disposed in the chamber (second machine parameter), temperatures in a plurality of regions on the chamber outer walls (third machine parameter), pressure in the chamber (fourth machine parameter), gas flow rate flowing into the chamber (fifth machine parameter), and valve conductance for controlling the gas flow rate (sixth machine parameter) are compared with respective predetermined normal values.

(g) In a step S109 of FIG. 2, if the FDC application execution module $143_j$ determines that all of the first to sixth machine parameters of the operation-management data (equipment data) ED ($t_1$), ED ($t_2$), ED ($t_3$), . . . of the production machine $12_i$ fall within the criterions of the respective predetermined values, processing proceeds to a step S110 of FIG. 2 in which the (i+1)-th processing subsequent to the processing conducted by the i-th production machine $12_i$ is carried out. In other words, the control server 11a transmits a lot processing command (job command) for the (i+1)-th processing to the (i+1)-th production machine $12_{i+1}$.

(h) On the other hand, in the step S109 of FIG. 2, if the FDC application execution module $143_j$ determines that any one or more of the first to sixth machine parameters of the operation-management data (equipment data) ED ($t_1$), ED ($t_2$), ED ($t_3$), . . . of the production machine $12_i$ does not fall within the criterions of the respective predetermined values, processing proceeds to a step S111 or S113 of FIG. 2. In general, the transition timing from the step S109 to the step S111 differs from the transition timing from the step S109 to the step S113. Although, determination of whether to proceed to the step S111 or S113 in FIG. 2 depends on a criterion such as the degree of deviations in the first to sixth machine parameters from corresponding respective reference values or a criterion of whether the first to sixth machine parameters are abnormal, the transition from the step S109 to the step S113 is a real-time process so as to suspend (shut down) the operation of the production machine $12_i$ when the abnormality is detected. On the contrary, the transition timing from the step S109 to the step S111 is performed after the timing when the subject lot process is completed, establishing instruction of quality control (QC) or measurement for QC by the instruction. Namely, in a step S111 of FIG. 2, measurement for QC is instructed and then conducted. "Measurement for QC", in the case of a CVD furnace, means measurement of thickness of a thin film deposited by the CVD furnace. If the measurement for QC in the step S111 of FIG. 2 reveals it to fall within a predetermined range, processing proceeds to a step S110 of FIG. 2 in which a lot processing command is then transmitted to the (i+1)-th production machine $12_{i+1}$. Otherwise, if the measurement for QC in the step S111 of FIG. 2 reveals it to be out of the predetermined range, processing proceeds to the step S113 of FIG. 2 in which the control server 11a transmits an instruction to suspend (shut down) the operation of the production machine $12_i$. In addition, necessary incidental processing such as notifying the abnormality to a manager of the production machine $12_i$ is carried out at the same time. As described above, the production machine $12_i$ is always monitored, and is shut down before the deviation of the operation-management data (equipment data) ED ($t_1$), ED ($t_2$), ED ($t_3$), . . . of the production machine $12_i$ from reference values may adversely influence product yields, thereby reducing risk to wafers.

Similarly, the common FDC application execution module $143_j$ may always collectively monitor the other production machines $12_{i+1}$, $12_{i+2}$, $12_{i+3}$, . . . constituting a fabrication line in a factory, and suspend (shut down) a specific production machine thereof before deviation of the pieces of operation-management data (equipment data) ED ($t_1$), ED ($t_2$), ED ($t_3$), . . . of the production machines $12_{i+1}$, $12_{i+2}$, $12_{i+3}$, . . . from corresponding respective reference values may adversely influence product yields, thereby reducing risk to wafers.

FIG. 5 shows an exemplary data structure with the pieces of operation-management data (equipment data) ED ($t_1$), ED ($t_2$), ED ($t_3$), . . . linked with respective pieces of lot management information (product information) PI. A method of storing data in the management database 15 has been described where the data includes the operation-management data (equipment data) ED ($t_1$), ED ($t_2$), ED ($t_3$), . . . linked with the lot management information (product information) PI. However, the present invention is not limited to that method. Alternatively, a data file may be stored. A user can retrieve the operation-management data (equipment data) ED ($t_1$), ED ($t_2$), ED ($t_3$), . . . linked with the lot management information by accessing the management server 14a via a data analysis terminal. In the case where lot numbers and recipe names are particularly repetitive among product types in a large-item small-volume production line, data analysis of a limited number of product types may be easily carried out, resulting in improved efficiency and improved accuracy of analysis. In addition, in a case of semiconductor equipment production machines (semiconductor equipment), for example, if the plurality of production machines $12_i$, $12_{i+1}$, $12_{i+2}$, $12_{i+3}$, . . . conform to communications standard for semiconductor equipment such as SECS defined by SEMI, communication software programs for the plurality of production machines $12_i$, $12_{i+1}$, $12_{i+2}$, $12_{i+3}$, . . . are not required to be modified, resulting in prevention of increase in undesired cost. As such, according to the process-state management method of the first embodiment of the present invention, processing of the steps S101 through S113 in FIG. 2 may be applied to the production machines $12_i$, $12_{i+1}$, $12_{i+2}$, $12_{i+3}$, . . . one after another, and processes by the plurality of production machines $12_i$, $12_{i+1}$, $12_{i+2}$, $12_{i+3}$, . . . may be controlled based on results of analyzing using the common analysis application by the management server 14a. Here, "management" includes operation state changes such as a forced suspension or a temporary suspension of the operation of a specific production machine, among the plurality of production machines $12_i$, $12_{i+1}$, $12_{i+2}$, $12_{i+3}$, . . . , based on the analyzed results. In addition, provision of feedback-control and/or feedforward-control for intra-process (within a process) or inter-process (among processes) implementation is included. Note that with the process-state management system, the management server, the process-state management method, and the process-state management program according to the second to sixth embodiments of the present invention, the term "management" includes feedback-control and feedforward-control.

A program having an algorithm equivalent to the series of procedures according to the process-state management method shown in FIG. 2 may be executed to control the process-state management system in FIG. 1. The program should be stored in both program memories (not shown in the drawing) of the control server 11a and the management server 14a constituting the process-state management system, according to the first embodiment of the present invention. In addition, once the program is stored in a computer readable recording medium, and the content of the recording medium is read out to the program memories of the control server 11a and the management server 14a, the procedure according to the process-state management method of the first embodiment of the present invention may be carried out. A "computer readable recording medium" means a medium such as an external memory of a computer, semiconductor memory, a magnetic disk, an optical disk, a magnetic optical (MO) disk, or a magnetic tape, which may be stored with programs. More specifically, a "computer readable recording medium" may be a flexible disk, a compact disk (CD)-read-only memory (ROM), an MO disk, a cassette tape, or an open reel tape. For example, the main bodies of the control server 11a and the management server 14a may be structured so that a flexible disk drive and an optical disk drive are either incorporated or externally connected. Inserting a flexible disk into the flexible disk drive or a CD-ROM into the optical disk drive and conducting a predetermined read-out operation allows installation of programs stored in those recording media in the program memories of the control server 11a and the management server 14a. In addition, by connection of suitable drive units, ROM as a semiconductor memory, or a cassette tape as a magnetic tape unit can be employed. Furthermore, the program may be stored in the program memory via an information-processing network such as the Internet.

For example, a process-state management program required for controlling the management server 14a includes:

(a) Instructions configured to cause the data-linking module 142 to command the control server 11a to transmit lot management information (product information) PI for the processing executed by the specified production machine $12_i$ to the data-linking module 142 in the management server 14a;

(b) Instructions configured to cause the data-linking module 142 to receive the lot management information (product information) PI for the processing executed by the specified production machine $12_i$, which corresponds to the step S103 of FIG. 2 (after the control server 11a transmits the lot management information (product information) PI for the processing executed by the specified production machine $12_i$ to the data-lining module 142 in conformity with the aforementioned command);

(c) Instructions configured to cause the data-linking module 142 in the management server 14a to receive the operation-management data (equipment data) ED ($t_1$), ED ($t_2$), ED ($t_3$), . . . of the specified production machine $12_i$, which corresponds to the step S106 of FIG. 2, and cause the data-linking module 142 in the management server 14a to link the operation-management data with the lot management information (product information) PI in the step S128 of FIG. 2; and (d) Instructions configured to cause the FDC application execution module $143_j$ in the management server 14a to analyze the linked operation-management data (equipment data) ED ($t_1$), ED ($t_2$), ED ($t_3$), . . . using a common analysis application in the steps S109 through S113 of FIG. 2.

The series of instructions are applied one after another to a set of the lot management information (product information) PI and the operation-management data (equipment data) ED ($t_1$), ED ($t_2$), ED ($t_3$), . . . transmitted from the plurality of production machines $12_i$, $12_{i+1}$, $12_{i+2}$, $12_{i+3}$, . . . . Analysis in the steps S109 through S113 of FIG. 2 is then conducted. The analyzed results allow the management server 14a to control the processes carried out by the plurality of production machines $12_i$, $12_{i+1}$, $12_{i+2}$, $12_{i+3}$, . . . .

(Modification of the First Embodiment)

Figure 6:
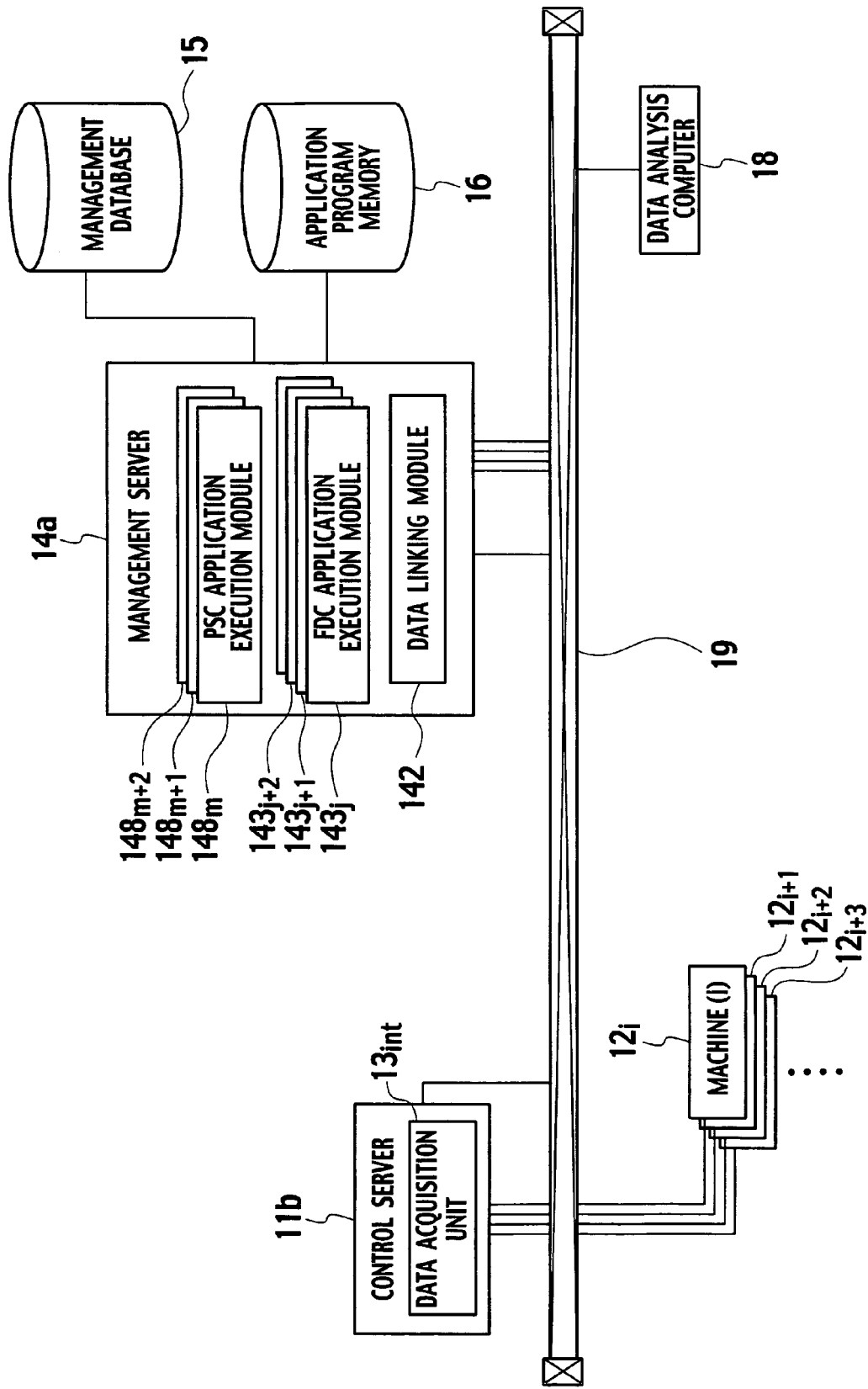
FIG. 6 is a schematic diagram describing a logical configuration of a process-state management system according to a modification of the first embodiment of the present invention.

With nearly the same configuration as the configuration shown in FIG. 1, a process-state management system according to a modification of the first embodiment of the present invention shown in FIG. 6 encompasses a plurality of production machines $12_i$, $12_{i+1}$, $12_{i+2}$, $12_{i+3}$, . . . , a control server 11b configured to collectively control operations of the respective production machines $12_i$, $12_{i+1}$, $12_{i+2}$, $12_{i+3}$, . . . , a management server 14a configured to receive operation-management data (equipment data), which includes descriptions of operation statuses and machine parameters of the respective production machines, and monitor corresponding operation states of the respective production machines $12_i$, $12_{i+1}$, $12_{i+2}$, $12_{i+3}$, . . . in real time, and a management database 15 storing pieces of operation-management data (equipment data) of the respective production machines $12_i$, $12_{i+1}$, $12_{i+2}$, $12_{i+3}$, . . . .

Note that according to the configuration shown in FIG. 1, the production machines $12_i$, $12_{i+1}$, $12_{i+2}$, $12_{i+3}$, . . . are connected to a plurality of data acquisition units $13_i$, $13_{i+1}$, $13_{i+2}$, $13_{i+3}$, . . . , which acquire pieces of operation-management data (equipment data) of the respective production machines $12_i$, $12_{i+1}$, $12_{i+2}$, $12_{i+3}$, . . . in conformity with their own DCPs and then transmit the operation-management data to the management server 14a at predetermined timings (periodically). However, according to the process-state management system of the modification of the first embodiment of the present invention shown in FIG. 6, the control server 11b includes a data acquisition unit $13_{int}$, which receives pieces of operation-management data (equipment data) of the plurality of production machines $12_i$, $12_{i+1}$, $12_{i+2}$, $12_{i+3}$, . . . in conformity with their own DCPs and then transmits them to the management server 14a at predetermined timings (periodically).

With nearly the same configuration as the configuration shown in FIG. 1, the control server 11b in the process-state management system according to the modification of the first embodiment of the present invention shown in FIG. 6 may have the functionality of a MES server to constitute a group of factory management systems, which link an ERP package or a head office business system with a group of control systems that control machines in a factory. Therefore, as shown in FIG. 6, the production machines $12_i$, $12_{i+1}$, $12_{i+2}$, $12_{i+3}$, . . . , the control server 11b, and the management server 14a are connected to each other via a communication network (MES LAN) 19. A data analyzing personal computer (PC) 18 is further connected to the communication network (MES LAN) 19.

Analyzed results and determination results provided by the management server 14a are fed back to the control server 11b via the communication network (MES LAN) 19, and individual specific processing commands Gob commands) are transmitted to the respective production machines $12_i$, $12_{i+1}$, $12_{i+2}$, $12_{i+3}$, . . . from the control server 11b, which has the functionality of the MES server. Note that, needless to say, a plurality of control servers may be physically provided via the communication network (MES LAN) 19 instead of the single control server 11b exemplified in FIG. 6, as described in FIG. 1.

For example, if the production machines $12_i$, $12_{i+1}$, $12_{i+2}$, $12_{i+3}$, . . . are assumed to be machines each having a chamber, such as vacuum processing equipment for forming a thin film, a diffusion furnace, and a thin-film deposition reactor, the data acquisition unit $13_{int}$ receives pieces of operation-management data (equipment data), such as temperatures at respective different points in the chamber, temperature of a susceptor disposed in the chamber, temperatures at respective different points on the chamber outer walls, pressure in the chamber, gas flow rate introduced in the chamber, and valve conductance (angle of rotation) for controlling gas flow rate, and then transmit the operation-management data to the management server 14a at predetermined timings (periodically). If the production machines $12_i$, $12_{i+1}$, $12_{i+2}$, $12_{i+3}$, . . . are assumed to be plasma-process related machines having discharge electrodes, such as a dry etching equipment or an ion implanter, the data acquisition unit $13_{int}$ receives pieces of operation-management data (equipment data), such as information of RF impedance-matching positions, RF voltages (voltages of incident and reflected waves), and information of wafer positions in addition to the aforementioned various parameters for vacuum processing, and then transmit the operation-management data to the management server 14a at predetermined timings (periodically). In addition, if the production machines $12_i$, $12_{i+1}$, $12_{i+2}$, $12_{i+3}$, . . . are a wet etching equipment, a spin coating machine, an exposure tool, and a bonding machine, which perform processing under atmospheric pressure, the data acquisition unit $13_{int}$ receives pieces of operation-management data (equipment data), such as information of processing times and information of wafer or chip positions, and then transmit the operation-management data to the management server 14a at predetermined timings (periodically).

A CPU of the management server 14a includes a data-linking module 142 configured to link the operation-management data (equipment data), which is transmitted from the data acquisition unit $13_{int}$, with the management information transmitted from the control server 11b, which is nearly the same configuration as the configuration, shown in FIG. 1. The data-linking module 142 links the operation-management data (equipment data) including unique data regarding product lot information, for example, with the management information including unique data regarding product lot information. The operation-management data (equipment data) of the production machines $12_i$, $12_{i+1}$, $12_{i+2}$, $12_{i+3}$, . . . linked with the management information are stored in the management database 15.

Other functions, configurations, way of operation are substantially similar to the functions, configurations, way of operation already explained in the first embodiment with FIG. 1, overlapping or redundant description may be omitted.

SECOND EMBODIMENT

Figure 7:
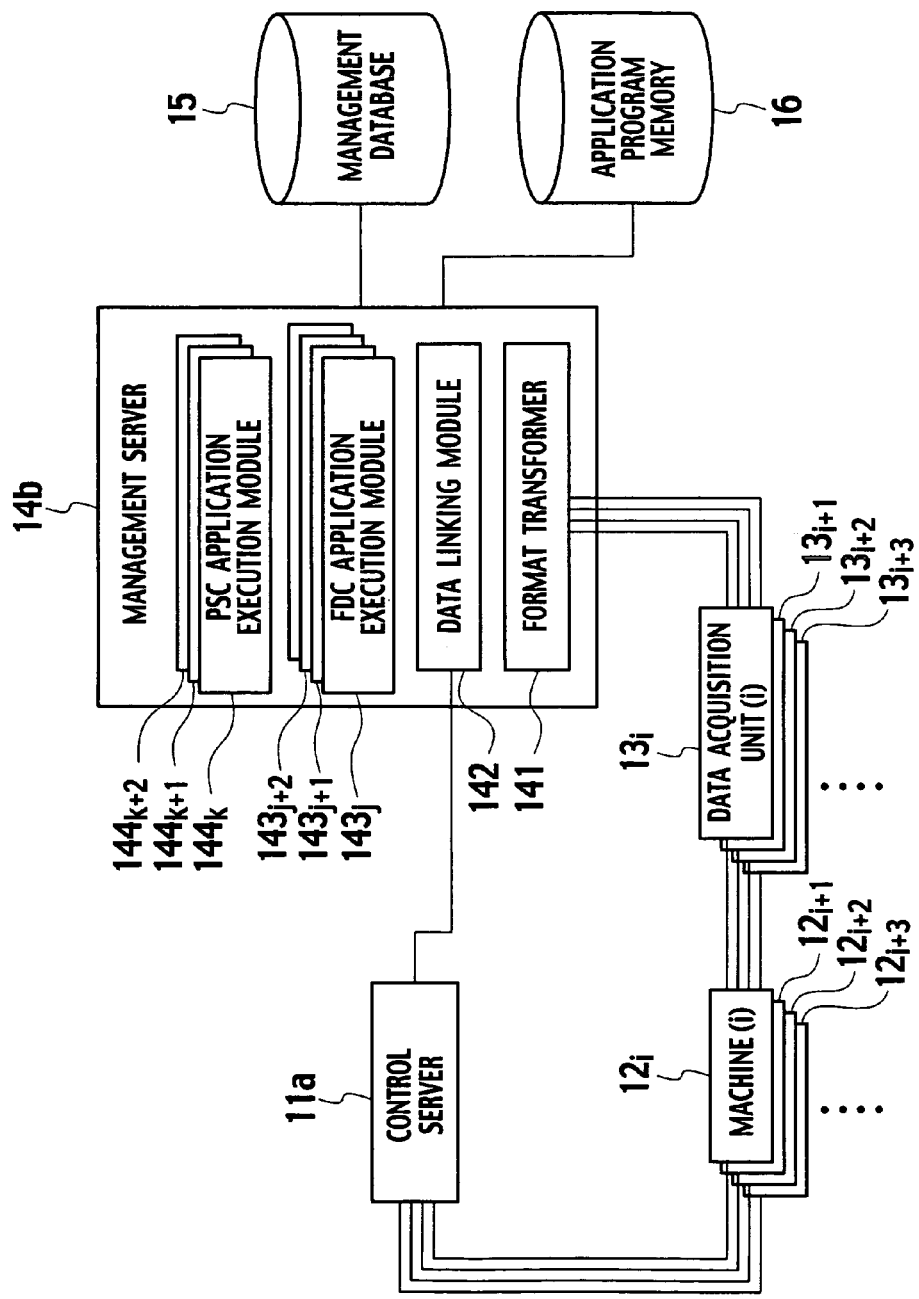
FIG. 7 shows a schematic system structure describing a logical configuration of the process-state management system according to the second embodiment of the present invention.

As shown in FIG. 7, similar to the process-state management system according to the first embodiment, a process-state management system according to a second embodiment of the present invention encompasses a plurality of production machines $12_i$, $12_{i+1}$, $12_{i+2}$, $12_{i+3}$, . . . , required for fabricating products such as semiconductor devices, a control server 11a configured to collectively control operations of the respective production machines $12_i$, $12_{i+1}$, $12_{i+2}$, $12_{i+3}$, . . . , a management server 14b configured to receive operation-management data (equipment data), which includes descriptions of operation statuses and machine parameters of the respective production machines, and monitor corresponding operation states of the respective production machines $12_i$, $12_{i+1}$, $12_{i+2}$, $12_{i+3}$, . . . in real time, and a management database 15 storing pieces of operation-management data (equipment data) of the respective production machines $12_i$, $12_{i+1}$, $12_{i+2}$, $12_{i+3}$, . . . . The production machines $12_i$, $12_{i+1}$, $12_{i+2}$, $12_{i+3}$, . . . are connected to a plurality of data acquisition units $13_i$, $13_{i+1}$, $13_{i+2}$, $13_{i+3}$, . . . , which acquire pieces of operation-management data (equipment data) of the respective production machines $12_i$, $12_{i+1}$, $12_{i+2}$, $12_{i+3}$, . . . , in conformity with their own DCPs and transmit the operation-management data to the management server 14b at predetermined timings (periodically).

However, as shown in FIG. 7, the process-state management system according to the second embodiment is different from the process-state management system according to the first embodiment shown in FIG. 1 in that the former includes a CPU of the management server 14b, which includes a format transformer 141 configured to transform the operation-management data transmitted from the respective data acquisition units $13_i$, $13_{i+1}$, $13_{i+2}$, $13_{i+3}$, . . . into data represented by a common format (common-format-transformed operation-management data) as shown in FIGS. 9A, 9B, 10A and 10B.

As with the process-state management system according to the first embodiment, the CPU of the management server 14b further includes a data-linking module 142 configured to link the operation-management data transformed into the common format by the format transformer 141 with the management information transmitted from the control server 11a. The data-linking module 142 links the operation-management data including unique data regarding product lot information, for example, with the management information including unique data regarding product lot information. The operation-management data (equipment data) of the production machines $12_i$, $12_{i+1}$, $12_{i+2}$, $12_{i+3}$, . . . linked with the management information are stored in the management database 15 with a common format.

Not shown in the drawing, as with FIG. 1, the data acquisition units $13_i$, $13_{i+1}$, $13_{i+2}$, $13_{i+3}$, . . . are connected to the management server 14a via a MES LAN. Alternatively, in addition to the MES LAN, an EES LAN may be established to connect them to each other. In addition, the control server 11a may have the functionality of a MES server to constitute a group of factory managing systems, which link an ERP package or a head office business system with a group of control systems that control machines in a factory, as described in the first embodiment. Therefore, although not shown in the drawing, the production machines $12_i$, $12_{i+1}$, $12_{i+2}$, $12_{i+3}$, . . . are mutually connected to the control server 11a via the MES LAN. Furthermore, although wiring is not shown in FIG. 7, analyzed results and determination results provided by the management server 14b are fed back to the control server 11a, and individual specific processing commands (job commands) are transmitted to the respective production machines $12_i$, $12_{i+1}$, $12_{i+2}$, $12_{i+3}$, . . . from the control server 11a, which has the functionality of the MES server. Note that a plurality of control servers may be physically provided instead of the single control server 11a exemplified in FIG. 7, as with the process-state management system according to the first embodiment.

The plurality of production machines $12_i$, $12_{i+1}$, $12_{i+2}$, $12_{i+3}$, . . . may include, for example, various semiconductor production machines, such as an ion implanter, a diffusion furnace, a thermal oxidation furnace for forming a silicon oxide film ($SiO_2$), a CVD furnace for depositing an $SiO_2$ film, a PSG film, a BSG film, a BPSG film, a silicon nitride ($Si3N4$) film, a polysilicon film or related films, an annealing furnace for depositing a PSG film, a BSG film, a BPSG film or related films through reflow processing (melting), an annealing furnace for densifying a CVD oxide film or related films, an annealing furnace for forming a silicide film or related films, a sputtering equipment or a vacuum evaporator for depositing a metallic interconnect layer, a plating equipment for forming a metallic interconnect layer through plating, a CMP machine for polishing the surface of a semiconductor substrate, a dry/wet etching equipment for etching the surface of a semiconductor substrate, a cleaning equipment for removing resist film or cleaning the surface of a semiconductor substrate using an aqueous solution, a spin coating machine (spinner) for coating a resist film on the surface of a semiconductor substrate so as to implement photolithography, an exposure tool such as a stepper, a dicing machine for dicing a semiconductor into a plurality of semiconductor chips, and a bonding machine for connecting electrodes of a diced chip-shaped semiconductor device to corresponding pads on a lead frame. The production machines $12_i$, $12_{i+1}$, $12_{i+2}$, $12_{i+3}$, . . . further include various inspection tools and measuring tools, such as an interference film thickness gauge, an ellipsometer, a contact type film thickness gauge, a microscope, or a resistance measuring tool. Furthermore, incidental facilities, such as an ultrapure water system or a gas purifier may be included. In addition, the production machines $12_i$, $12_{i+1}$, $12_{i+2}$, $12_{i+3}$, . . . may include both batch type machines and single wafer type machine. Similarly, the batch type machine or the single wafer type machine may be applied to all of the production machines in the embodiments described later.

For example, if the production machines $12_i$, $12_{i+1}$, $12_{i+2}$, $12_{i+3}$, . . . are assumed to be machines each having a chamber, such as vacuum processing equipment for forming a thin film, a diffusion furnace, and a thin-film deposition reactor, the data acquisition units $13_i$, $13_{i+1}$, $13_{i+2}$, $13_{i+3}$, . . . receive pieces of operation-management data (equipment data), such as temperatures at respective different points in the chamber, temperature of a susceptor disposed in the chamber, temperatures at respective different points on the chamber outer walls, pressure in the chamber, gas flow rate introduced in the chamber, and valve conductance (angle of rotation) for controlling gas flow rate, and then transmit the operation-management data to the management server 14a at predetermined timings (periodically). If the production machines $12_i$, $12_{i+1}$, $12_{i+2}$, $12_{i+3}$, . . . are assumed to be plasma-process related machines having discharge electrodes, such as a dry etching equipment or an ion implanter, the data acquisition units $13_i$, $13_{i+1}$, $13_{i+2}$, $13_{i+3}$, . . . receive pieces of operation-management data (equipment data), such as information of RF impedance-matching positions, RF voltages (voltages of incident and reflected waves), and information of wafer positions in addition to the aforementioned various parameters for vacuum processing, and then transmit the operation-management data to the management server 14a at predetermined timings (periodically). In addition, if the production machines $12_i$, $12_{i+1}$, $12_{i+2}$, $12_{i+3}$, . . . are a wet etching equipment, a spin coating machine, an exposure tool, and a bonding machine, which perform processing under atmospheric pressure, the data acquisition units $13_i$, $13_{i+1}$, $13_{i+2}$, $13_{i+3}$, . . . receive pieces of operation-management data (equipment data), such as information of processing times and information of wafer or chip positions, and then transmit the operation-management data to the management server 14a at predetermined timings (periodically).

FIGS. 9A, 10A, and 11A are tables representing operation-management data (equipment data) with a common format for three different processes. FIG. 9A is a table representing common format data for a photolithography process. FIG. 10A is a table representing common format data for a CVD (deposition) process. FIG. 11A is a table representing common format data for a spike-annealing process. In FIGS. 9A, 10A, and 11A, a set of "records", data for each of records are aligned along horizontal rows, represent respective times when the data acquisition units $13_i$, $13_{i+1}$, $13_{i+2}$, $13_{i+3}$, . . . have received data. FIG. 9A is a table representing the operation-management data (equipment data) for the photolithography process with item names such as "autofocus" as a machine parameter A, "monitored exposure value" as machine parameter B, "baking-stage temperature" as machine parameter C, "shot number" as machine parameter D, "recipe step" as machine parameter E, "time in step" as machine parameter F, . . . . Data for each of machine parameters A-F are recorded along vertical columns of FIG. 9A as "field". Then, each of records represents a collection of information about a separate field, and a collection of records that contain the same set of fields defines the table shown in FIG. 9A.

FIG. 10A is a table representing the operation-management data (equipment data) for the CVD (deposition) process with item names such as "heater temperature" as machine parameter A, "low amount of gas A" as machine parameter B, "chamber pressure" as machine parameter C, "recipe step" as machine parameter D, . . . , which are recorded so as to constitute a set of fields.

Furthermore, FIG. 11A is a table representing the operation-management data (equipment data) for the spike-annealing process with item names such as "pyrometer value" as machine parameter A, "stage rotation" as machine parameter B, "lamp power" as machine parameter C, "flow amount of gas A" as machine parameter D, . . . , which are recorded so as to constitute a set of fields.

For the photolithography process of FIG. 9A, data including a mean (average value) of Shot 1 of the machine parameter C (or the baking-stage temperature) being 65 degrees Centigrade, a deviation of Shot 1 of the machine parameter C being 0.2 degrees Centigrade and the like are provided as pretreatments (characteristic values) as shown in FIG. 9B. For the CVD (deposition) process of FIG. 10A, data including a mean (average value) of recipe 3 of the machine parameter B (or the flow amount of gas A) being 12.5 sccm and a deviation of the recipe 3 of the machine parameter C (or the chamber pressure) being 13 Pa are provided as pretreatments (characteristic value) as shown in FIG. 10B. For the spike-annealing process of FIG. 11A, data including a mean (average value) of the steps 1 and 2 of the machine parameter C (lamp power) being 1100 degrees Centigrade and a deviation within one sec of the step 2 of the machine parameter C being 3 degrees Centigrade are provided as pretreatments (characteristic values) as shown in FIG. 11B.

As shown in FIGS. 9A, 10A, and 11A, since the operation-management data (equipment data) acquired by the data acquisition units are transformed into a common format as a set of records representing respective acquired times, the pieces of operation-management data (equipment data) of respective production machines used in different processes may be stored in the relational database with the acquired times when the data acquisition units have acquired as a main key. FIGS. 9A, 10A, and 11A show exemplary table formats. Alternatively, various table formats are available as long as they are common to all production machines.

The CPU of the management server $14b$ in the process-state management system, according to the second embodiment, further includes a plurality of FDC application execution modules $143_j$, $143_{j+1}$, $143_{j+2}$, . . . . Each of the FDC application execution modules $143_j$, $143_{j+1}$, $143_{j+2}$, . . . is used as a common analysis application to collectively analyze and monitor the operation states of respective production machines $12_i$, $12_{i+1}$, $12_{i+2}$, $12_{i+3}$, . . . , and issue an instruction to shut down a specific production machine in real time if deviation in performance of the specific production machine may adversely influence product yields, thereby reducing risk to wafers. Alternatively, any one of applications in the plurality of FDC application execution modules $143_j$, $143_{j+1}$, $143_{j+2}$, . . . may be elected as a common analysis application to collectively analyze and monitor the plurality of production machines $12_i$, $12_{i+1}$, $12_{i+2}$, $12_{i+3}$, . . . . Alternatively, two or more of applications in the plurality of FDC application execution modules $143_j$, $143_{j+1}$, $143_{j+2}$, . . . may be combined and used as a common analysis application to collectively analyze and monitor the plurality of production machines $12_i$, $12_{i+1}$, $12_{i+2}$, $12_{i+3}$, . . . . The plurality of FDC application execution modules $143_j$, $143_{j+1}$, $143_{j+2}$, . . . may be implemented by software programs or dedicated hardware such as logic circuits. More specifically, FDC programs to instruct and control the plurality of FDC application execution modules $143_j$, $143_{j+1}$, $143_{j+2}$, . . . are stored in an application program memory 16 connected to the CPU of the management server $14b$.

As described above, according to the process-state management system of the second embodiment, since a common FDC application may collectively monitor the plurality of production machines $12_i$, $12_{i+1}$, $12_{i+2}$, $12_{i+3}$, . . . in real time, a unified fault detecting method or a unified automatic fault analyzing method may be used for monitoring many production machines of different machine venders.

In other words, even if many production machines of different machine venders constitute a fabrication line in a factory, a fault detecting or an automatic fault analyzing application is not needed for each production machines, resulting in omission of additional investment.

Furthermore, since the operation-management data for all production machines $12_i$, $12_{i+1}$, $12_{i+2}$, $12_{i+3}$, . . . required for abnormality detection and automatic analysis is kept (stored) in a management database 15 with a common format independent of the production machines $12_i$, $12_{i+1}$, $12_{i+2}$, $12_{i+3}$, . . . and the data acquisition units $13_i$, $13_{i+1}$, $13_{i+2}$, $13_{i+3}$, . . . connected thereto, the operation-management data for all production machines $12_i$, $12_{i+1}$, $12_{i+2}$, $12_{i+3}$, . . . can be retrieved from the management database 15 at a high speed as needed. In addition, the FDC applications used for the process-state management system, according to the first embodiment, may be freely replaced. Even with replacement with any kind of FDC application, it is used as a common analysis application to collectively analyze and monitor the operation states of respective production machines $12_i$, $12_{i+1}$, $12_{i+2}$, $12_{i+3}$, . . . . However, if deviation in performance of a specific production machine thereof may adversely influence product yields, an instruction to stop (shut down) the specific production machine may be issued.

The CPU of the management server $14b$ in the process-state management system, according to the first embodiment, further includes a plurality of PSC application execution modules $144_k$, $144_{k+1}$, $144_{k+2}$, . . . , which execute applications for various models such as multivariable model prediction. Each of the PSC application execution modules $144_k$, $144_{k+1}$, $144_{k+2}$, . . . is used as a common analysis application to collectively analyze and control processing recipes for the respective production machines $12_i$, $12_{i+1}$, $12_{i+2}$, $12_{i+3}$, . . . and provide feedback-control and feedforward-control for intra-process (within a process) or inter-process (among processes) implementation, resulting in reduction in production cost, improvement of production efficiency, and real-time correction of arbitrary portions in fabrication processes. Alternatively, an application in the plurality of PSC application execution modules $144_k$, $144_{k+1}$, $144_{k+2}$, . . . may be elected as a common analysis application to collectively analyze and control processing recipes for the plurality of production machines $12_i$, $12_{i+1}$, $12_{i+2}$, $12_{i+3}$, . . . . Alternatively, two or more of applications in the plurality of PSC application execution modules $144_k$, $144_{k+1}$, $144_{k+2}$, . . . may be combined and used as a common analysis application to collectively analyze and control the processing recipes for the plurality of production machines $12_i$, $12_{i+1}$, $12_{i+2}$, $12_{i+3}$, . . . . The PSC application execution modules $144_k$, $144_{k+1}$, $144_{k+2}$, . . . may correspond to APC applications. They may be software programs, or dedicated hardware. More specifically, a plurality of APC programs to instruct and control the plurality of PSC application execution modules $144_k$, $144_{k+1}$, $144_{k+2}$, . . . may be stored in the application program memory 16 connected to the management server $14b$.

Furthermore, since the operation-management data for all production machines $12_i$, $12_{i+1}$, $12_{i+2}$, $12_{i+3}$, . . . required for controlling processing recipes are stored in the management database 15 with a common format independent of the production machines $12_i$, $12_{i+1}$, $12_{i+2}$, $12_{i+3}$, . . . and the data acquisition units $13_i$, $13_{i+1}$, $13_{i+2}$, $13_{i+3}$, . . . connected thereto, the common-format-transformed operation-management data may be retrieved from the management database 15 at a high speed as needed. In addition, the PSC applications may be freely replaced. Even with replacement with any kind of PSC application, it is used as a common analysis application to collectively analyze and control processing recipes for the production machines $12_i$, $12_{i+1}$, $12_{i+2}$, $12_{i+3}$, . . . or the like and then provide feedback-control and feedforward-control for intra-process (within a process) or inter-process (among processes) implementation, resulting in reduction in production cost, improvement of production efficiency, and real-time correction of arbitrary portions in fabrication processes.

Moreover, the operation-management data (equipment data) inherent in each production machines stored in the management database 15 with a common format may be statistically analyzed using an EES application and may be used to improve the effective operation rate of production machines inside and outside of a factory and maintain or improve the performances of the production machines. Furthermore, since such data may be used in TCAD or YMS, the final yield of a semiconductor device may be estimated in intermediate processing prior to completion of the final processing. Needless to say, the management server 14b includes an input unit used for an operator to enter data and instructions, an output unit for outputting analyzed results, a display unit, and data memory configured to be stored with intermediate data required for analyzing each of the production machines $12_i, 12_{i+1}, 12_{i+2}, 12_{i+3}, \ldots$, which are omitted in FIG. 7. The input unit of the management server 14b may be implemented by a keyboard, a mouse, a light pen, or a flexible disk unit. A process manager (factory manager) may use the input unit to specify input/output data, and change an application to be used. In addition, the input unit allows entry of a model to be used for analysis, and also entry of commands for executing or aborting operation. The output unit and the display unit may be implemented by a printer and a display, respectively. Alternatively, the display unit may display input/output data, analyzed results, abnormal/normal state, and analysis parameters to allow the factory manager to collectively monitor the operation states of the production machines $12_i, 12_{i+1}, 12_{i+2}, 12_{i+3}, \ldots$.

Figure 8:
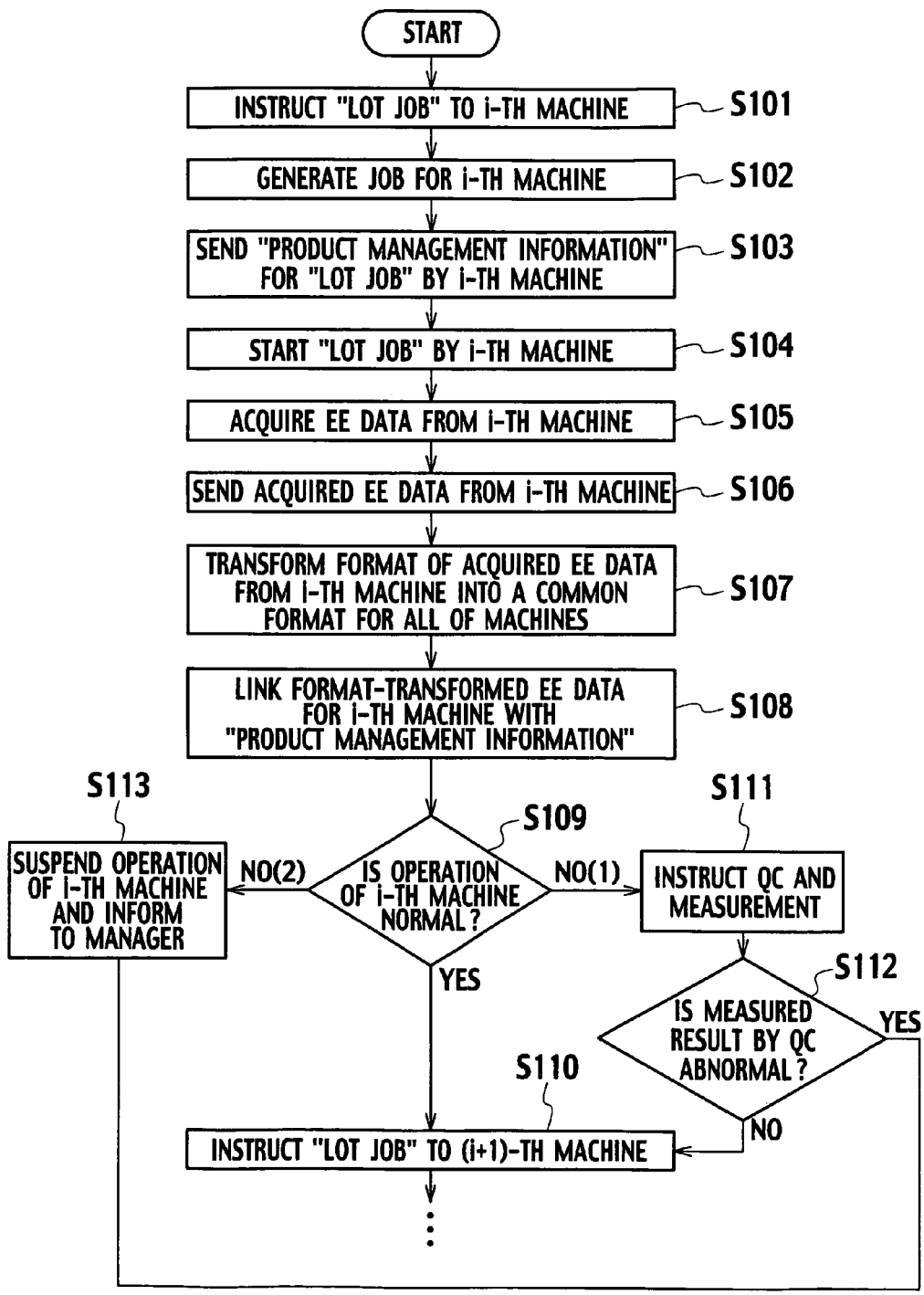
FIG. 8 is a flowchart describing an outline of a process-state management method according to the second embodiment of the present invention.

A process-state management method, according to the second embodiment of the present invention, is described using a flowchart shown in FIG. 8. Note that the process-state management method according to the second embodiment described below is represented by a flowchart regarding the i-th production machine $12_i$ of the production machines $12_i, 12_{i+1}, 12_{i+2}, 12_{i+3}, \ldots$ constituting a fabrication line in a factory. Similarly, flowcharts regarding the (i−1)-th production machine $12_{i-1}$, the (i+1)-th production machine $12_{i+1}$, the (i+2)-th production machine $12_{i+2}$, the (i+3)-th production machine $12_{i+3}, \ldots$ may be shown. In addition, the flowchart shown in FIG. 8 is a mere example, and needless to say, various process-state management methods including modifications thereof are available.

(a) In a step S101, a lot processing command (job command) for the production machine $12_i$ is first transmitted from the control server 11a. In a step S102, the production machine $12_i$ then generates a job for the production machine $12_i$ and transmits a job generation report for the production machine $12_i$ to the control server 11a.

(b) Once the job generation report for the production machine $12_i$ is transmitted to the control server 11a in the step S102, the control server 11a transmits lot management information for the processing executed by the production machine $12_i$ to the management server 14b in a step S103.

(c) On the other hand, in a step S104, the production machine $12_i$ starts corresponding lot processing, such as lithography, etching, thermal treatment, ion implantation, CVD, sputtering, deposition, and cleaning in conformity with a predetermined recipe. The predetermined recipe is managed by the control server 11a.

(d) Once lot processing starts in the step S104, the data acquisition unit $13_i$ connected to the production machine $12_i$ starts collecting the operation-management data (equipment data) of the production machine $12_i$ in conformity with DCP, which is characteristic to the production machine $12_i$, and the corrected data are temporarily stored in a storage unit of the data acquisition unit $13_i$ in a step S105.

(e) Afterwards, the data acquisition unit $13_i$ transmits the collected operation-management data (equipment data) of the production machine $12_i$ to the format transformer 141 in the CPU of the management server 14b at a predetermined tiling (in a step S106). Once the operation-management data (equipment data) of the production machine $12_i$ is transmitted to the format transformer 141 in the step S106, the format transformer 141 transforms the format for the transmitted operation-management data (equipment data) of the production machine $12_i$ into a common format for all production machines as shown in FIGS. 9A, 9B, 10A, 10B, 11A and 11B in a step S107.

(f) The data-linking module 142 in the CPU of the management server 14b then links the format-transformed operation-management data (equipment data) of the production machine $12_i$ with the lot management information transmitted from the control server 11a in a step S108. The operation-management data (equipment data) of the production machine $12_i$ linked with the lot management information by the data-linking module 142 are stored in the management database 15 as operation-management data with the common format. Alternatively, the data may be temporarily stored in main memory (data memory) or cache memory of the management server 14b instead of the management database 15.

(g) On the other hand, the management server 14b preselects the most appropriate FDC application execution module from a group of FDC application execution modules $143_j, 143_{j+1}, 143_{j+2}, \ldots$ installed in the CPU of the management server 14b as a common module for collectively monitoring the plurality of production machines $12_i, 12_{i+1}, 12_{i+2}, 12_{i+3}, \ldots$ in real time. According to the process-state management method of the second embodiment, it is assumed that the FDC application execution module $143_j$ is selected. In a step S109, the FDC application execution module $143_j$ reads out the operation-management data (equipment data) of the production machine $12_i$ from the management database 15, and then determines whether or not the production machine $12_i$ is operating normally. For example, if the production machine $12_i$ is a production machine having a chamber, such as a vacuum evaporator or sputtering equipment for depositing thin film, a diffusion furnace, or a thin-film deposition reactor, temperatures in a plurality of regions in the chamber (first machine parameter), temperature of a susceptor disposed in the chamber (second machine parameter), temperatures in a plurality of regions on the chamber outer walls (third machine parameter), pressure in the chamber (fourth machine parameter), gas flow rate flowing into the chamber (fifth machine parameter), and valve conductance for controlling the gas flow rate (sixth machine parameter) are compared with respective predetermined normal values.

(h) In the step S109, if the FDC application execution module $143_j$ determines that all of the first to sixth machine parameters of the operation-management data (equipment data) of the production machine $12_i$ fall within the criterions of the respective predetermined values, processing proceeds to a step S110 in which the (i+1)-th processing subsequent to processing conducted by the i-th production machine $12_i$ is carried out. In other words, the control server 11a transmits a lot processing command (job command) for the (i+1)-th processing to the (i+1)-th production machine $12_{i+1}$.

(i) On the other hand, in the step S109, if the FDC application execution module $143_j$ determines that more than one of the first to sixth machine parameters of the operation-management data (equipment data) of the production machine $12_i$ do not fall within the criterions of the respective predetermined values, processing proceeds to a step S111 or a S113. Determination of whether to proceed to the step S111 or S113 should be made based on a criterion such as the degree of deviations in the first to sixth machine parameters from corresponding respective reference values, or a criterion of whether multiple parameters of the first to sixth machine parameters are abnormal. As already explained in the description related to the flow chart shown in FIG. 2, in general, the transition timing from the step S109 to the step S111 differs from the transition timing from the step S109 to the step S113. The transition from the step S109 to the step S113 is a real-time process so as to suspend (shut down) the operation of the production machine $12_i$ when the abnormality is detected. On the contrary, the transition timing from the step S109 to the step S111 is performed after the timing when the subject lot process is completed, establishing instruction of QC or measurement for QC by the instruction. In the step S111, measurement for QC is instructed and then conducted. "Measurement for QC", in the case of a CVD furnace means measurement of thickness of a thin film deposited by the CVD furnace, for example. If the measurement for QC in the step S111 reveals it to fall within a predetermined range, processing proceeds to the step S110 in which a lot processing command is then transmitted to the (i+1)-th production machine $12_{i+1}$. Otherwise, if the measurement for QC in the step S111 reveals it to be out of the predetermined range, processing proceeds to a step S113 in which the control server 11a transmits an instruction to suspend (shut down) the operation of the production machine $12_i$. In addition, necessary incidental processing such as notifying the abnormality to a manager of the production machine $12_i$ is carried out at the same time. As described above, the operation state of production machine $12_i$ is always monitored, and is shut down before the deviation of the operation-management data (equipment data) of the production machine $12_i$ from the reference values may adversely influence product yields, thereby reducing risk to wafers.

Similarly, the common FDC application execution module $143_j$ may always collectively monitor the other production machines $12_i$, $12_{i+1}$, $12_{i+2}$, $12_{i+3}$, . . . constituting a fabrication line in a factory, and suspend (shut down) a specific production machine thereof before deviation of the pieces of operation-management data (equipment data) of the respective production machines $12_i$, $12_{i+1}$, $12_{i+2}$, $12_{i+3}$, . . . from the corresponding respective reference values may adversely influence product yields, thereby reducing risk to wafers.

As such, according to the process-state management method of the second embodiment of the present invention, processing in the steps S101 through S113 may be sequentially applied to the production machines $12_i$, $12_{i+1}$, $12_{i+2}$, $12_{i+3}$, . . . and processing executed by the plurality of production machines $12_i$, $12_{i+1}$, $12_{i+2}$, $12_{i+3}$, . . . may be controlled sequentially based on results of analyzing using the common analysis application by the management server 14b. Here, "management" includes state changing such as forced suspension or temporary suspension of the operation of a specific production machine among the plurality of production machines $12_i$, $12_{i+1}$, $12_{i+2}$, $12_{i+3}$, . . . based on the analyzed results. In addition, provision of feedback-control and/or feedforward-control for intra-process (within a process) or inter-process (among processes) implementation is included. Note that with the process-state management system, the management server, the process-state management method, and the process-state management program according to the second to sixth embodiments of the present invention, the term "management" includes feedback-control and feedforward-control.

A program having an algorithm equivalent to the series of procedures according to the process-state management method shown in FIG. 8 may be executed to control the process-state management system in FIG. 7. The program should be stored in both program memories (not shown in the drawing) of the control server 11a and the management server 14b constituting the process-state management system, according to the second embodiment of the present invention. In addition, once the program is stored in a computer readable recording medium, and the content of the recording medium is read out to the program memories of the control server 11a and the management server 14b, the procedure according to the process-state management method of the second embodiment of the present invention may be executed. A "computer readable recording medium" means a medium such as an external memory of a computer, semiconductor memory, a magnetic disk, an optical disk, a MO disk, or a magnetic tape, which may be stored with programs. More specifically, a "computer readable recording medium" may be a flexible disk, a CD-ROM, a cassette tape, or an open reel tape. For example, the main bodies of the control server 11a and the management server 14b may be structured so that a flexible disk drive and an optical disk drive are either incorporated or externally connected. Inserting a flexible disk into the flexible disk drive or a CD-ROM into the optical disk drive and conducting a predetermined read-out operation allows installation of programs stored in those recording media in the program memories of the control server 11a and the management server 14b. In addition, connection of a predetermined drive unit allows use of ROM. Furthermore, the program may be stored in the program memory via an information-processing network such as the Internet.

For example, a process-state management program required for controlling the management server 14b includes:

(a) Instructions configured to cause the data-linking module 142 to command the control server 11a to transmit lot management information for the processing executed by the specified production machine $12_i$ to the data-lining module 142 in the management server 14b;

(b) Instructions configured to cause the data-lining module 142 to receive the lot management information for the processing executed by the specified production machine $12_i$ corresponding to the step S103 of FIG. 8 (after the control server 11a transmits the lot management information for the processing executed by the specified production machine $12_i$ to the data-lining module 142 in conformity with the aforementioned command);

(c) Instructions configured to cause the format transformer 141 in the management server 14b to receive the operation-management data of the specified production machine $12_i$, which corresponds to the step S106 of FIG. 8, and transform the operation-management data into a common format in the step S107 of FIG. 8;

(d) Instructions configured to cause the data-linking module 142 in the management server 14b to link the format-transformed operation-management data with the lot management information in the step S108 of FIG. 8; and (e) Instructions configured to cause the FDC application execution module $143_j$ in the management server 14b to analyze the linked operation-management data using the common analysis application in the steps S109 through S113 of FIG. 8.

The series of instructions are applied sequentially to a set of the lot management information and the operation-management data transmitted from the plurality of production machines $12_i$, $12_{i+1}$, $12_{i+2}$, $12_{i+3}$, . . . . Analysis in the steps S109 through S113 of FIG. 8 is then conducted. The analyzed results allow the management server 14b to control processes carried out by the plurality of production machines $12_i$, $12_{i+1}$, $12_{i+2}$, $12_{i+3}$, . . . .

(First Modification of the Second Embodiment)

Figure 12:
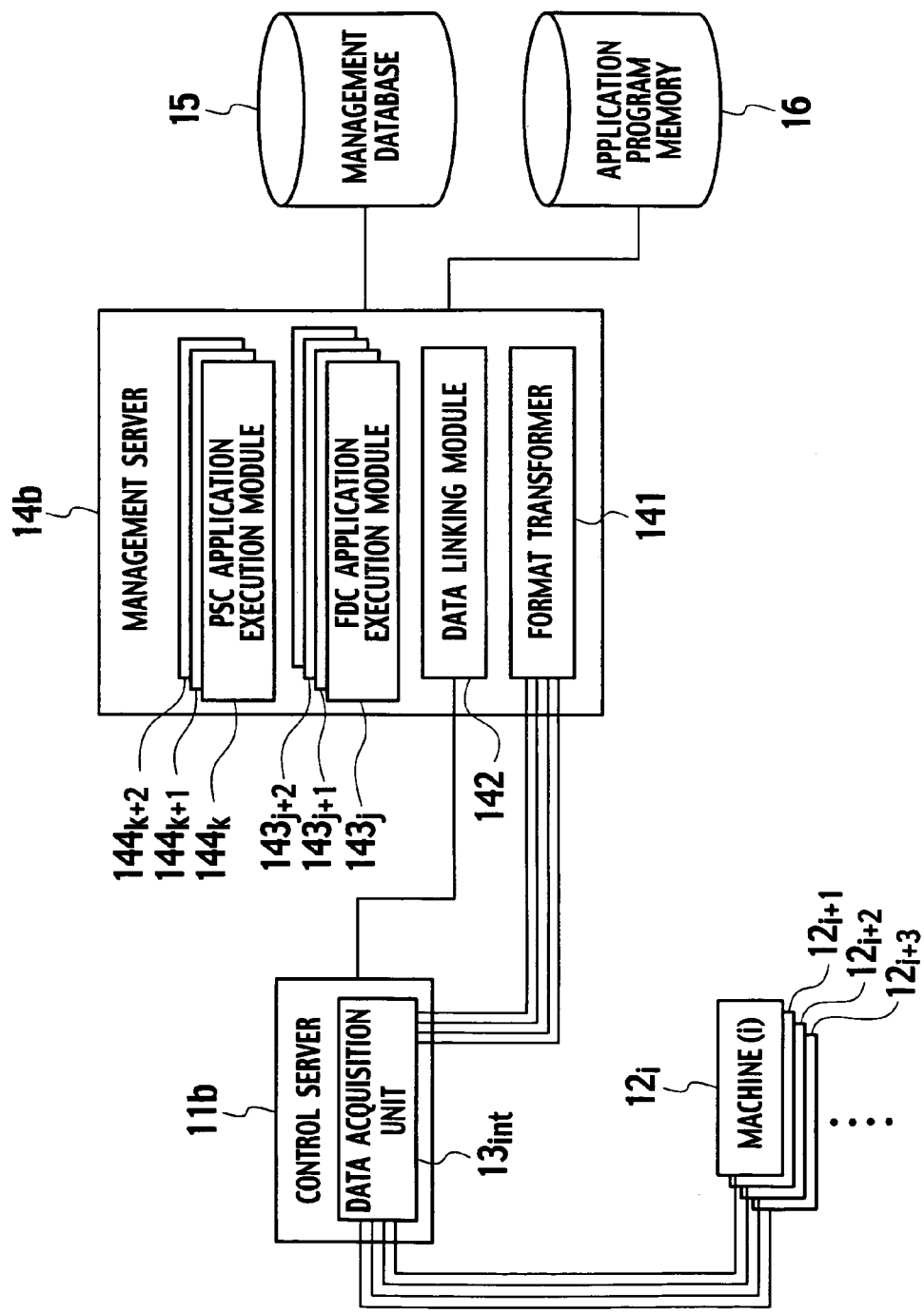
FIG. 12 is a schematic diagram showing an outline of a process-state management system according to a first modification of the second embodiment of the present invention.

With nearly the same configuration as the configuration shown in FIG. 7, a process-state management system, according to a first modification of the second embodiment of the present invention shown in FIG. 12, encompasses a plurality of production machines $12_i$, $12_{i+1}$, $12_{i+2}$, $12_{i+3}$, ..., a control server 11b configured to collectively control operations of the respective production machines $12_i$, $12_{i+1}$, $12_{i+2}$, $12_{i+3}$, ..., a management server 14b configured to receive operation-management data (equipment data), which includes descriptions of operation statuses and machine parameters of respective production machines $12_i$, $12_{i+1}$, $12_{i+2}$, $12_{i+3}$, ..., and monitor corresponding operation states of the respective production machines $12_i$, $12_{i+1}$, $12_{i+2}$, $12_{i+3}$, ... in real time, and a management database 15 storing pieces of operation-management data (equipment data) of the respective production machines $12_i$, $12_{i+1}$, $12_{i+2}$, $12_{i+3}$, ....

Note that according to the configuration shown in FIG. 7, the production machines $12_i$, $12_{i+1}$, $12_{i+2}$, $12_{i+3}$, ... are connected to a plurality of data acquisition units $13_i$, $13_{i+1}$, $13_{i+2}$, $13_{i+3}$, ..., which acquire pieces of operation-management data (equipment data) of the respective production machines $12_i$, $12_{i+1}$, $12_{i+2}$, $12_{i+3}$, ... in conformity with their own DCPs, and then transmit the operation-management data to the management server 14a at predetermined timings (periodically). Alternatively, according to the process-state management system of the first modification of the second embodiment of the present invention shown in FIG. 12, the data control server 11b includes a data acquisition unit $13_{int}$, which receives pieces of operation-management data (equipment data) of production machines $12_i$, $12_{i+1}$, $12_{i+2}$, $12_{i+3}$, ... in conformity with their own DCPs, and then transmits them to the management server 14b at predetermined timings (periodically).

With nearly the same configuration as the configuration shown in FIG. 7, the control server 11b in the process-state management system, according to the first modification of the second embodiment of the present invention shown in FIG. 12, may have the functionality of a MES server to constitute a group of factory management systems, which link an ERP package or a head office business system with a group of control systems that control machines in a factory. Therefore, although not shown in the drawing, the production machines $12_i$, $12_{i+1}$, $12_{i+2}$, $12_{i+3}$, ..., the control server 11b, and the management server 14b are connected to each other via a communication network (MES LAN).

Analyzed results and determination results provided by the management server 14b are fed back to the control server 11b via the communication network (MES LAN), and individual specific processing commands gob commands) are transmitted to the respective production machines $12_i$, $12_{i+1}$, $12_{i+2}$, $12_{i+3}$, ... from the control server 11b, which has the functionality of the MES server. Note that, needless to say, a plurality of control servers may be physically provided via the communication network (MES LAN) instead of the single control server 11b exemplified in FIG. 12, as described in FIG. 7.

For example, if the production machines $12_i$, $12_{i+1}$, $12_{i+2}$, $12_{i+3}$, ... are assumed to be machines each having a chamber, such as vacuum processing equipment for forming a thin film, a diffusion furnace, and a thin-film deposition reactor, the data acquisition unit $13_{int}$ receives pieces of operation-management data (equipment data), such as temperatures at respective different points in the chamber, temperature of a susceptor disposed in the chamber, temperatures at respective different points on the chamber outer walls, pressure in the chamber, gas flow rate introduced in the chamber, and valve conductance (angle of rotation) for controlling gas flow rate, and then transmit the operation-management data to the management server 14a at predetermined timings (periodically). If the production machines $12_i$, $12_{i+1}$, $12_{i+2}$, $12_{i+3}$, ... are assumed to be plasma-process related machines having discharge electrodes, such as a dry etching equipment or an ion implanter, the data acquisition unit $13_{int}$ receives pieces of operation-management data (equipment data), such as information of RF impedance-matching positions, RF voltages (voltages of incident and reflected waves), and information of wafer positions in addition to the aforementioned various parameters for vacuum processing, and then transmit the operation-management data to the management server 14a at predetermined timings (periodically). In addition, if the production machines $12_i$, $12_{i+1}$, $12_{i+2}$, $12_{i+3}$, ... are a wet etching equipment, a spin coating machine, an exposure tool, and a bonding machine, which perform processing under atmospheric pressure, the data acquisition unit $13_{int}$ receives pieces of operation-management data (equipment data), such as information of processing times and information of wafer or chip positions, and then transmit the operation-management data to the management server 14a at predetermined timings (periodically).

A CPU of the management server 14b includes a format transformer 141 configured to transform the operation-management data transmitted from the data acquisition unit $13_{int}$ in the control server 11b into the data (operation-management data) having a common format as shown in FIGS. 9A, 9B, 10A and 10B, and a data-linking module 142 configured to link the common-format-transformed operation-management data provided by the format transformer 141 with the management information transmitted from the control server 11a, which is nearly the same configuration as the configuration shown in FIG. 7. The data-linking module 142 links the common-format-transformed operation-management data including unique data regarding product lot information with the management information including unique data regarding product lot information. The operation-management data of the production machines $12_i$, $12_{i+1}$, $12_{i+2}$, $12_{i+3}$, ... linked with the management information are stored in the management database 15 with the common format.

Other functions, configurations, and way of operation are substantially similar to the functions, configurations, way of operation already explained in the descriptions with reference to FIG. 7, overlapping or redundant description may be omitted.

(Second Modification of the Second Embodiment)

Figure 13:
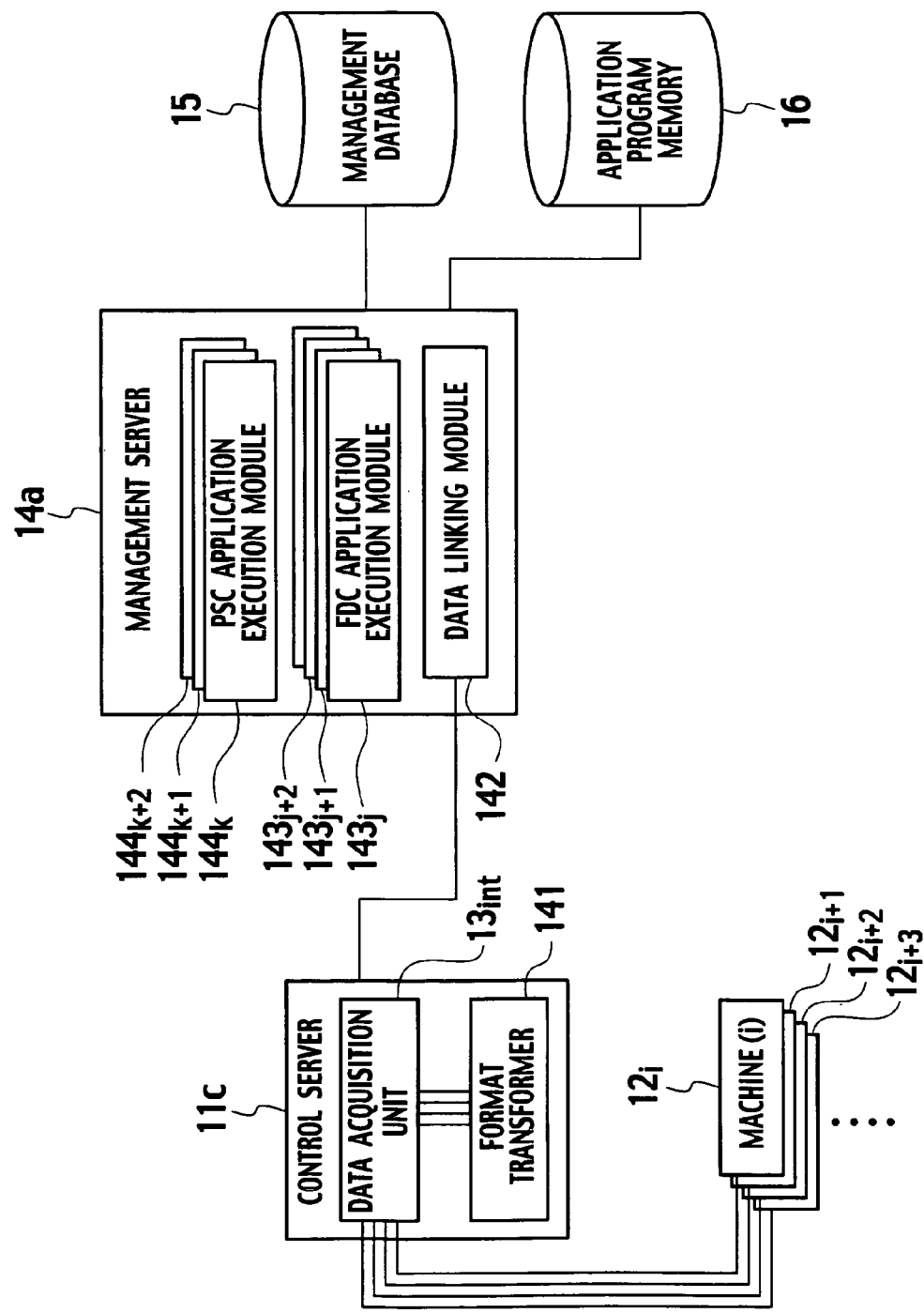
FIG. 13 is a schematic diagram showing an outline of a process-state management system according to a second modification of the second embodiment of the present invention.

With nearly the same configuration as the configuration shown in FIG. 7, a process-state management system, according to a second modification of the second embodiment of the present invention shown in FIG. 13, encompasses a plurality of production machines $12_i$, $12_{i+1}$, $12_{i+2}$, $12_{i+3}$, ..., a control server 11c configured to collectively control operations of the respective production machines $12_i$, $12_{i+1}$, $12_{i+2}$, $12_{i+3}$, ..., a management server 14a configured to receive operation-management data (equipment data) including descriptions of operation statuses and machine parameters of respective production machines $12_i$, $12_{i+1}$, $12_{i+2}$, $12_{i+3}$, ... and monitor corresponding operation states of the respective production machines $12_i$, $12_{i+1}$, $12_{i+2}$, $12_{i+3}$, ... in real time, and a management database 15 storing pieces of operation-management data (equipment data) of the respective production machines $12_i$, $12_{i+1}$, $12_{i+2}$, $12_{i+3}$, . . . .

Note that according to the configuration shown in FIG. 7, the plurality of production machines $12_i$, $12_{i+1}$, $12_{i+2}$, $12_{i+3}$, . . . are connected to respective data acquisition units $13_i$, $13_{i+1}$, $13_{i+2}$, $13_{i+3}$, . . . , which acquire pieces of operation-management data (equipment data) of the respective production machines $12_i$, $12_{i+1}$, $12_{i+2}$, $12_{i+3}$, . . . in conformity with their own DCPs and then transmit the operation-management data to the management server 14a at predetermined timings (periodically). The process-state management system of the second modification of the second embodiment according to the present invention shown in FIG. 13 is different from the configuration shown in FIG. 7 in that the control server 11c includes a data acquisition unit $13_{int}$ and a format transformer 141.

The data acquisition unit $13_{int}$ in the control server 11c collects the pieces of operation-management data (equipment data) of the respective production machines $12_i$, $12_{i+1}$, $12_{i+2}$, $12_{i+3}$, . . . in conformity with their own DCPs, and then transmits them to the format transformer 141 at predetermined timings (periodically). The format transformer 141 transforms the operation-management data transmitted from the data acquisition unit $13_{int}$ into data (operation-management data) having a common format as shown in FIGS. 9A, 9B, 10A and 10B and then transmits the data to the management server 14a.

The management server 14a includes a data-linking module 142 configured to link the operation-management data with the common format provided by the format transformer 141 in the control server 11c with the management information transmitted from the control server 11c, which is nearly the same as the configuration of the process-state management system according to the modification of the first embodiment shown in FIG. 6. There is a difference from the configuration shown in FIG. 6 in that the data-linking module 142 links the operation-management data including unique data regarding product lot information with the management information including unique data regarding product lot information after the transformation to the data with the common format (common-format-transformed operation-management data).

The operation-management data of the production machines $12_i$, $12_{i+1}$, $12_{i+2}$, $12_{i+3}$, . . . linked with the management information by the data-linking module 142 in the management server 14a are stored in the management database 15 with the common format. Other functions, configurations, way of operation are substantially similar to the functions, configurations, way of operation already explained in the descriptions with reference to FIGS. 7 and 12, overlapping or redundant description may be omitted.

(Third Modification of the Second Embodiment)

Figure 14:
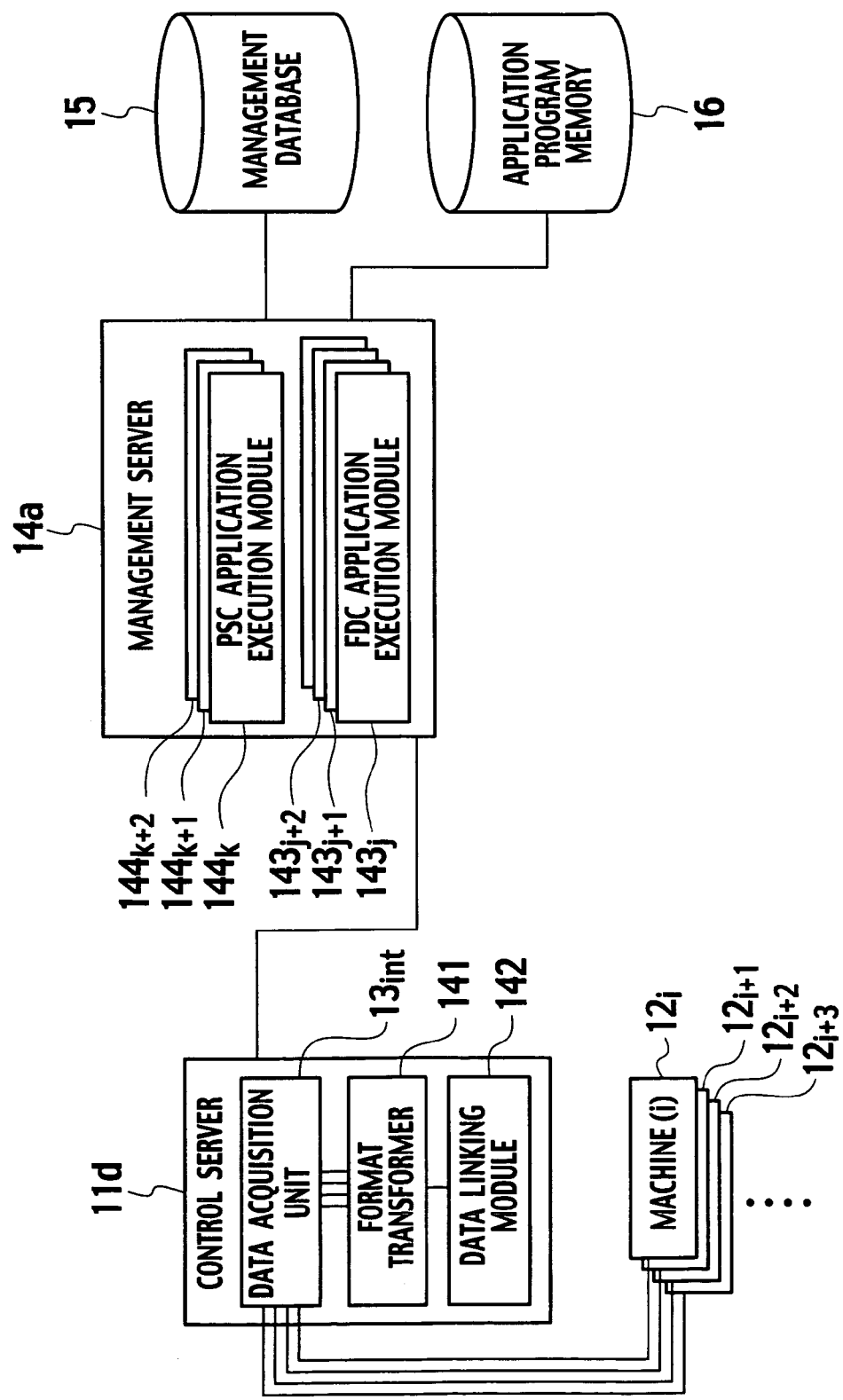
FIG. 14 is a schematic diagram showing an outline of a process-state management system according to a third modification of the second embodiment of the present invention.

With nearly the same configuration as the configuration of the second modification of the second embodiment shown in FIG. 13, a process-state management system, according to a third modification of the second embodiment of the present invention shown in FIG. 14, encompasses a plurality of production machines $12_i$, $12_{i+1}$, $12_{i+2}$, $12_{i+3}$, . . . , a control server 11d configured to collectively control operations of the respective production machines $12_i$, $12_{i+1}$, $12_{i+2}$, $12_{i+3}$, . . . , a management server 14a configured to receive operation-management data (equipment data) including descriptions of operation statuses and machine parameters of respective production machines $12_i$, $12_{i+1}$, $12_{i+2}$, $12_{i+3}$, . . . and monitor corresponding operation states of the respective production machines $12_i$, $12_{i+1}$, $12_{i+2}$, $12_{i+3}$, . . . in real time, and a management database 15 storing pieces of operation-management data (equipment data) of the respective production machines $12_i$, $12_{i+1}$, $12_{i+2}$, $12_{i+3}$, . . . , Note that according to the configuration shown in FIG. 13, although the control server 11c includes a data acquisition unit $13_{int}$ and a format transformer 141, the process-state management system of the third modification of the second embodiment according to the present invention shown in FIG. 14 is different from the configuration shown in FIG. 13 in that the control server 11d further includes a data-linking module 142.

Similar to the process-state management system of the second modification shown in FIG. 1, the data acquisition unit $13_{int}$ in the control server 11d collects the pieces of operation-management data (equipment data) of the respective production machines $12_i$, $12_{i+1}$, $12_{i+2}$, $12_{i+3}$, . . . in conformity with their own DCPs, and then transmits them to the format transformer 141 at predetermined timings (periodically). The format transformer 141 transforms the operation-management data transmitted from the data acquisition unit $13_{int}$ into data (operation-management data) having a common format as shown in FIGS. 9A, 9B, 10A and 10B and then transmits the data to the data-linking module 142. Then, the data-linking module 142 links the format-transformed-operation-management data with the management information, and then the data-linking module 142 transmits the linked data to the management server 14a.

Then, the management server 14a stores the format-transformed-operation-management data of the production machines $12_i$, $12_{i+1}$, $12_{i+2}$, $12_{i+3}$, . . . linked with the management information by the data-linking module 142 into the management database 15. Other functions, configurations, way of operation are substantially similar to the functions, configurations, way of operation already explained in the descriptions with reference to FIGS. 7, 12 and 13, overlapping or redundant description may be omitted.

THIRD EMBODIMENT

As described regarding the process-state management systems, according to the first and second embodiments, since a common FDC application can collectively monitor the plurality of production machines $12_i$, $12_{i+1}$, $12_{i+2}$, $12_{i+3}$, . . . in real time, a synthetic fault detection of production machines may be carried out in different process steps as a whole.

For example, it is assumed that there is a lot having passed through a thin-film CVD process even though the deposition rate in the subject thin-film CVD process is slightly lower than the most appropriate value, but is higher than the lower limit of the criterions of reference values. Here, there may be a case that no abnormality may be detected actually in etching (RIE) process, even if the etching time for the thin film by the etching (RIE) process is slightly longer than the most appropriate value but falls within the criterions of the reference values for the etching (RIE) process. The pass judgement for the etching (RIE) process may be ascribable to the decrease of the etching rate for the thin film. In this case, there is a possibility that the etching rate of the subject etching (RIE) equipment is greatly decreased to be judged as abnormal. In such a case, the earlier method of applying individual FDC applications separately to each of the subject process may not be able to detect abnormality in the etching (RIE) equipment.

According to a process-state management system pertaining to a third embodiment of the present invention described below, the common FDC application is generally applied to different processes executed by a plurality of production machines, facilitating further strict monitoring of production machines statuses in processes mutually relevant to each other, such as a thin-film deposition process and an etching process for the thin film. Such technology is described below.

Figure 15:
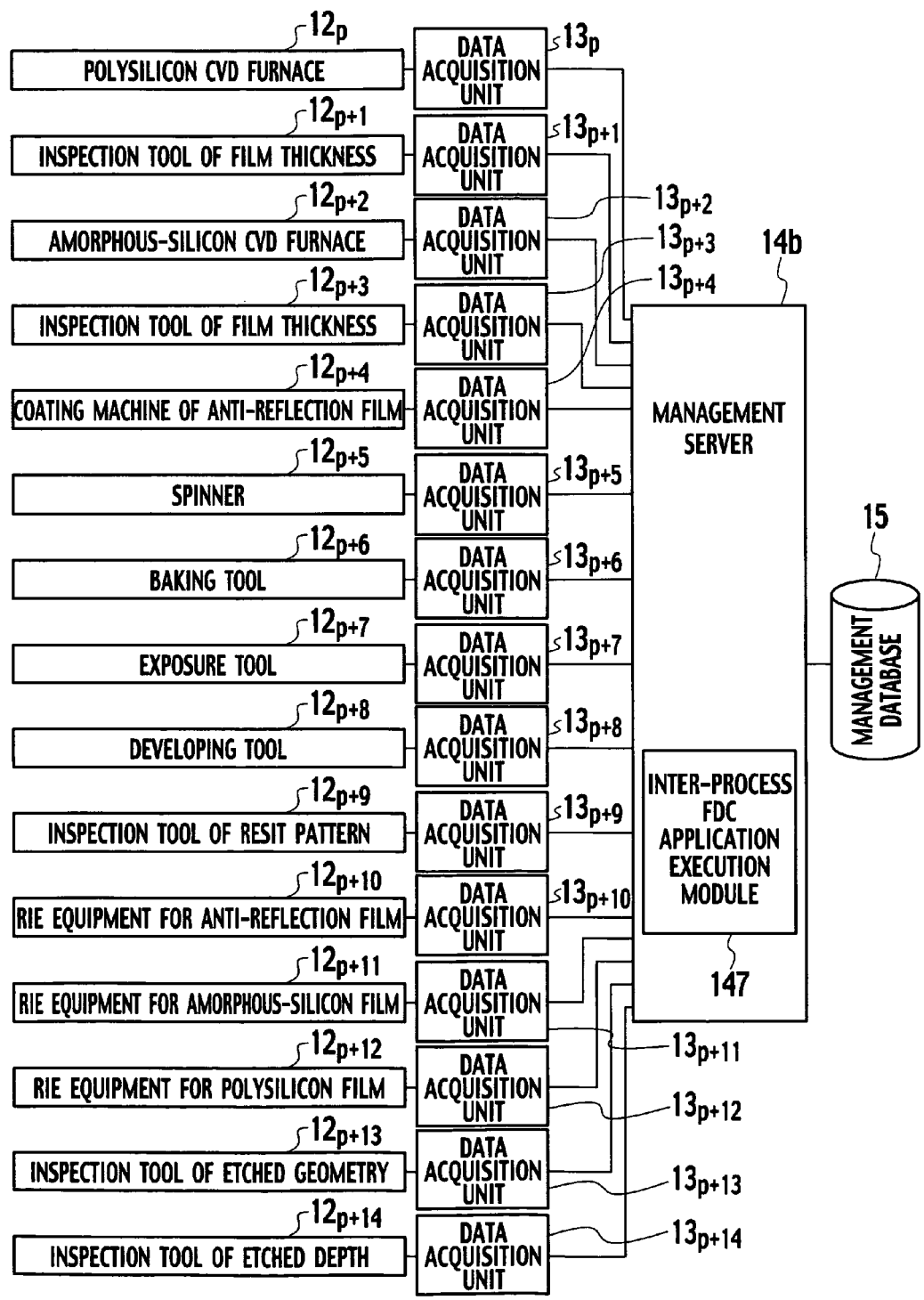
FIG. 15 is a schematic diagram showing an outline of a process-state management system according to a third embodiment of the present invention.

As shown in FIG. 15, the process-state management system, according to the third embodiment of the present invention, encompasses a polysilicon CVD furnace $12_p$, a first film thickness inspection tool $12_{p+1}$, an amorphous silicon CVD furnace $12_{p+2}$, a second film thickness inspection tool $12_{p+3}$, an anti-reflection film coating machine $12_{p+4}$, a spinner $12_{p+5}$, a baking tool $12_{p+6}$, an exposure tool $12_{p+7}$, a developing tool $12_{p+8}$, a resist pattern inspection tool $12_{p+9}$, an anti-reflection film etching equipment $12_{p+10}$, an amorphous silicon etching equipment $12_{p+11}$, a polysilicon etching equipment $12_{p+12}$, an etched geometry inspection tool $12_{p+13}$, an etched depth inspection tool $12_{p+14}$, and a plurality of data acquisition units $13_p$, $13_{p+1}$, $13_{p+2}$, $13_{p+3}$, ... $13_{p+14}$, which acquire pieces of operation-management data (equipment data) of the respective production machines $12_p$, $12_{p+1}$, $12_{p+2}$, $12_{p+3}$, ..., $12_{p+14}$ in conformity with their own DCPs, and then transmit them to a management server 14b at predetermined timings (periodically). The process-state management system, according to the third embodiment, further includes the management server 14b, which is connected to the data acquisition units $13_p$, $13_{p+1}$, $13_{p+2}$, $13_{p+3}$, ... $13_{p+14}$ and monitors the operation states of the respective production machines in real time, and a management database 15, which is connected to the management server 14b and is configured to store the pieces of operation-management data (production machines data) of the respective production machines $12_p$, $12_{p+1}$, $12_{p+2}$, $12_{p+3}$, ..., $12_{p+14}$ as operation-management data with the common format.

Note that as with the process-state management system according to the first and second embodiments, the production machines $12_p$, $12_{p+1}$, $12_{p+2}$, $12_{p+3}$, ..., $12_{p+14}$ are connected to a control server 11a configured to collectively control the operations of the respective production machines $12_p$, $12_{p+1}$, $12_{p+2}$, $12_{p+3}$, ..., $12_{p+14}$ according to the process-state management system of the third embodiment shown in FIG. 15, but the control server is not shown in the drawing. As with the process-state management system according to the first and second embodiments, the plurality of production machines $12_p$, $12_{p+1}$, $12_{p+2}$, $12_{p+3}$, ..., $12_{p+14}$ may be mutually connected via the control server 11a and a MES LAN. As with the description of the first and second embodiments, the number of the control server 11a is not limited to only one. Alternatively, a plurality of control servers may be physically provided. In addition, the plurality of data acquisition units $13_p$, $13_{p+1}$, $13_{p+2}$, $13_{p+3}$, ... $13_{p+14}$ are connected to the management server 14b via the MES LAN. Alternatively, in addition to the MES LAN, an EES LAN may be established to connect them to each other, as described in the first and second embodiments.

As shown in FIG. 15, a CPU of the management server 14b in the process-state management system, according to the third embodiment, includes an inter-process FDC application execution module 147 configured to select at least two or more of production machines $12_p$, $12_{p+1}$, $12_{p+2}$, $12_{p+3}$, ..., $12_{p+14}$, apply the same FDC application as the selected production machines, and generally detect faults in production machines developed during different processes.

Therefore, the CPU of the management server 14b shown in FIG. 15 includes a plurality of FDC application execution modules not shown in the drawing and is capable of selecting execution modules, which can be used as the basics by the inter-process FDC application execution module 147.

Furthermore, as with the process-state management system according to the second embodiment, the CPU of the management server 14b includes a format transformer configured to transform operation-management data transmitted from the data acquisition units $13_p$, $13_{p+1}$, $13_{p+2}$, $13_{p+3}$, ... $13_{p+14}$ into data represented by a common format (common-format-transformed operation-management data), and a data-linking module configured to link the format-transformed-operation-management data by the format transformer with the management information transmitted from a control server, but not shown in the drawing.

The process-state management system according to the third embodiment of the present invention shown in FIG. 15 includes a group of production machines used for a part of long and complex semiconductor device fabrication processes. In other words, only a group of production machines corresponding to the processes shown in FIG. 16, such as a polysilicon CVD process in a step S201, a film thickness inspecting process in a step S202, an amorphous silicon CVD process in a step S203, a film thickness inspecting process in a step S204, an anti-reflection film coating process in a step S205, a photoresist film coating process in a step S206, a photoresist film baking process in a step S207, a photoresist film exposing process in a step S208, a photoresist film developing process in a step S209, a resist pattern inspection process in a step S210, an anti-reflection film etching (RIE) process in a step S211, an amorphous silicon etching (RIE) process in a step S212, a polysilicon etching (RIE) process in a step S213, an etched geometry inspecting process in a step S214, and an etched depth inspecting process in a step S215, is shown. Needless to say, a group of various production machines, such as a first set of production machines for carrying out a sequence of manufacturing processes prior to the step S201 and a second set of production machines for carrying out a sequence of manufacturing processes subsequent to the step S215 can be provided. The second set of production machines may includes an ion implanter (corresponding to an ion implantation process in a step S223), an annealing furnace (corresponding to an activation-annealing process in a step S225), and a CMP machine (corresponding to a CMP process in a step S247).

Figure 16:
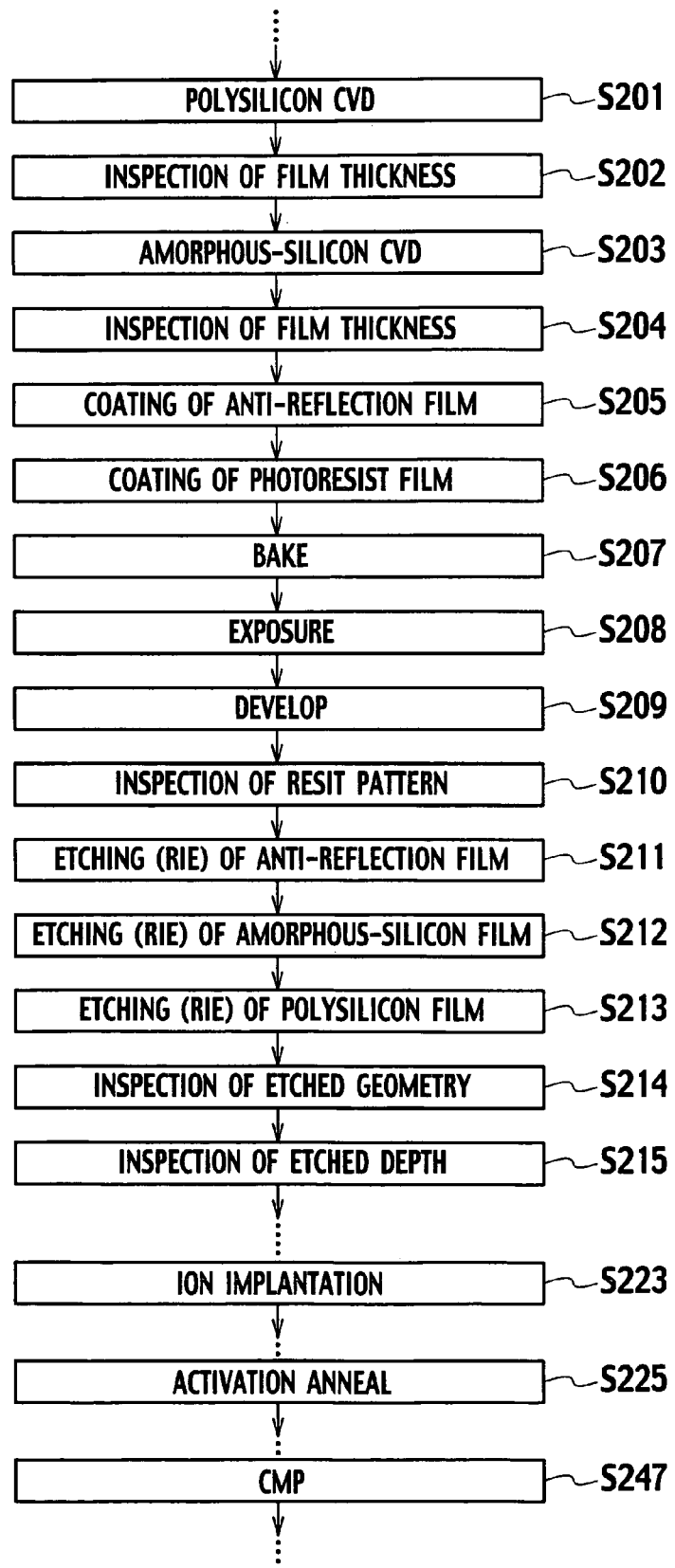
FIG. 16 is a flowchart showing a part of a sequence of manufacturing processes according to a semiconductor device fabrication method to which is applied a process-state management method according to the third embodiment of the present invention.
Figure 17:
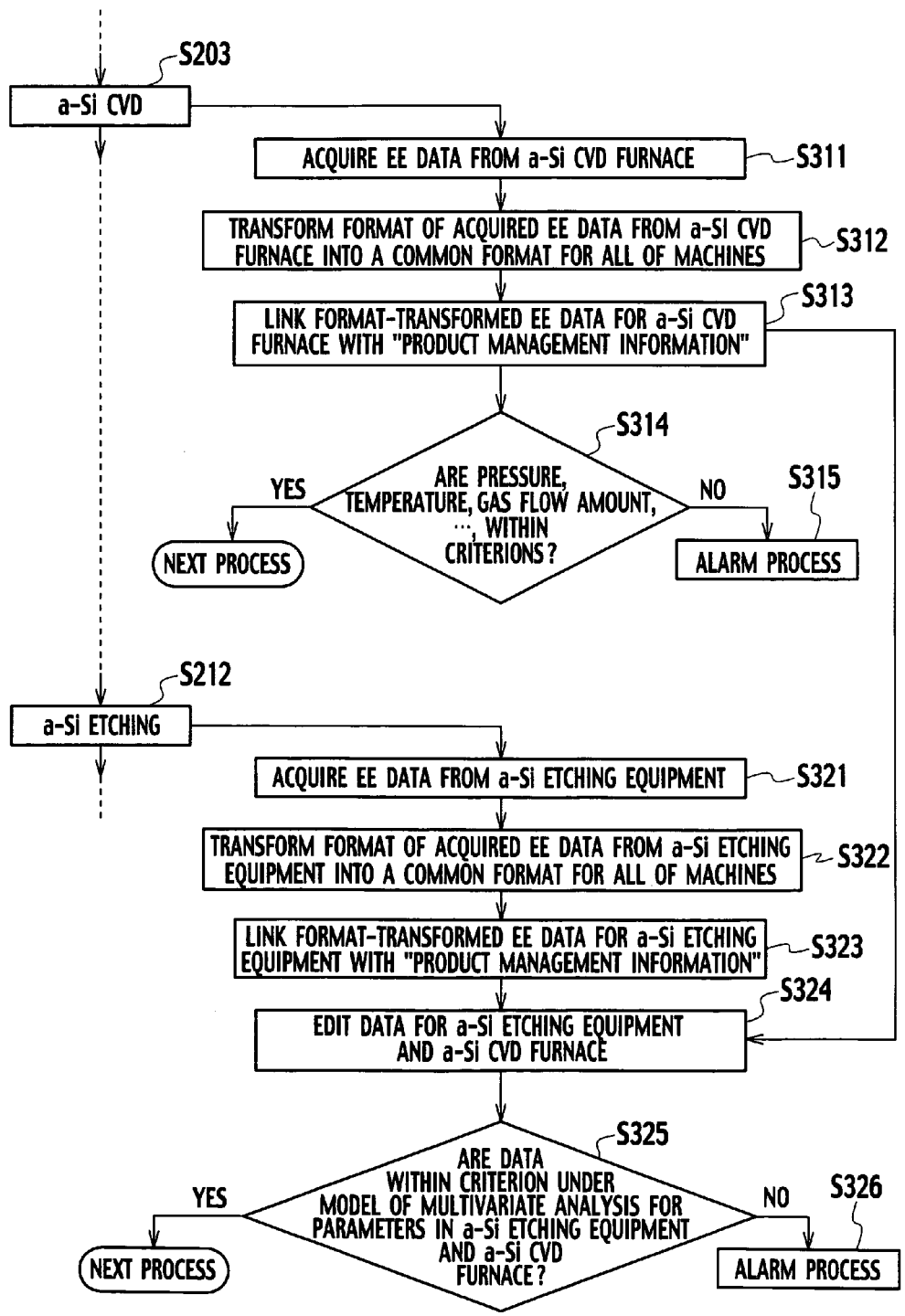
FIG. 17 is a flowchart describing an outline of the process-state management method according to the third embodiment of the present invention.

An example of the process-state management method according to the third embodiment of the present invention is described using a flowchart shown in FIG. 17. Note that as is apparent from a flowchart of FIG. 16, the process-state management method according to the third embodiment described below is represented by a flowchart for only the amorphous silicon CVD process (subject process) in the step S203 and the amorphous silicon etching (RIE) process (influenced process) in the step S212 constituting a part of a long series of 100 or more processes. Similarly, a flowchart for a combination of other multiple processes other than the combination of steps S203 and S212 can be disclosed. In addition, the flowchart shown in FIG. 17 is a mere example, and needless to say, various inter-process FDC applications including modifications thereof are available.

(a) As described in FIG. 8, a lot processing (amorphous silicon CVD) command (job command) for the amorphous silicon CVD furnace (subject production machine) $12_{p+2}$ is first transmitted from the control server (not shown in the drawing: see the reference numeral 11a of FIG. 7). The amorphous silicon CVD furnace $12_{p+2}$ then generates a job for the amorphous silicon CVD furnace $12_{p+2}$ and transmits a job generation report for the amorphous silicon CVD furnace $12_{p+2}$ to the control server. Once the job generation report for the amorphous silicon CVD furnace $12_{p+2}$ is transmitted to the control server, the control server transmits the lot management information for the processing executed by the amorphous silicon CVD furnace $12_{p+2}$ to the management server 14b. In a step S203, the amorphous silicon CVD furnace $12_{p+2}$ then starts lot processing by the amorphous silicon CVD process in conformity with a predetermined recipe.

(b) Once lot processing of the subject process starts in the step S203, the data acquisition unit $13_{p+2}$ connected to the amorphous silicon CVD furnace $12_{p+2}$ starts collecting the operation control data (equipment data) of the amorphous silicon CVD furnace $12_{p+2}$ in conformity with DCP, which is characteristic to the amorphous silicon CVD furnace $12_{p+2}$, and the collected data are temporarily stored in a storage unit of the data acquisition unit $13_{p+2}$ in a step S311. Afterwards, the data acquisition unit $13_{p+2}$ transmits the collected pieces of operation-management data of the amorphous silicon CVD furnace $12_{p+2}$ to a format transformer (not shown in the drawing: see the reference numeral 141 of FIG. 7) in the CPU of the management server 14b at predetermined timings (periodically). Once the operation-management data of the amorphous silicon CVD furnace $12_{p+2}$ is transmitted to the format transformer, the format transformer transforms the format of the received operation-management data of the amorphous silicon CVD furnace $12_{p+2}$ to a format common to all production machines as shown in FIGS. 9A, 9B, 10A, 10B, 11A and 11B in a step S312.

(c) The data-linking module (not shown in the drawing: see the reference numeral 142 of FIG. 7) in the CPU of the management server 14b then links the format-transformed operation-management data of the amorphous silicon CVD furnace $12_{p+2}$ with the lot management information transmitted from the control server in a step S313. The operation-management data of the amorphous silicon CVD furnace $12_{p+2}$ linked with the lot management information by the data-linking module are stored in the management database 15 as the operation-management data with the common format.

(d) In a step S314, the inter-process FDC application execution module 147 retrieves the operation-management data of the amorphous silicon CVD furnace $12_{p+2}$ from the management database 15, and then determines whether or not the amorphous silicon CVD furnace $12_{p+2}$ is operating normally. For example, the pressure in the chamber (first machine parameter), the temperature of a susceptor disposed in the chamber (second machine parameter), the gas flow rate introduced in the chamber (third machine parameter), . . . are compared to corresponding predetermined normal values in order.

(e) In the step S314, if the inter-process FDC application execution module 147 determines that all of the first machine parameter, the second machine parameter, the third machine parameter, . . . of the operation-management data of the amorphous silicon CVD furnace $12_{p+2}$ fall within the criterions of the corresponding predetermined values, processing proceeds to the step S204 shown in FIG. 16. Otherwise, in the step S314, if the inter-process FDC application execution module 147 determines that any one or more of the first machine parameter, the second machine parameter, the third machine parameter, . . . of the operation-management data of the amorphous silicon CVD furnace $12_{p+2}$ does not fall within the criterions of the corresponding predetermined values, an instruction to suspend (shut down) the operation of the amorphous silicon CVD furnace $12_{p+2}$ is transmitted from the control server, and then alarm processing is carried out in a step S315.

(f) Next,—it is assumed that the processing in the steps S204 through S211 is normally carried out to reach an influenced process assigned at the step S212, conformity with the flowchart shown in FIG. 16—a lot processing (amorphous silicon etching) command (job command) for the amorphous silicon etching equipment (influenced production machine) $12_{p+11}$ is then transmitted from the control server. The amorphous silicon etching equipment $12_{p+11}$ then generates a job for the amorphous silicon etching equipment $12_{p+11}$ and transmits a job generation report for the amorphous silicon etching equipment $12_{p+11}$ to the control server. Once the job generation report for the amorphous silicon etching equipment $12_{p+11}$ is transmitted to the control server, the control server transmits the lot management information for the processing executed by the amorphous silicon etching equipment $12_{p+11}$ to the management server 14b. In a step S212, the amorphous silicon etching equipment $12_{p+11}$ then starts lot processing in the amorphous silicon etching (REE) process in conformity with a predetermined recipe.

(g) Once the lot processing starts in a step S212, the data acquisition unit $13_{p+11}$ connected to the amorphous silicon etching equipment $12_{p+11}$ starts collecting the operation-management data (equipment data) of the amorphous silicon etching equipment $12_{p+11}$ in conformity with DCP, which is characteristic to the amorphous silicon etching equipment $12_{p+11}$, and the collected data are temporarily stored in a storage unit of the data acquisition unit $13_{p+11}$ in a step S321. Afterwards, the data acquisition unit $13_{p+11}$ transmits the collected pieces of operation-management data of the amorphous silicon etching equipment $12_{p+11}$ to a format transformer in the CPU of the management server 14b at predetermined timings (periodically). Once the operation-management data of the amorphous silicon etching equipment $12_{p+11}$ is transmitted to the format transformer, the format transformer transforms the format of the transmitted operation-management data of the amorphous silicon etching equipment $12_{p+11}$ to a format common to all production machines in a step S322.

(h) The data-linking module in the CPU of the management server 14b then links the format-transformed operation-management data of the amorphous silicon etching equipment $12_{p+11}$ with the lot management information transmitted from the control server in a step S323. Furthermore, in a step S324, the operation-management data of the amorphous silicon CVD furnace $12_{p+11}$ stored in the management database 15 is read out. In the step S324, the operation-management data of the amorphous silicon CVD furnace $12_{p+2}$ and that of the amorphous silicon etching equipment $12_{p+11}$ are edited. The operation-management data of the amorphous silicon etching equipment $12_{p+11}$ linked with the operation-management data of the amorphous silicon CVD furnace $12_{p+2}$ are stored in the management database 15 as operation-management data with the common format.

(i) In a step S325, the inter-process FDC application execution module 147 reads out the operation-management data of the amorphous silicon CVD furnace $12_{p+2}$ and the edited operation-management data of the amorphous silicon etching equipment $12_{p+11}$ from the management database 15, and then determines whether or not the amorphous silicon etching equipment $12_{p+11}$ is operating normally.

Figure 18:
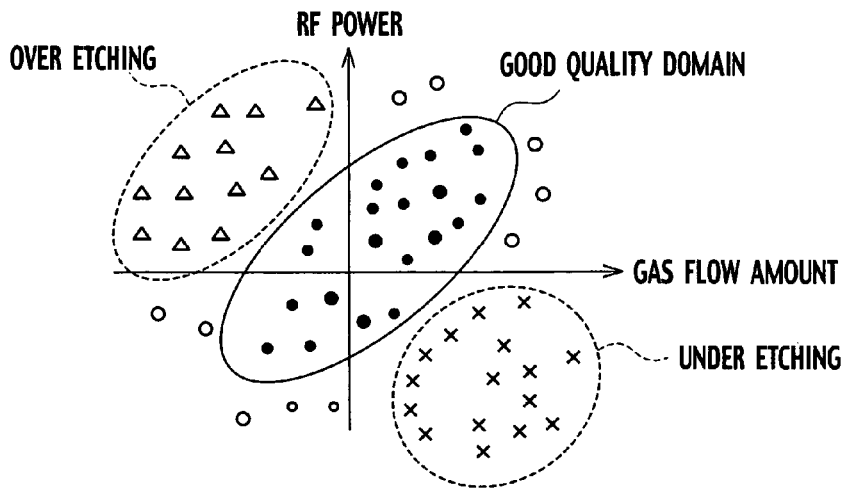
FIG. 18 is a graph showing an analyzed relationship between a gas flow rate during an amorphous silicon CVD process and an RF power during an amorphous silicon etching process, which results from an exemplary multivariate analysis for the process-state management method according to the third embodiment of the present invention.

Determination in the step S325 is conducted by creating models resulting from the multivariate analysis of the pressure, the temperature, and the gas flow rate measured during the amorphous silicon CVD process, and the chamber temperature, the RF power, the impedance matching position (condenser matcher position), and the gas flow rate measured during the amorphous silicon etching process, and then determining whether or not they fall within respective reference values specified based on the models. FIG. 18 shows exemplary multivariate analyzed results showing a relationship between the gas flow rate measured during the amorphous silicon CVD process and the RF power measured during the amorphous silicon etching process. In the drawing, an area including solid circle symbols (-) enclosed by a solid line denotes a non-defective area, an area including open triangle symbols (Δ) enclosed by a dashed line denotes an over-etching regime, and an area including cross symbols (x) enclosed by a dashed line denotes an under-etching regime. The higher the gas flow rate during the amorphous silicon CVD process, the thicker the amorphous silicon CVD film thickness. The stronger the RF power during the amorphous silicon etching process, the higher the amorphous silicon etching rate. Therefore, to attain the non-defective area, the relationship between the gas flow rate during the amorphous silicon CVD process and the RF power during the amorphous silicon etching process is analyzed. FIG. 18 illustrates two-dimensional space analysis where the abscissa indicates the gas flow rate measured during the amorphous silicon CVD process, and the ordinate indicates the RF power measured during the amorphous silicon etching process. However, in reality, multidimensional space analysis is required; where the multidimensional space is based on coordinate axes for the pressure, the temperature, and the gas flow rate measured during the amorphous silicon CVD process, and the chamber pressure, the RF power, the impedance matching position (condenser matcher position), and the gas flow rate measured during the amorphous silicon etching process.

(j) In a step S325, if the inter-process FDC application execution module 147 determines that measured pieces of data fall within the criterions of respective reference values representing the model, which results from conducting multivariate analysis, processing proceeds to the step S213 of FIG. 16. Otherwise, in the step S325, if the inter-process FDC application execution module 147 determines that the measured pieces of data do not fall within the criterions of respective reference values representing the model, which results from conducting multivariate analysis, an instruction to suspend (shut down) the operation of the amorphous silicon etching equipment $12_{p+11}$ is transmitted from the control server, and alarm processing is carried out.

Figure 19:
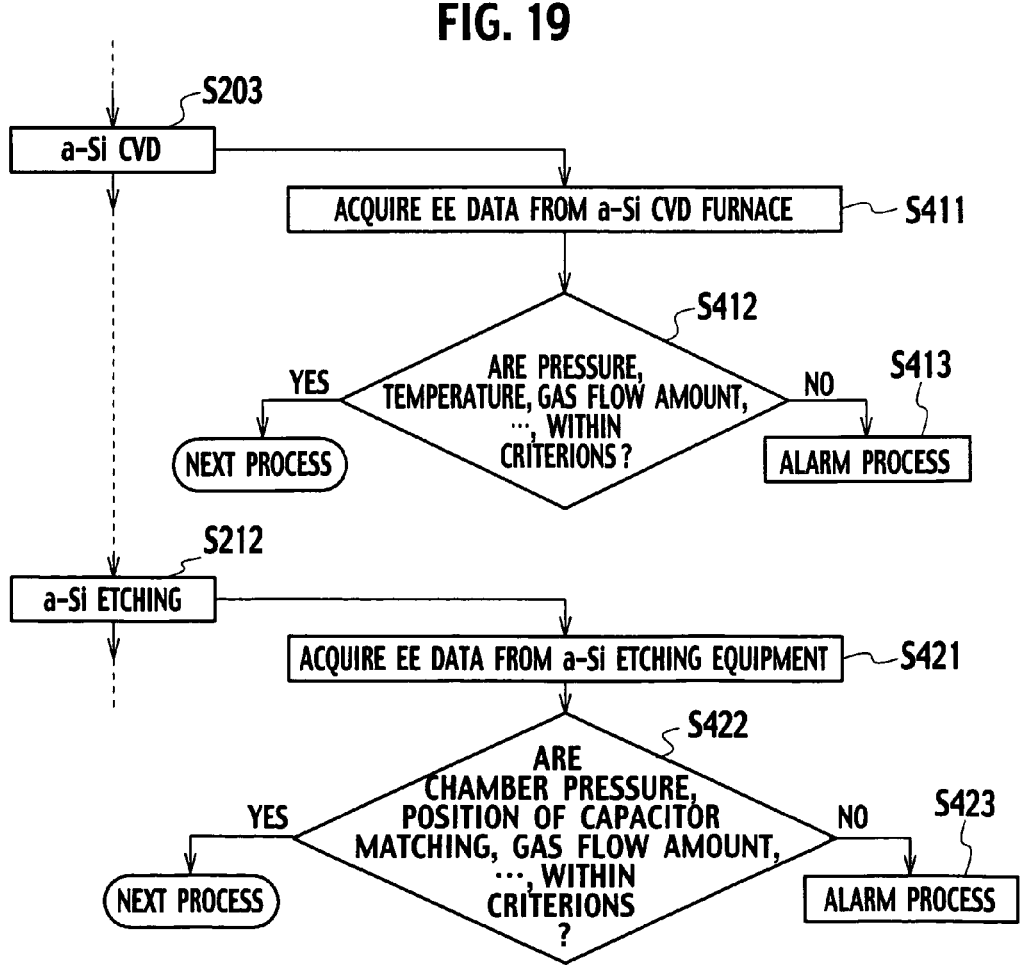
FIG. 19 is a flowchart describing an outline of a process-state management method according to a comparative example of the third embodiment of the present invention.

A process-state management method according to a comparative example of the third embodiment of the present invention is described using a flowchart shown in FIG. 19.

(a) Once lot processing in the step S203 starts, the data acquisition unit $13_{p+2}$ connected to the amorphous silicon CVD furnace $12_{p+2}$ starts collecting the operation-management data (equipment data) of the amorphous silicon CVD furnace $12_{p+2}$, and the collected data are temporarily stored in a storage unit of the data acquisition unit $13_{p+2}$ in a step S411. Afterwards, the data acquisition unit $13_{p+2}$ transmits the collected pieces of operation-management data (equipment data) of the amorphous silicon CVD furnace $12_{p+2}$ to the management server 14b at predetermined timings (periodically). The management server 14b stores the operation-management data of the amorphous silicon CVD furnace $12_{p+2}$ in the management database 15 as the operation-management data in the format inherent in the amorphous silicon CVD furnace $12_{p+2}$.

(b) In a step S412, the FDC application execution module dedicated to the amorphous silicon CVD furnace $12_{p+2}$ retrieves the operation-management data of the amorphous silicon CVD furnace $12_{p+2}$ from the management database 15, and then determines whether or not the amorphous silicon CVD furnace $12_{p+2}$ is operating normally. For example, the pressure in the chamber (first machine parameter), the temperature of a susceptor disposed in the chamber (second machine parameter), the gas flow rate introduced in the chamber (third machine parameter), . . . are compared to respective predetermined normal values in order.

(c) In a step 8412, if the FDC application execution module dedicated to the amorphous silicon CVD furnace $12_{p+2}$ determines that all of the first machine parameter, the second machine parameter, the third machine parameter, . . . of the operation-management data of the amorphous silicon CVD furnace $12_{p+2}$ fall within the criterions of the corresponding predetermined values, processing proceeds to the step S204 shown in FIG. 16. Otherwise, in the step S412, if the FDC application execution module dedicated to the amorphous silicon CVD furnace $12_{p+2}$ determines that one or more of the first machine parameter, the second machine parameter, the third machine parameter, . . . of the operation-management data of the amorphous silicon CVD furnace $12_{p+2}$ do not fall within the criterions of the corresponding predetermined values, an instruction to suspend (shut down) the operation of the amorphous silicon CVD furnace $12_{p+2}$ is transmitted from the control server, and alarm processing is carried out in a step S413.

(d) Next, it is assumed that the processing in steps S204 through S211 is normally carried out in conformity with the flowchart shown in FIG. 16. Once lot processing starts in a step S212, the data acquisition unit $13_{p+11}$ connected to the amorphous silicon etching equipment $12_{p+11}$ starts collecting the operation-management data (equipment data) of the amorphous silicon etching equipment $12_{p+11}$ in conformity with DCP, which is characteristic to the amorphous silicon etching equipment $12_{p+11}$, and the collected data are temporarily stored in a storage unit of the data acquisition unit $13_{p+11}$ in a step S421. Afterwards, the data acquisition unit $13_{p+11}$ transmits the collected pieces of operation-management data of the amorphous silicon etching equipment $12_{p+11}$ to the management server 14b at predetermined tings (periodically). The operation-management data of the amorphous silicon etching equipment $12_{p+11}$ are stored in the management database 15 as operation-management data in the format inherent in the amorphous silicon etching equipment $12_{p+11}$.

(e) In a step S422, the FDC application execution module dedicated to the amorphous silicon etching equipment $12_{p+11}$ retrieves the operation-management data of the amorphous silicon etching equipment $12_{p+11}$ from the management database 15, and then determines whether or not the amorphous silicon etching equipment $12_{p+11}$ is operating normally. Determination in the step S422 is conducted by comparing the pressure in the chamber (first machine parameter), the impedance matching position (condenser matcher position) (second machine parameter), the gas flow rate introduced in the chamber (third machine parameter), . . . measured during the amorphous silicon etching process to the respective predetermined normal values in order.

(f) In a step S422, if the FDC application execution module dedicated to the amorphous silicon etching equipment $12_{p+11}$ determines that all of the first machine parameter, the second machine parameter, the third machine parameter, . . . fall within the criterions of the respective predetermined reference values, processing proceeds to the step S213 shown in FIG. 16. Otherwise, if the FDC application execution module dedicated to the amorphous silicon etching equipment $12_{p+11}$ determines that one or more of the first machine parameter, the second machine parameter, the third machine parameter, . . . do not fall within the criterions of the respective predetermined reference values, an instruction to suspend (shut down) the operation of the amorphous silicon etching equipment $12_{p+11}$ is transmitted from the control server, and alarm processing is carried out in a step S423.

According to the process-state management method of the comparative example of the third embodiment shown in FIG. 19, the operation-management data obtained during the amorphous silicon CVD process in the step S203 is read out, and alarm determination of whether or not the measured pieces of data fall within the respective predetermined reference values is carried out in the step S413 or S423. The criterions of reference values employed in the step S412 are specified for each of items of the operation-management data, respectively, so that a normal CVD process configured to deposit a film with a target thickness can be accomplished. If the determination in the step S412 is affirmative (YES), processing proceeds to the subsequent step. The lot that has passed determination in the subsequent steps is then subjected to a RIE process in the step S212. In the comparative example of the third embodiment, the operation-management data of a production machine for a single process in the step S212 is used for determining whether or not the chamber pressure, the impedance matching position (condenser matcher position), and the gas flow rate fall within the ranges of respective specifications using the FDC application. Therefore, there may be a case that the result of the RIE process for the lot will pass the lower limit of the criterions of reference values in the step S212, taking a longer etching time than the normal etching time, although a slight problem of decreasing the amorphous silicon CVD deposition rate is occurred in the step S203. The long etching time may be ascribable to a great decrease in the etching rate, and there may be abnormality in the operation of the production machine (the amorphous silicon etching equipment $12_{p+11}$), actually. In the abnormal operation case, the processing of the subject production machine should be stopped by an alarm. However, the process-state management method according to the comparative example cannot stop the processing of the subject production machine.

Alternatively, according to the process-state management method of the third embodiment of the present invention shown in FIG. 17, an abnormality alarm can be issued, as a decrease in amorphous silicon CVD deposition rate and an abnormal increase of etching time, by executing the inter-process FDC application between the process steps of the amorphous silicon CVD process and the amorphous silicon RIE process, using the edited operation-management data obtained during the amorphous silicon CVD process and the amorphous silicon RIE process. The inter-process FDC can achieve rapid and correct detection of abnormality in production machines, and appropriate countermeasure for abnormality, resulting in reduction in the number of defective lots and improvement of yields.

According to the process-state management method of the third embodiment of the present invention, by executing the FDC application for a single process, if the etching duration when is shorter than the lower limit of the criterions of reference values, an alarm will be issued, even if a thinner film is deposited through the amorphous silicon CVD process. However, in the case where a thinner film is deposited through the amorphous silicon CVD process than the normal value, by the inter-process FDC application to be executed between the amorphous silicon CVD process and the amorphous silicon RIE process, if the lower limit of the etching time is intentionally decreased, it is possible to prevent the issue of the erroneous alarm, resulting in decrease in the number of erroneous production suspension and improvement in the effective operation rate of production machines.

Only the amorphous silicon CVD process in the step S203 as the subject process and the amorphous silicon etching (RIE) process in the step S212 as the influenced process have been described using the flowchart shown in FIG. 17. In addition, inter-process FDC application for a combination of various process steps except for combination of the steps S203 and S212 may be executed. For example, as shown in a flowchart of FIG. 20, the inter-process FDC application may be executed for a polysilicon CVD process in the step S201 as the subject process and ion implantation process in the step S223 as the influenced process. Executing the inter-process FDC application between the polysilicon CVD process and the ion implantation process is described forthwith using the flowchart shown in FIG. 20.

(a) As described in FIG. 8, a lot processing (polysilicon CVD) command (job command) is first transmitted from the control server (not shown in the drawing: see the reference numeral 11a of FIG. 7) to the polysilicon CVD furnace $12_p$. The polysilicon CVD furnace (subject production machine) $12_p$ then generates a job of the polysilicon CVD furnace $12_p$ and transmits a job generation report for the polysilicon CVD furnace $12_p$ to the control server. Once the job generation report of the polysilicon CVD furnace $12_p$ is transmitted to the control server, the control server transmits the lot management information for the processing executed by the polysilicon CVD furnace $12_p$ to the management server 14b. In the step S201 shown in FIGS. 15 and 19, the polysilicon CVD furnace $12_p$ starts lot processing in the polysilicon CVD process in conformity with a predetermined recipe.

Figure 20:
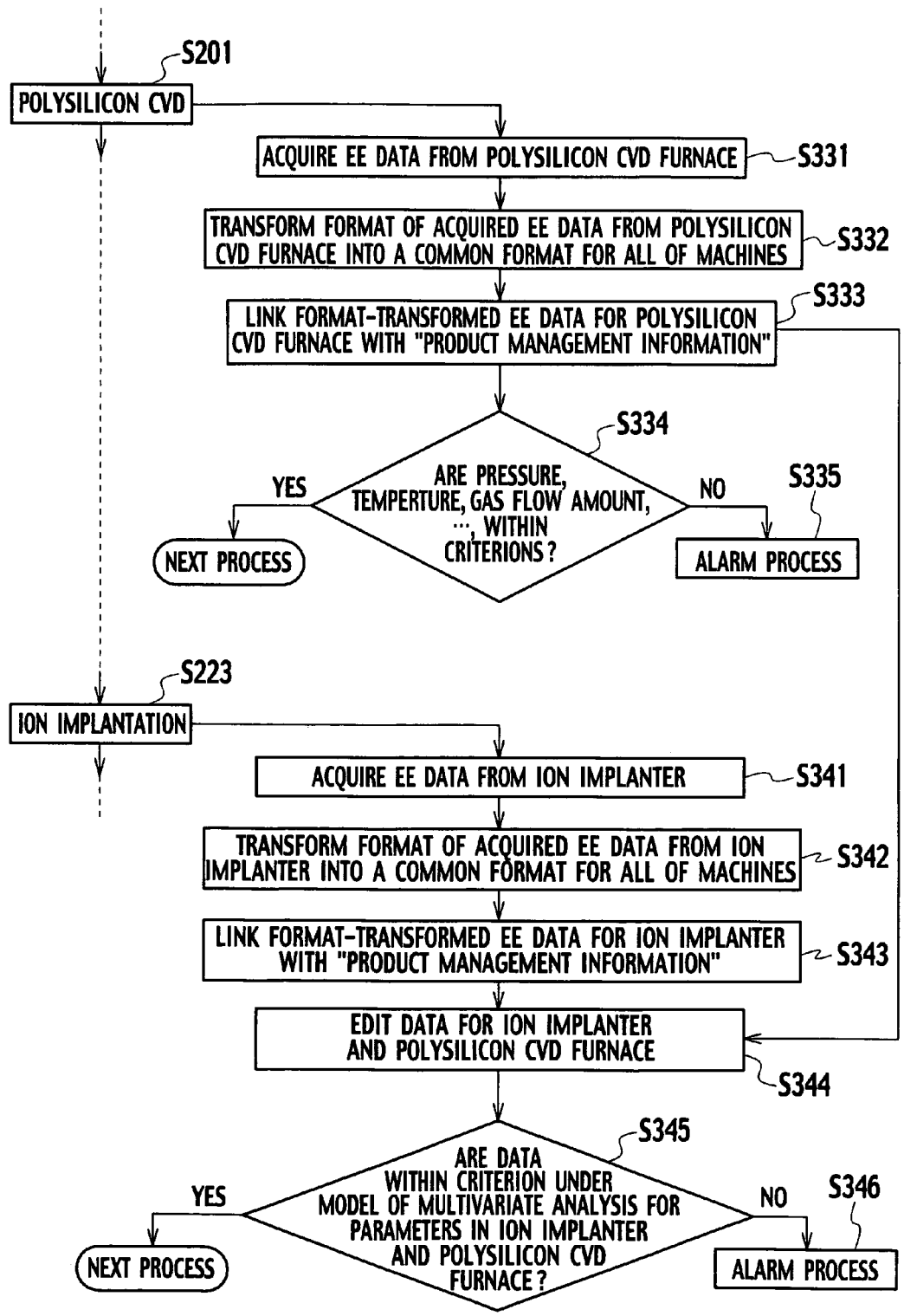
FIG. 20 is a flowchart describing an outline of the process-state management method according to the third embodiment of the present invention.

(b) Once lot processing starts in the step S201, the data acquisition unit $13_p$ connected to the polysilicon CVD furnace $12_p$ starts collecting the operation-management data (equipment data) of the polysilicon CVD furnace $12_p$ in conformity with DCP, which is characteristic to the polysilicon CVD furnace $12_p$, and the collected data are temporarily stored in a storage unit of the data acquisition unit $13_p$ in a step S331 of FIG. 20. Afterwards, the data acquisition unit $13_p$ transmits the collected pieces of operation-management data of the polysilicon CVD furnace $12_p$ to a format transformer (not shown in the drawing: see the reference numeral 141 of FIG. 7) in the CPU of the management server 14b at predetermined timings (periodically). Once the operation-management data of the polysilicon CVD furnace $12_p$ is transmitted to the format transformer, the format transformer 141 transforms the format of the received operation-management data of the polysilicon CVD furnace $12_p$ to a format common to all production machines as shown in FIGS. 9A, 9B, 10A, 10B, 11A and 11B in a step S332.

(c) The data-linking module (not shown in the drawing: see the reference numeral 142 of FIG. 7) in the CPU of the management server 14b then links the format-transformed operation-management data of the polysilicon CVD furnace $12_p$ with the lot management information transmitted from the control server in a step S333. The operation-management data of the polysilicon CVD furnace $12_p$ linked with the lot management information by the data-linking module 142 are stored in the management database 15 as operation-management data with the common format.

(d) In a step S334, the inter-process FDC application execution module 147 retrieves the operation-management data of the polysilicon CVD furnace $12_p$ from the management database 15, and then determines whether or not the polysilicon CVD furnace $12_p$ is operating normally. For example, the pressure in the chamber (first machine parameter), the temperature of a susceptor disposed in the chamber (second machine parameter), the gas flow rate introduced in the chamber (third machine parameter), ... are compared to respective predetermined normal values.

(e) In a step S334, if the inter-process FDC application execution module 147 determines that all of the first machine parameter, the second machine parameter, the third machine parameter, ... of the operation-management data of the polysilicon CVD furnace $12_p$ fall within the criterions of the respective predetermined values, processing proceeds to the step S202 shown in FIG. 16. Otherwise, if the inter-process FDC application execution module 147 determines in the step S334 that one or more of the first machine parameter, the second machine parameter, the third machine parameter, ... of the operation-management data of the polysilicon CVD furnace $12_p$ do not fall within the criterions of the respective predetermined values, an instruction to suspend (shut down) the operation of the polysilicon CVD furnace $12_p$ is transmitted from the control server, and alarm processing is carried out in a step S335.

(f) Next, it is assumed that processing in the steps S202 through S222 (processing immediately before the step S223) is normally carried out to reach an influenced process assigned at the step S223, in conformity with the flowchart shown in FIG. 16. A lot processing (ion implantation) command (job command) is then transmitted from the control server to an ion implanter (an influenced production machine). The ion implanter then generates a job of the ion implanter and transmits a job generation report for the ion implanter to the control server. Once the job generation report for the ion implanter is transmitted to the control server, the control server transmits the lot management information for the processing executed by the ion implanter to the management server 14b. In the step S223, the ion implanter starts lot processing in the ion implantation process in conformity with a predetermined recipe.

(g) Once lot processing starts in the step S223, the data acquisition unit (not shown in the drawing) connected to the ion implanter starts collecting the operation-management data of the ion implanter in conformity with DCP, which is characteristic to the ion implanter, and the collected data are temporarily stored in a storage unit of the data acquisition unit (not shown in the drawing) in a step S341. Afterwards, the data acquisition unit (not shown in the drawing) transmits the collected pieces of operation-management data of the ion implanter to a format transformer in the CPU of the management server 14b at predetermined timings (periodically). Once the operation-management data of the ion implanter is transmitted to the format transformer, the format transformer 141 transforms the format of the transmitted operation-management data of the ion implanter to a format common to all production machines in a step S342.

(h) The data-linking module 142 in the CPU of the management server 14b then links the format-transformed operation-management data of the ion implanter with the lot management information transmitted from the control server in a step S343. Furthermore, in a step S344, the operation-management data of the ion implanter stored in the management database 15 is read out. In a step S344, the operation-management data of the polysilicon CVD furnace $12_p$ and that of the ion implanter are edited. The operation-management data of the ion implanter linked with the operation-management data of the polysilicon CVD furnace $12_p$ are stored in the management database 15 as operation-management data with the common format.

(i) In a step S345, the inter-process FDC application execution module 147 retrieves the operation-management data of the polysilicon CVD furnace $12_p$ and the edited operation-management data of the ion implanter from the management database 15, and then determines whether or not the ion implanter is operating normally. Determination is carried out in the step S345 by creating a model resulting from the multivariate analysis of the pressure, the temperature, the gas flow rate measured during the polysilicon CVD process, the accelerating energy (accelerating voltage), dose amount, and substrate temperature measured during the ion implantation process, and then comparing and determining whether or not measured pieces of data fall within the criterions of respective predetermined reference values representing the model.

(j) In a step S345, if the inter-process FDC application execution module 147 determines that the measured pieces of data fall within the criterions of the respective predetermined reference values representing the model, processing proceeds to the subsequent step S224 (not shown in FIG. 16). Otherwise, if the inter-process FDC application execution module 147 determines in the step S345 that at least one of the measured pieces of data do not fall within the criterions of the respective predetermined reference values representing the model, an instruction to suspend (shut down) the operation of the ion implanter is transmitted from the control server, and alarm processing is carried out.

Executing the inter-process FDC application for the polysilicon CVD process in the step S201 as the subject process and the ion implantation process in the step S223 as the influenced process has been described using FIG. 20. Alternatively, the inter-process FDC application may be executed for the ion implantation process in the step S223 as the subject process and an activation annealing process in the step S225 shown in FIG. 16 as the influenced process. Alternatively, it may be executed for an oxide film CVD process not shown in the drawing as the subject process and the CMP process in the step S247 shown in FIG. 16 as the influenced process. For example, in the case of executing the inter-process FDC application between the ion implantation process (subject process) and the activation anneal process (influenced process), multivariate analysis of the dose amount of ion implantation and the annealing temperature is carried out in a trade-off relationship therebetween. In the case of executing the inter-process FDC application between the oxide film CVD process (subject process) and the CMP process (influenced process), multivariate analysis of the CVD film thickness of the oxide film and the amount of CMP polishing amount is carried out in a trade-off relationship therebetween. As described above, according to the process-state management method of the third embodiment of the present invention, since the pieces of operation-management data of the respective production machines $12_p$, $12_{p+1}$, $12_{p+3}$, ..., $12_{p+14}$ are stored with the common format in the management database 15 and may be retrieved from the management database 15 at a high speed, the inter-process FDC application can be executed by the production machines $12_p$, $12_{p+1}$, $12_{p+3}$, ..., $12_{p+14}$ as if it is executed by a single production machines. Furthermore, the process-state management method according to the third embodiment facilitates comparison and fault detection among machines or among chambers.

A program according to an algorithm equivalent to the procedure of the process-state management method shown in FIGS. 16 and 19 may be executed to control the process-state management system in FIG. 7. The program should be stored in both program memories of the control server and the management server 14b, which constitute the process-state management system according to the third embodiment of the present invention.

FOURTH EMBODIMENT

Figure 21:
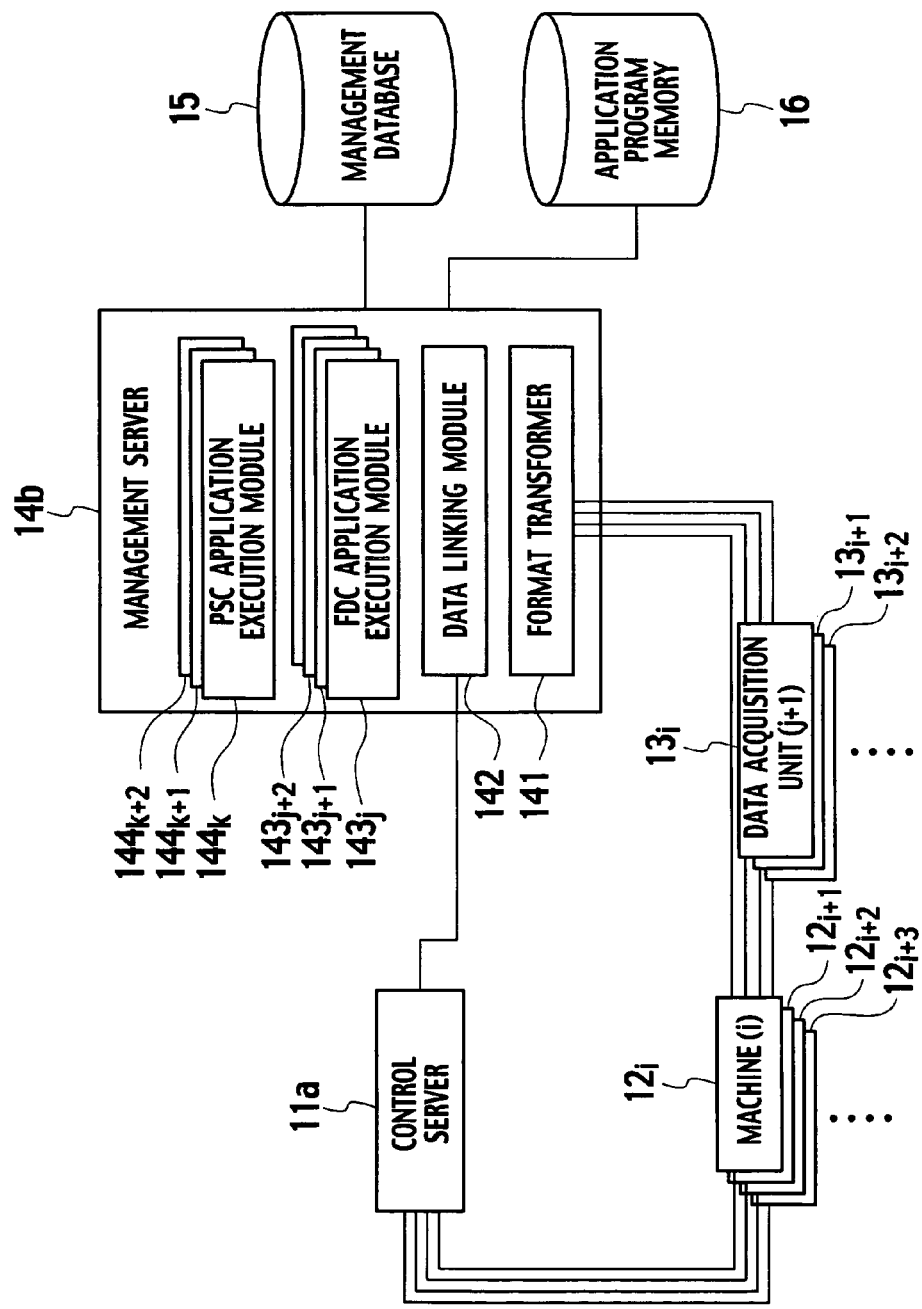
FIG. 21 is a schematic diagram describing a logical configuration of a process-state management system according to a fourth embodiment of the present invention.

As shown in FIG. 21, a process-state management system according to a fourth embodiment of the present invention is similar to process-state management system according to the second embodiment in that the process-state management system according to the fourth embodiment encompasses a plurality of production machines $12_i$, $12_{i+1}$, $12_{i+2}$, $12_{i+3}$, ... required for fabricating products such as semiconductor devices, a control server 11a configured to collectively control operations of the respective production machines $12_i$, $12_{i+1}$, $12_{i+2}$, $12_{i+3}$, ..., a management server 14b configured to receive pieces of operation-management data (equipment data) of the respective production machines, and monitor corresponding operation states of the respective production machines $12_i$, $12_{i+1}$, $12_{i+2}$, $12_{i+3}$, ... in real time, and a management database 15 storing pieces of operation-management data (EE data) of the respective production machines $12_{i+1}$, $12_{i+2}$, $12_{i+3}$, ... as data with the common format.

However, as shown in FIG. 21, the process-state management system according to the fourth embodiment is different from the process-state management system according to the second embodiment in that a data acquisition unit $13_i$ is not connected to the production machines $12_i$. Another plurality of data acquisition units $13_{i+1}$, $13_{i+2}$, $13_{i+3}$, ... are connected to the other respective production machines $12_{i+1}$, $12_{i+2}$, $12_{i+3}$, ..., as with the process-state management system according to the second embodiment. As described above, there is no need to connect the data acquisition units to all production machines $12_{i+1}$, $12_{i+2}$, $12_{i+3}$, ..., respectively. In addition, while FIG. 21 shows an example where the data acquisition unit $13_i$ is not connected to the production machine $12_i$, a configuration where a data acquisition unit is not connected to any of the other production machines $12_{i+1}$, $12_{i+2}$, $12_{i+3}$, ... is alternatively possible. Furthermore, a configuration where the data acquisition units are not connected to more than two of the production machines $12_i$, $12_{i+1}$, $12_{i+2}$, $12_{i+3}$, ... is also possible. Omission of the data acquisition units can achieves a further high-speed data transfer to the management server 14b.

As with the process-state management system according to the second embodiment, a CPU of the management server 14b includes a format transformer 141 and a data-linking module 142. Note that the format transformer 141 and the data-linking module 142 can be implemented by external hardware of the CPU of the management serer 14b.

According to the example shown in FIG. 21, operation-management data (equipment data) is directly transmitted to the format transformer 141 from the production machine $12_i$, and the format transformer 141 then transforms the operation-management data transmitted from the production machine $12_i$ into data represented by a common format. The format-transformed-operation-management data by the format transformer 141 is linked with the management information transmitted from the control server 11a by the data-linking module 142.

The CPU of the management server 14b encompasses the format transformer 141 configured to transform the operation-management data transmitted from the data acquisition units $13_{i+1}$, $13_{i+2}$, $13_{i+3}$, ... into data represented by the common format as shown in FIGS. 9A, 9B, 10A and 10B, and the data-linking module 142 configured to link the format-transformed-operation-management data by the format transformer 141 with the management information transmitted from the control server 11a. The operation-management data (equipment data) of the production machines $12_i$, $12_{i+1}$, $12_{i+2}$, $12_{i+3}$, ... linked with the management information are stored in the management database 15 with the common format.

The pieces of operation-management data of the other respective production machines $12_{i+1}$, $12_{i+2}$, $12_{i+3}$, ... are transmitted to the format transformer 141 via the data acquisition units $13_{i+1}$, $13_{i+2}$, $13_{i+3}$, ..., and the format transformer 141 then transforms the pieces of the operation-management data of the other respective production machines $12_{i+1}$, $12_{i+2}$, $12_{i+3}$, ... into data represented by the common format. Furthermore, the operation-management data are linked with the management information transmitted from the control server 11a and stored in the management database 15 with the common format.

The CPU of the management server 14b in the process-state management system, according to the fourth embodiment, further includes a plurality of FDC application execution modules $143_j$, $143_{j+1}$, $143_{j+2}$, .... Each of the FDC application execution modules $143_j$, $143_{j+1}$, $143_{j+2}$, ... is used as a common analysis application to collectively analyze and monitor the plurality of production machines $12_i$, $12_{i+1}$, $12_{i+2}$, $12_{i+3}$, ... in real time, as with the process-state management system according to the second embodiment. Therefore, according to the process-state management system of the fourth embodiment, since a common FDC application may collectively monitor production machines $12_i$, $12_{i+1}$, $12_{i+2}$, $12_{i+3}$, ... in real time, a consolidated fault detecting method or a consolidated automatic fault analyzing method may be used for monitoring many production machines of different machine venders. In other words, even if many production machines of different venders constitute a fabrication line in a factory, an exclusively dedicated fault detecting application or an exclusively dedicated automatic analyzing application is not needed for each production machines, resulting in omission of additional investment, as described with the process-state management system according to the second embodiment. Other functions, configurations, way of operation are substantially similar to the functions, configurations, way of operation already explained in the second embodiment, overlapping or redundant description may be omitted.

FIFTH EMBODIMENT

In the case of FDC application using algorithms specific to each production machines, FDC application must be used independently for each production machines. Therefore, complex thresholds for pass/fault determination due to complex causes (e.g., fault cause constituted by a combination of linear relationship and non-linear relationship) cannot be set. However, as is apparent from the description of the various process-state management systems according to the second to fourth embodiments, since the operation-management data (equipment data) of all production machines are stored in a management database 15 with the common format independent of the production machines and data acquisition units connected thereto, the common-format-transformed data may be retrieved from the management database 15 at a high speed as needed. The employment of the common-format-transformed data can facilitate a simultaneous analysis of the operation-management data using a plurality of FDC applications.

Figure 22:
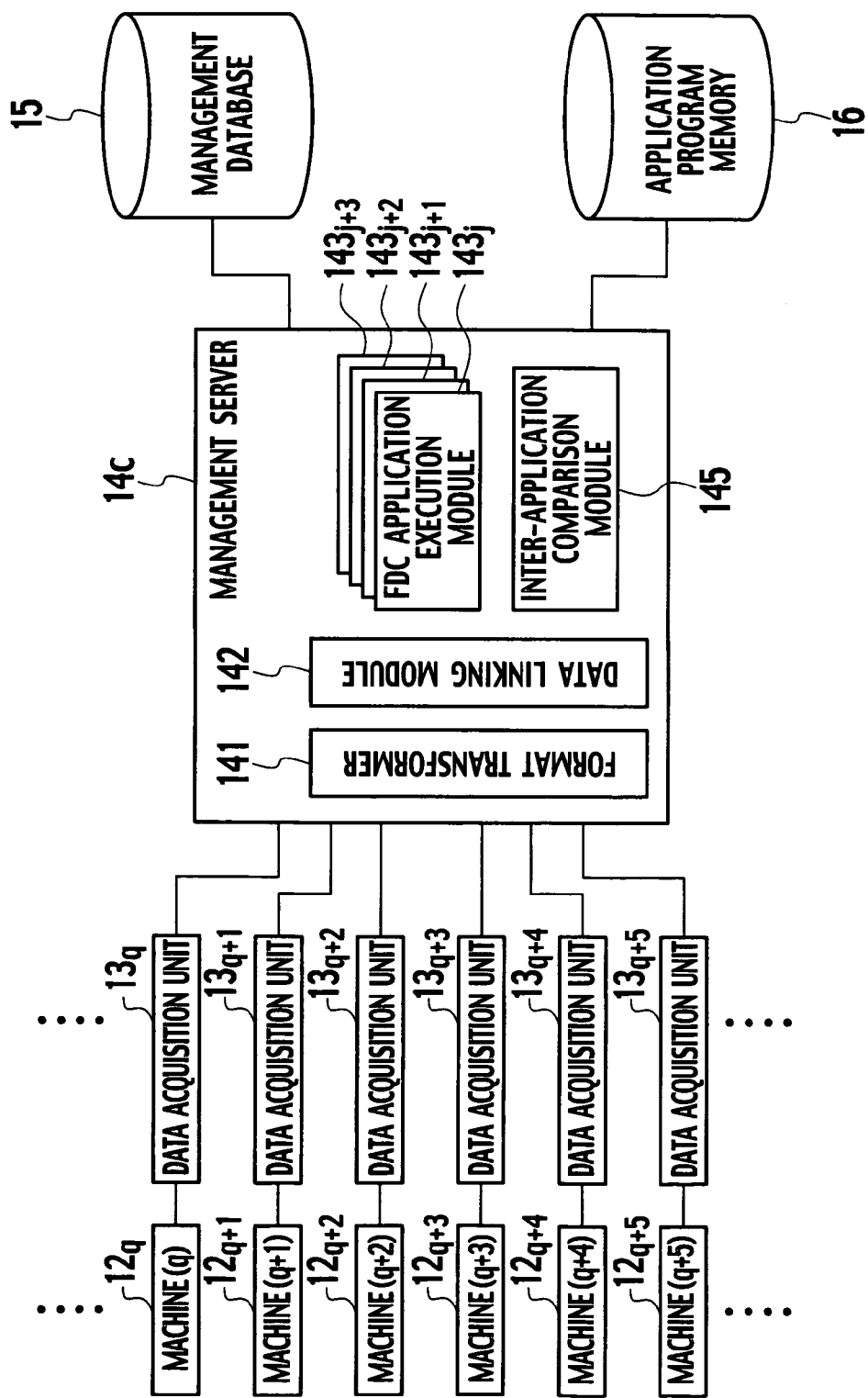
FIG. 22 is a schematic diagram describing a logical configuration of a process-state management system according to a fifth embodiment of the present invention.

Therefore, in a process-state management system according to a fifth embodiment of the present invention, a simultaneous abnormality detecting method for a plurality of production machines using a plurality of FDC applications will be described. As shown in FIG. 22, the process-state management system according to the fifth embodiment of the present invention encompasses a plurality of production machines $12_q$, $12_{q+1}$, $12_{q+2}$, ..., $12_{q+5}$, ... required for fabricating products such as semiconductor devices, a management server 14c configured to receive the operation-management data (equipment data) of the respective production machines $12_q$, $12_{q+1}$, $12_{q+2}$, ..., $12_{q+5}$, ... and configured to monitor corresponding operation states of the respective production machines $12_q$, $12_{q+1}$, $12_{q+2}$, ..., $12_{q+5}$, ... in real time, and a management database 15 storing pieces of operation-management data (equipment data) of the respective production machines $12_q$, $12_{q+1}$, $12_{q+2}$, ..., $12_{q+5}$, ... as data with the common format, as with the process-state management system according to the first to fourth embodiments. Note that the process-state management system of the fifth embodiment is similar to process-state management system according to the first to fourth embodiments in that the production machines $12_q$, $12_{q+1}$, $12_{q+2}$, ..., $12_{q+5}$, ... are connected to a control server 11a, which collectively controls the operations of the respective production machines $12_q$, $12_{q+1}$, $12_{q+2}$, ..., $12_{q+5}$, ... shown in FIG. 22; but the connection is not shown in the drawing.

As shown in FIG. 22, the production machines $12_q$, $12_{q+1}$, $12_{q+2}$, ..., $12_{q+5}$, ... are connected to respective data acquisition units $13_q$, $13_{q+1}$, $13_{q+2}$, ..., $13_{q+5}$, ..., which acquire pieces of operation-management data (equipment data) of the respective production machines $12_q$, $12_{q+1}$, $12_{q+2}$, ..., $12_{q+5}$, ... in conformity with their own DCPs, and then transmit the operation-management data to the management server 14c at predetermined timings (periodically).

A CPU of the management server 14c encompasses a format transformer 141 configured to transform the operation-management data transmitted from the data acquisition units $13_q$, $13_{q+1}$, $13_{q+2}$, ..., $13_{q+5}$, ... into data represented by the common format as shown in FIGS. 9A, 9B, 10A and 10B, and a data-linking module 142 configured to link the format-transformed-operation-management data by the format transformer 141 with the management information transmitted from the control server. The operation-management data of the production machines $12_q$, $12_{q+1}$, $12_{q+2}$, ..., $12_{q+5}$, ... linked with the management information are stored in the management database 15 with the common format. The CPU of the management server 14c further includes a plurality of FDC application execution modules $143_j$, $143_{j+1}$, $143_{j+2}$, .... Each of the FDC application execution modules $143_j$, $143_{j+1}$, $143_{j+2}$, ... is used as a common analysis application to collectively analyze and monitor the production machines $12_q$, $12_{q+1}$, $12_{q+2}$, ..., $12_{q+5}$, ... in real time. FDC programs to instruct and control the plurality of FDC application execution modules $143_j$, $143_{j+1}$, $143_{j+2}$, ... are stored in an application program memory 16 connected to the CPU of the management server 14c.

In addition, the CPU of the management server 14c in the process-state management system according to the fifth embodiment further includes an inter-application comparison module 145 capable of analyzing the operation of a subject production machine by setting complex thresholds using a plurality of FDC applications at the same time.

Figure 23A:
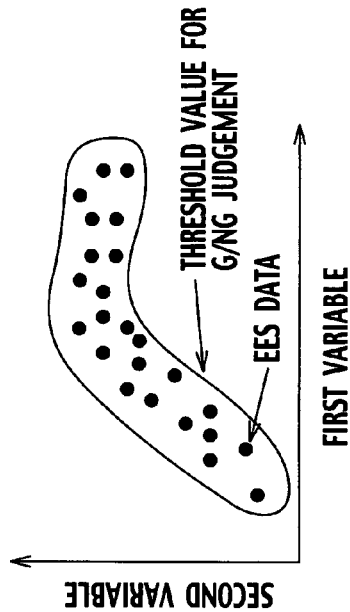
FIG. 23A shows a graph describing an example of multivariate analysis or inter-application analysis, for a case of using an algorithm according to Hotelling's $T^2$ statistics, when there is a linear relationship between a first variable and a second variable, according to the process-state management method of the fifth embodiment of the present invention.
Figure 23B:
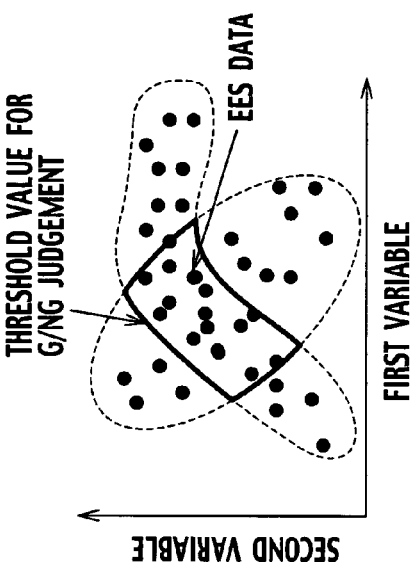
FIG. 23B shows a graph describing an example of multivariate analysis or inter-application analysis, for a case of using k-neighborhood algorithm, when there is nonlinear relationship between the first variable and the second variable, according to the process-state management method of the fifth embodiment of the present invention.

FIG. 23A shows a case of using an algorithm according to Hotelling's $T^2$ statistics value when there is a linear relationship between a first variable and a second variable. FIG. 23B shows a case of using k-neighborhood algorithm when there is nonlinear relationship between the first variable and the second variable. In the case of earlier FDC applications using isolated individual algorithms, i.e. each algorithm is used independently, complex thresholds for pass/fault determination cannot be established for a fault ascribable to a combination of linear relationship and non-linear relationship as shown in FIGS. 23A and 23B.

However, the process-state management system according to the fifth embodiment includes the inter-application comparison module 145 configured to compare between a plurality of algorithms. Therefore, an excellent process-state management with detailed diagnosis of the production machine can be achieved by categorizing detected levels of abnormality as follows: when an abnormality is detected only by the k-neighborhood algorithm, an alarm mail is sent to a person in charge. Similarly, in a case of using an algorithm according to Hotelling's $T^2$ statistics value, if an abnormality is detected only by the Hotelling's $T^2$ statistics value, an alarm mail is sent to the person in charge. On the other hand, if an abnormality is detected by both of the k-neighborhood algorithm and the Hotelling's $T^2$ statistics, the operation of the subject production machine is suspended.

As described above, the inter-application comparison module 145 is used to compare between a plurality of algorithms, to categorize abnormalities, automatically taking an appropriate countermeasure, thereby improving accuracy. Therefore, the inter-application comparison module 145 can reduce useless processing, and facilitate quick start of a necessary countermeasure against the abnormality of production machine, thereby achieving improvement in fabrication yields of the semiconductor device.

Figure 23C:
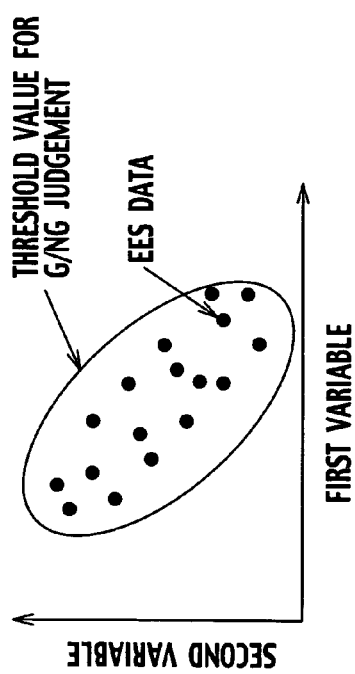
FIG. 23C shows a graph describing an example of multivariate analysis or inter-application analysis, for a case of an OR algorithm, according to the process-state management method of the fifth embodiment of the present invention.
Figure 23D:
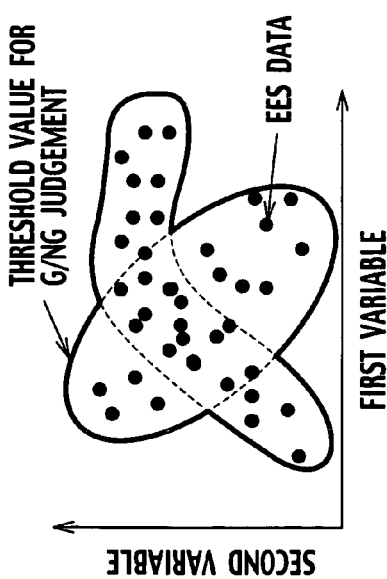
FIG. 23D shows a graph describing an example of multivariate analysis or inter-application analysis, for a case of an AND algorithm, according to the process-state management method of the fifth embodiment of the present invention.

FIG. 23C shows a graph describing another example of multivariate analysis or inter-application analysis, for a case of an OR algorithm. FIG. 23D shows a graph describing still another example of multivariate analysis or inter-application analysis, for a case of an AND algorithm. Since the process-state management system of the fifth embodiment includes the inter-application comparison module 145, detailed detection of abnormality is possible by setting a set of complex thresholds for various algorithms as shown in FIGS. 23C and 23D.

SIXTH EMBODIMENT

As is apparent from the description of the various process-state management systems according to the second to sixth embodiments, each of the process-state management systems of the second to sixth embodiments is capable of retrieving operation-management data (equipment data) of all production machines from a management database 15 at a high speed as needed because the operation-management data are stored in the management database 15 with a common format independent of venders of the production machines and data acquisition units connected thereto. This allows analysis of the operation-management data using a plurality of FDC applications simultaneously. However, a large increase in the number of production machines, from which operation-management data are acquired, causes a significant output delay of the final processing results (analyzed results) and degrades the effectiveness of the real-time operations of the process-state management systems, even though the parallel processing scheme is provided to the process-state management systems.

Figure 24:
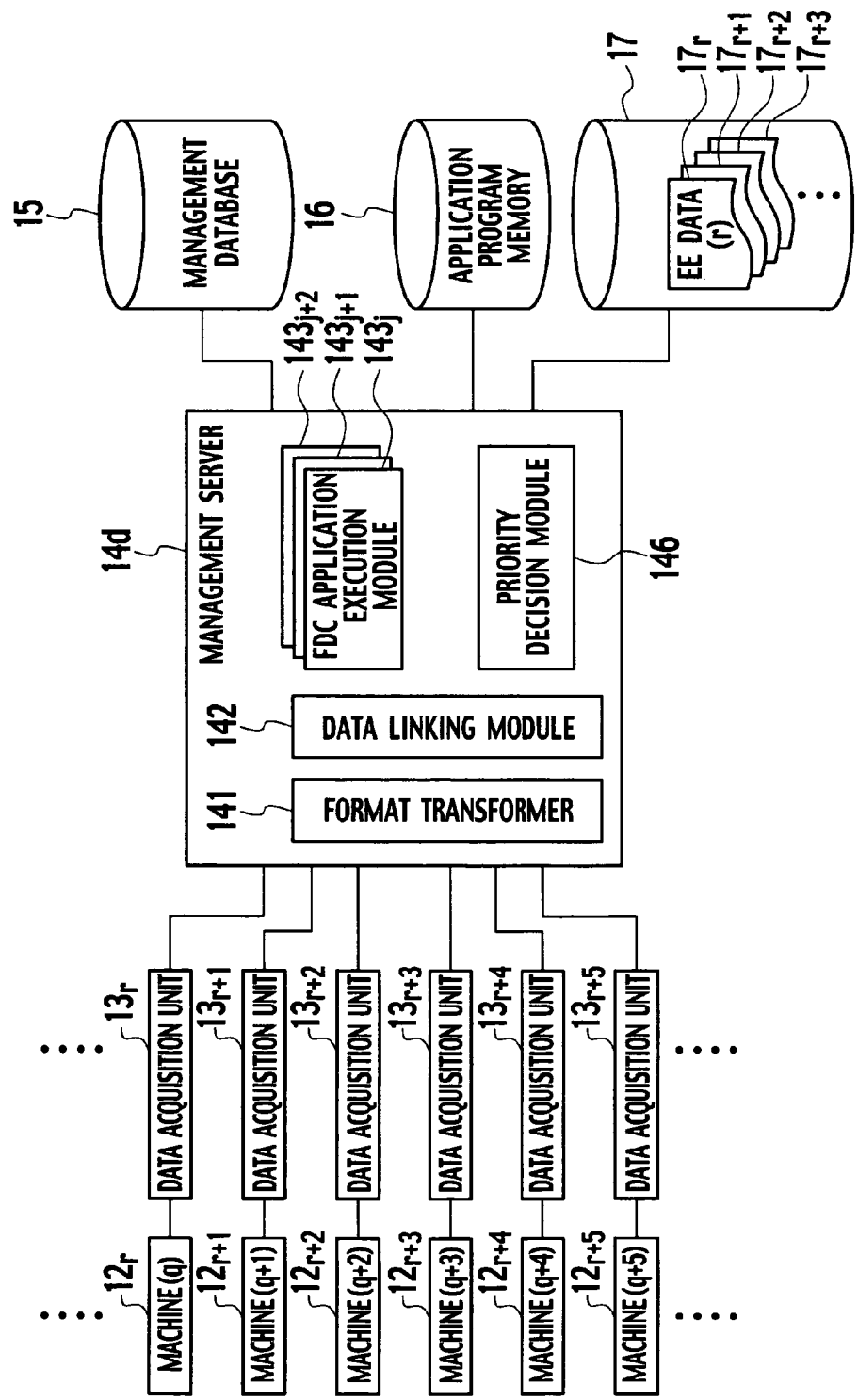
FIG. 24 is a schematic diagram describing a logical configuration of a process-state management system according to a sixth embodiment of the present invention.

FIG. 24 shows a case where pieces of operation-management data $17_r, 17_{r+1}, 17_{r+2}, \ldots, 17_{r+5}, \ldots$ of the respective production machines $12_r, 12_{r+1}, 12_{r+2}, \ldots, 12_{r+5}, \ldots$ are temporarily stored in a data storage unit 17 of a management server 14d and constitute an analysis queue (job queue). Here, if the operation-management data $17_r, 17_{r+1}, 17_{r+2}, \ldots, 17_{r+5}, \ldots$ constituting the analysis queue, are analyzed sequentially with a first-in, last-out type methodology, there is a case that a some delay in determining whether a subject production machine (or, alternatively a subject process) is non-defective or defective for the subject production machine (subject process), which requires a quick reception of the analyzed result through the execution of the FDC application, becomes a significant problem, because allowable duration of time for the subject production machine (subject process) until the subsequent wafer processing is short.

Therefore, a process-state management system of a sixth embodiment of the present invention determines the order of priorities for each production machines (process) to be analyzed by the FDC application so as to preferentially analyze a specific production machine having the highest priority. As shown in FIG. 24, the process-state management system according to the sixth embodiment of the present invention encompasses a plurality of production machines $12_r, 12_{r+1}, 12_{r+2}, \ldots, 12_{r+5}, \ldots$ required for fabricating products such as semiconductor devices, a management server 14d configured to receive pieces of operation-management data (equipment data) of the respective production machines $12_r, 12_{r+1}, 12_{r+2}, \ldots, 12_{r+5}, \ldots$, and monitor corresponding operation states of the respective production machines $12_r, 12_{r+1}, 12_{r+2}, \ldots, 12_{r+5}, \ldots$ in real time, and a management database 15 storing pieces of operation-management data of the respective production machines $12_r, 12_{r+1}, 12_{r+2}, \ldots, 12_{r+5}, \ldots$ as data with the common format, as with the process-state management systems according to the first to fifth embodiments.

However, the process-state management system according to the sixth embodiment is different from the process-state management systems according to the first to fifth embodiments in that the CPU of the management server 14d in the process-state management system of the sixth embodiment includes a priority decision module 146. The priority decision module 146 redefines the order of the analysis queue and then sorts the operation-management data $17_r, 17_{r+1}, 17_{r+2}, \ldots, 17_{r+5}, \ldots$ in decreasing priority-order, for facilitating the analysis in that order.

As with the process-state management systems according to the first to fifth embodiments, the CPU of the management server 14d encompasses a format transformer 141 configured to transform operation-management data transmitted from the data acquisition units $13_r, 13_{r+1}, 13_{r+2}, \ldots, 13_{r+5}, \ldots$ into data represented by the common format, and a data-linking module 142 configured to link the format-transformed-operation-management data by the format transformer 141 with the management information transmitted from the control server. The operation-management data of the production machines $12_r, 12_{r+1}, 12_{r+2}, \ldots, 12_{r+5}, \ldots$ linked with the management information $17_r, 17_{r+1}, 17_{r+2}, \ldots, 17_{r+5}, \ldots$ are stored in the management database 15 with the common format. The CPU of the management server 14d further includes a plurality of FDC application execution modules $143_j, 143_{j+1}, 143_{j+2}, \ldots$ Each of the FDC application execution modules $143_j, 143_{j+1}, 143_{j+2}, \ldots$ is used as a common analysis application to collectively analyze and monitor the plurality of production machines $12_r, 12_{r+1}, 12_{r+2}, \ldots, 12_{r+5}, \ldots$ in real time. FDC programs to instruct and control the plurality of FDC application execution modules $143_j, 143_{j+1}, 143_{j+2}, \ldots$ are stored in the application program memory 16 connected to the CPU of the management server 14d. As with the process-state management systems according to the first to fifth embodiments, the production machines $12_r, 12_{r+1}, 12_{r+2}, \ldots, 12_{r+5}, \ldots$ are connected to the data acquisition units $13_r, 13_{r+1}, 13_{r+2}, \ldots, 13_{r+5}, \ldots$, which collect operation-management data $17_r, 17_{r+1}, 17_{r+2}, \ldots, 17_{r+5}, \ldots$ of the production machines $12_r, 12_{r+1}, 12_{r+2}, \ldots, 12_{r+5}, \ldots$ and transmit the operation-management data to the management server 14d at predetermined timings (periodically). In addition, as with the process-state management systems according to the first to fifth embodiments, the process-state management system of the sixth embodiment has a control server (not shown in the drawing) to collectively control the operations of the respective production machines $12_r, 12_{r+1}, 12_{r+2}, \ldots, 12_{r+5}, \ldots$ in FIG. 24; wherein the control server is connected to the production machines $12_r, 12_{r+1}, 12_{r+2}, \ldots, 12_{r+5}, \ldots$ The way how the priority decision module 146 of the process-state management system according to the sixth embodiment determines the priority-order for each production machines (process) to be analyzed by the execution of the FDC application is described below.

(Predetermined Priority-Order for Production Machines/Process)

For example, a higher priority is given to real-time control of film thickness in the CVD process. This is because abnormality of deposition rate needs to be quickly detected, and the CVD deposition time needs to be extended until completion of the CVD process. On the other hand, a lower priority is given to batch processing taking a long time such as a diffusing process. This is because there is a sufficient time until the subsequent lot processing starts.

Therefore, when priority-order for the production machines $12_r, 12_{r+1}, 12_{r+2}, 12_{r+3}, 12_{r+4},$ and $12_{r+5}$ is predetermined as the second, the fourth, the third, the fifth, the sixth, and the first, for example, priority-order for the execution of the corresponding operation-management data $17_r, 17_{r+1}, 17_{r+2}, 17hd\ r+3, 17_{r+4},$ and $17_{r+5}$ may be given as the second, the fourth, the third, the fifth, the sixth, and the first. Therefore, as shown in FIG. 24, when the data are temporarily stored in the data storage unit 17 and the data implement an analysis queue (job queue), the priority decision module 146 sorts in conformity with a predetermined priority-order, into the order of operation-management data $17_{r+5}, 17_r, 17_{r+2}, 17_{r+1}, 17_{r+3},$ and $17_{r+4},$ and then analyzes in that order.

The priority-order may be determined with consideration of a time interval required from the instant when an alarm is issued until the instant when a countermeasure begins or completes, and risks and cost ascribable to a problem caused by a delay of the countermeasure from the instant when an alarm is issued.

(Notification of "Required Analyzing Time Interval" from Production Machines)

Time interval from the instant when a process is completed to the instant when an analyzed result of the process is provided is defined as "required analyzing time interval" for each of production machines $12_r, 12_{r+1}, \ldots, 12_{r+5}, \ldots$. A time stamp indicating that a process is completed and the required analyzing time interval of the corresponding process along with the corresponding operation-management data (one of $17_r, 17_{r+1}, \ldots, 17_{r+5}, \ldots$) are transmitted to the priority decision module 146 from each of production machines $12_r, 12_{r+1}, \ldots, 12_{r+5}, \ldots$, respectively. The priority decision module 146 then calculates "result-providing time", which is the time instant when the analyzed results of the respective processes is scheduled to be provided, for each of production machines $12_r, 12_{r+1}, \ldots 12_{r+5}, \ldots$ and then defines each of waiting times for the execution of the FDC application of the production machines $12_r, 12_{r+1}, \ldots, 12_{r+5}, \ldots$, in decreasing order of the result-providing time for each of production machines $12_r, 12_{r+1}, \ldots, 12_{r+5}, \ldots$.

For example, if it is assumed that:

| production machine $12_r$ | |
|---|---|
| required analyzing time interval: | 30 seconds |
| process completed time (time stamp): | 8/31, 10:10.30 |
| result-providing time: | 8/31, 10:11.00; |
| production machine $12_{r+1}$: | |
| required analyzing time interval: | 100 seconds; |
| process completed time (time stamp): | 8/31, 10:09.30, and |
| result-providing time: | 8/31, 10:11.10, |
| . . . | |
| . . . | |
| . . . | |
| production machine $12_{r+5}$: | |
| required analyzing time interval: | 5 seconds, |
| process completed time (time stamp): | 8/31, 10:10.50, and |
| result-providing time: | 8/31, 10:10.55. |

Once respective time stamps indicating process completion, required analyzing time intervals, and result-providing times along with the operation-management data $17_r, 17_{r+1}, \ldots, 17_{r+5}, \ldots$ are transmitted from the production machines $12_r, 12_{r+1}, \ldots, 12_{r+5}, \ldots$ to the priority decision module 146, the priority decision module 146 then defines each of waiting times for each of analysis executed by the FDC application in decreasing order of the result-providing time. For example, the operation-management data $17_r, 17_{r+1}, \ldots, 17_{r+5}, \ldots$ are sorted, in decreasing order, into:

| operation-management data $17_{r+5}$ | |
|---|---|
| result-providing time: | 8/31, 10:10.55; |
| operation-management data $17_r$ | |
| result-providing time: | 8/31, 10:11.00; |
| operation-management data $17_{r+1}$ | |
| result-providing time: | 8/31, 10:11.10, |
| . . . | |
| . . . | | and the operation-management data $17_{r+5}, 17_r, 17_{r+1}, \ldots$ are then analyzed in conformity with the above order.

OTHER EMBODIMENTS

Various modifications will become possible for those skilled in the art after receiving the teaching of the present disclosure without departing from the scope thereof.

Figure 25:
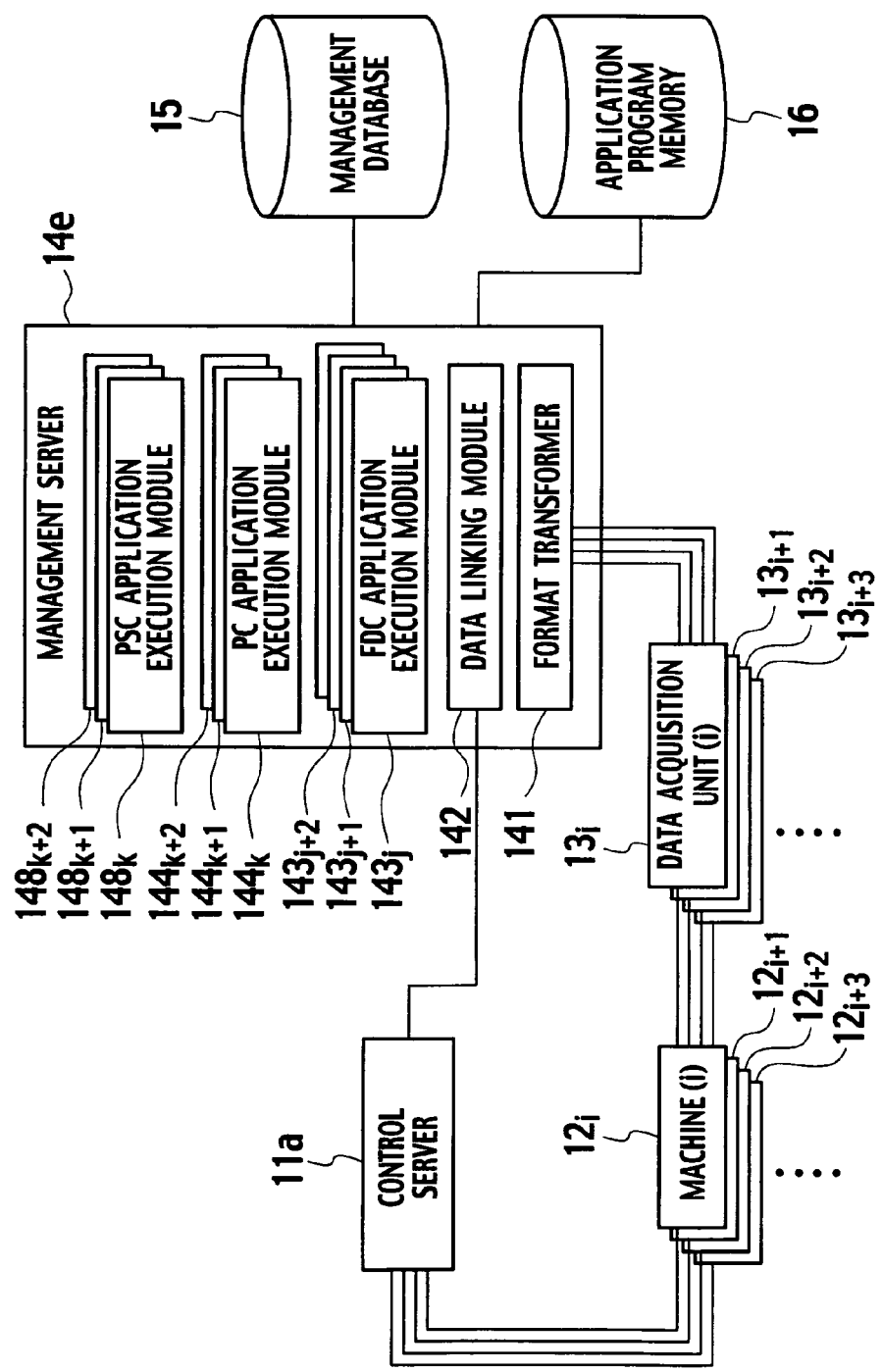
FIG. 25 is a schematic diagram describing a logical configuration of a process-state management system according to another embodiment of the present invention.

In the first to sixth embodiments, the process-state management systems/methods have been described mainly focusing to the FDC application. However, the present invention is not limited to the process-state management systems/methods using the FDC application, or applications equivalent to the FDC application. For example, as shown in FIG. 25, a CPU of a management server 14e may further includes a plurality of PSC application execution modules $148_m, 148_{m+1}, 148_{m+2}, \ldots$, and each of the PSC application execution modules $148_m, 148_{m+1}, 148_{m+2}, \ldots$ may be elected as a common analysis application to optimize processing executed by the respective production machines $12_i, 12_{i+1}, 12_{i+2}, \ldots 12_{i+5}, \ldots$ in real time. The PSC application execution modules $148_m, 148_{m+1}, 148_{m+2}, \ldots$ may adopt criterions with narrower range of acceptable values than the criterions for the FDC application execution modules $143_j, 143_{j+1}, 143_{j+2}, \ldots$ in the first to sixth embodiments, so as to control the processes by the production machines $12_i, 12_{i+1}, 12_{i+2}, \ldots, 12_{i+5}, \ldots$ with the narrower ranges, thereby facilitating fabrication of products having better performances, uniformities, and yields, rather than protecting from generation of fault products by the FDC application, and also facilitating prediction of process results.

In FIG. 15, the first film thickness inspection tool $12_{p+1}$ is provided next to the polysilicon CVD furnace $12_p$; the second film thickness inspection tool $12_{p+3}$ is provided next to the amorphous silicon CVD furnace $12_{p+2}$; the resist pattern inspection tools $12_{p+9}$ is provided next to the developing tool $12_{p+8}$; and the etched geometry inspection tools $12_{p+13}$ and the etched depth inspection tools $12_{p+14}$ are provided next to the polysilicon etching equipment $12_{p+12}$. In addition to provision of the FDC application to the production machines, in-line QC data and data of inspected results provided by these inspection tool $12_{p+1}, 12_{p+3}, 12_{p+9}, 12_{p+13}, 12_{p+14}, \ldots$ against the production machines may be fed back to the management server 14e, and may be applied for verification and improvement in models used in the FDC application.

Although the first to sixth embodiments have been disclosed focusing exemplary to the semiconductor device fabrication method, it may be easily understood from these descriptions that the process-state management systems/methods of the present invention may be applied to fabrication systems/methods for automobiles, chemical agents, and building components. Thus, the present invention of course includes various embodiments and modifications and the like which are not detailed above. Therefore, the scope of the present invention will be defined in the following claims.

What is claimed is:

1. A process-state management system comprising:
    a plurality of production machines, each of the production machines being assigned to one of a sequence of manufacturing processes configured to manufacture a product;
    a first control server configured to collectively control production machines, which occupy at least part of the plurality of production machines;
    a management server including a data-linking module configured to link operation-management data of the production machines with corresponding management information transmitted from the first control server, respectively, the management server analyze the operation-management data linked with the management information with a common analysis application; and a management database configured to store the operation-management data linked with the management information.

2. The system of claim 1, wherein the management server further comprises a format transformer configured to transform the operation-management data of the production machines into data represented by a common format, respectively, wherein the data-linking module links the common-format-transformed operation-management data with corresponding management information transmitted from the first control server, respectively.

3. The system of claim 1, further comprising a data acquisition unit being attached to one of the production machines, the data acquisition means being configured to acquire operation-management data from the attached production machine, and to transmit the operation-management data to the management server.

4. The system of claim 1, wherein the first control server comprises a data acquisition unit configured to acquire operation-management data from at least one of the production machine, and to transmit the operation-management data to the management server.

5. The system of claim 1, further comprising a second control server configured to share the function of collectively controlling the production machines with the first control server so as to implement a distributed processing system.

6. A management server adapted for a system comprising a plurality of production machines, each of the production machines being assigned to one of a sequence of manufacturing processes configured to manufacture a product, a control server configured to collectively control production machines, which occupy at least part of the plurality of production machines, a management server connected to the production machines and the control server through a communication network, and a management database connected to the management server, the management server comprising:

a data-linking module configured to link operation-management data of the production machines with corresponding management information transmitted from the control server, respectively, wherein the management server analyzes the operation-management data linked with the management information with a common analysis application.

7. The server of claim 6, further comprising a format transformer configured to transform the operation-management data of the production machines into data represented by a common format, wherein the data-linking module links the common-format-transformed operation-management data with corresponding management information transmitted from the control server, respectively.

8. A control server adapted for a system comprising a plurality of production machines, each of the production machines being assigned to one of a sequence of manufacturing processes configured to manufacture a product, the control server configured to collectively control production machines, which occupy at least part of the plurality of production machines, a management server connected to the production machines and the control server through a communication network, and a management database connected to the management server, the control server comprising:

a data acquisition unit configure to acquire operation-management data from at least one of the production machine; and a data-linking module configured to link the operation-management data of the production machine with corresponding management information.

9. The server of claim 8, further comprising a format transformer configured to transform the operation-management data of the production machine into data represented by a common format, wherein the data-linking module links the common-format-transformed operation-management data with corresponding management information.

10. A method for managing process-states by repetition of a sequence of procedures, the sequence of procedures comprising:

transmitting management information for a process executed by a subject production machine to a data-linking module from a control server;

linking operation-management data of the subject production machine with the management information; and analyzing the operation-management data linked with the management information with a common analysis application by a management server, wherein the sequence of procedures is applied sequentially to a plurality of production machines so as to manage process-states executed by the production machines, respectively, using the analyzed results by the management server, each of the production machines being assigned to one of a sequence of manufacturing processes configured to manufacture a product.

11. The method of claim 10, wherein each of the sequence of procedures further comprises:

transforming the operation-management data of the subject production machine into data represented by a common format, wherein the data-linking module links the common-format-transformed operation-management data with the management information transmitted from the control server.

12. A method for managing process-states comprising:

transmitting a plurality of pieces of management information for processes executed by a plurality of production machines to a data-linking module from a control server, each of the production machines being assigned to one of a sequence of manufacturing processes configured to manufacture a product;

linking operation-management data of the production machines with corresponding management information, respectively; and analyzing the operation-management data linked with the management information with a common analysis application by a management server, wherein process-states executed by the production machines are managed using the analyzed results by the management server.

13. The method of claim 12, further comprising:

transforming the operation-management data of the production machines into data represented by a common format, wherein the data-linking module links the common-format-transformed operation-management data with corresponding management information transmitted from the control server, respectively.

14. A method for manufacturing a product comprising:

starting a subject process, which is one of the manufacturing processes in a sequence of manufacturing processes configured to manufacture the product, by using a subject production machine, so as to provide a subject intermediate product;

linking operation-management data of the subject production machine with a piece of management information of the subject production machine;

analyzing the operation-management data of the subject production machine linked with the management information of the subject production machine, and if the analyzed result satisfies a criterion, conveying the subject intermediate product to a next process of the subject process, and further proceeding to an influenced process assigned at a later stage than the subject process in the sequence of manufacturing processes;

starting the influenced process by using an influenced production machine, so as to provide a influenced intermediate product;

linking operation-management data of the influenced production machine with a piece of management information of the influenced production machine; and analyzing the operation-management data of the influenced production machine linked with the management information of the influenced production machine, and if the analyzed result satisfies a criterion, conveying the influenced intermediate product to another process next to the influenced process in the sequence of manufacturing processes.

15. The method of claim 14, further comprising:

after transforming the operation-management data of the subject, the second and the third production machines into data represented by a common format, linking operation-management data of the subject, the second and the third production machines with corresponding management information, respectively.

16. The method of claim 14, further comprising:

after linking the operation-management data of the influenced production machine with the management information of the influenced production machine, editing the operation-management data of the subject production machine with the operation-management data of the influenced production machine, wherein, in the analysis of the operation-management data of the second production, whether an analyzed result satisfies a criterion defined by a model for conducting a multivariate analysis with parameters inherent in the subject and the influenced production machines is determined.

17. The method of claim 14, wherein the subject production machine is an amorphous silicon chemical vapor deposition furnace and the influenced production machine is an amorphous silicon etching instrument.

18. The method of claim 14, wherein the subject production machine is a polysilicon chemical vapor deposition furnace and the influenced production machine is an ion implanter.

19. A computer program product storing a program being executed on a management server in a system comprising a plurality of production machines, each of the production machines being assigned to one of a sequence of manufacturing processes configured to manufacture a product, a control server configured to collectively control production machines, which occupy at least part of the plurality of production machines, the management server being connected to the production machines and the control server through a communication network and to a management database, the program comprising a sequence of instructions including:

instructions configured to transmit management information for the process executed by a subject production machine to a data-linking module from a control server;

instructions configured to link operation-management data of the subject production machine with the management information; and instructions configured to analyze the operation-management data linked with the management information with a common analysis application by a management server, wherein the sequence of instructions is applied sequentially to a plurality of production machines so as to manage process-states executed by the production machines, respectively, using the analyzed results by the management server.

20. The program product of claim 19, further comprising:

instructions configured to transform the operation-management data of the subject production machine into data represented by a common format, wherein the data-linking module links the common-format-transformed operation-management data with the management information transmitted from the control server.

* * * * *